(12) United States Patent
Chang et al.

(10) Patent No.: US 12,124,016 B2
(45) Date of Patent: Oct. 22, 2024

(54) LENS ASSEMBLY

(71) Applicants: Sintai Optical (Shenzhen) Co., Ltd., ShenZhen (CN); Asia Optical Co., Inc., Taichung (TW)

(72) Inventors: Hsi-Ling Chang, Taichung (TW); Chien-Hung Chen, Taichung (TW); Ming-Huang Tseng, Taichung (TW); Guo-Yang Wu, Taichung (TW); Bo-Yan Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 395 days.

(21) Appl. No.: 17/711,071

(22) Filed: Apr. 1, 2022

(65) Prior Publication Data

US 2022/0326486 A1    Oct. 13, 2022

(30) Foreign Application Priority Data

Dec. 21, 2021    (CN) .............................. 202111571471

(51) Int. Cl.
  *G02B 15/14* (2006.01)
  *G02B 13/00* (2006.01)
  *G02B 13/02* (2006.01)

(52) U.S. Cl.
  CPC ........... *G02B 13/009* (2013.01); *G02B 13/02* (2013.01); *G02B 15/144* (2019.08)

(58) Field of Classification Search
  CPC . G02B 15/144; G02B 13/004; G02B 13/0065
  See application file for complete search history.

(56) References Cited

U.S. PATENT DOCUMENTS

| | | | |
|---|---|---|---|
| 8,009,972 B2 | 8/2011 | Kuroda et al. | |
| 10,146,030 B2 | 12/2018 | Cai et al. | |
| 11,194,122 B2 | 12/2021 | Stuible et al. | |
| 2005/0128604 A1 | 6/2005 | Kuba | |
| 2014/0139718 A1* | 5/2014 | Mimura | G02B 15/177 348/335 |

(Continued)

FOREIGN PATENT DOCUMENTS

| | | |
|---|---|---|
| CN | 101025470 A | 8/2007 |
| JP | 2003107356 A | 4/2003 |
| JP | 2007093955 A | 4/2007 |

(Continued)

*Primary Examiner* — Joseph P Martinez
(74) *Attorney, Agent, or Firm* — McClure, Qualey & Rodack, LLP

(57) ABSTRACT

A lens assembly includes a first lens group, a second lens group, a third lens group, a fourth lens group, and a reflective element. The first lens group is with refractive power. The second lens group is with positive refractive power. The third lens group is with positive refractive power. The fourth lens group is with refractive power. The reflective element includes a reflective surface. A light from an object sequentially passes through the first lens group, the second lens group, the third lens group, and the fourth lens group to an image side along an axis. The reflective element is disposed between an object side and the image side along the axis. Intervals of the lens groups are changeable when the lens assembly zooms from a wide-angle end to a telephoto end.

21 Claims, 14 Drawing Sheets

(56) References Cited

U.S. PATENT DOCUMENTS

2018/0196240 A1    7/2018   Fujimoto et al.

FOREIGN PATENT DOCUMENTS

| TW | 200710556 A | 3/2007 |
| TW | 201116848 A | 5/2011 |
| TW | 201504676 A | 2/2015 |
| TW | 201716804 A | 5/2017 |
| WO | 2012176427 A | 12/2012 |
| WO | 2018050175 A1 | 3/2018 |
| WO | 2020157903 A1 | 8/2020 |

* cited by examiner

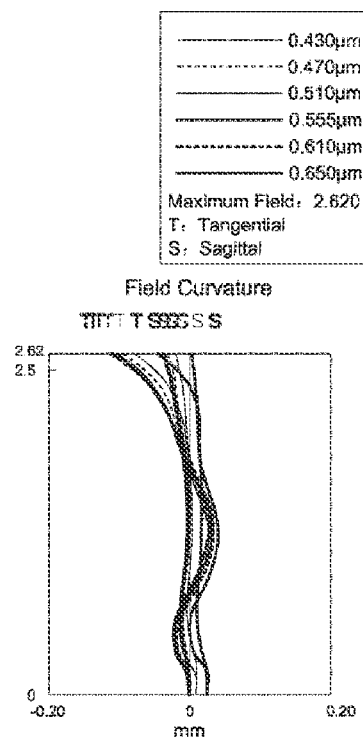
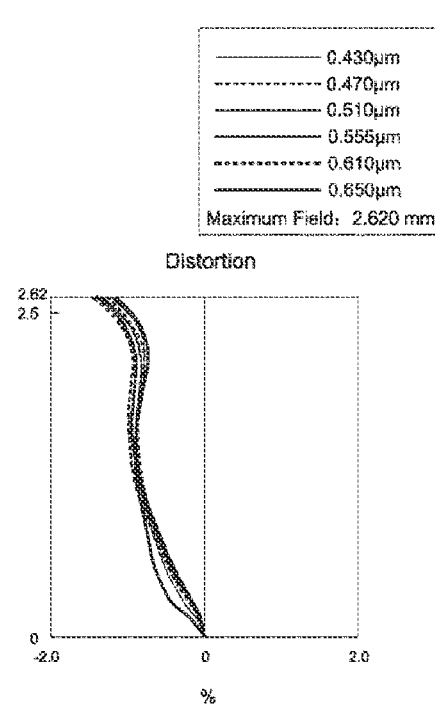
Fig. 11A
Fig. 11B
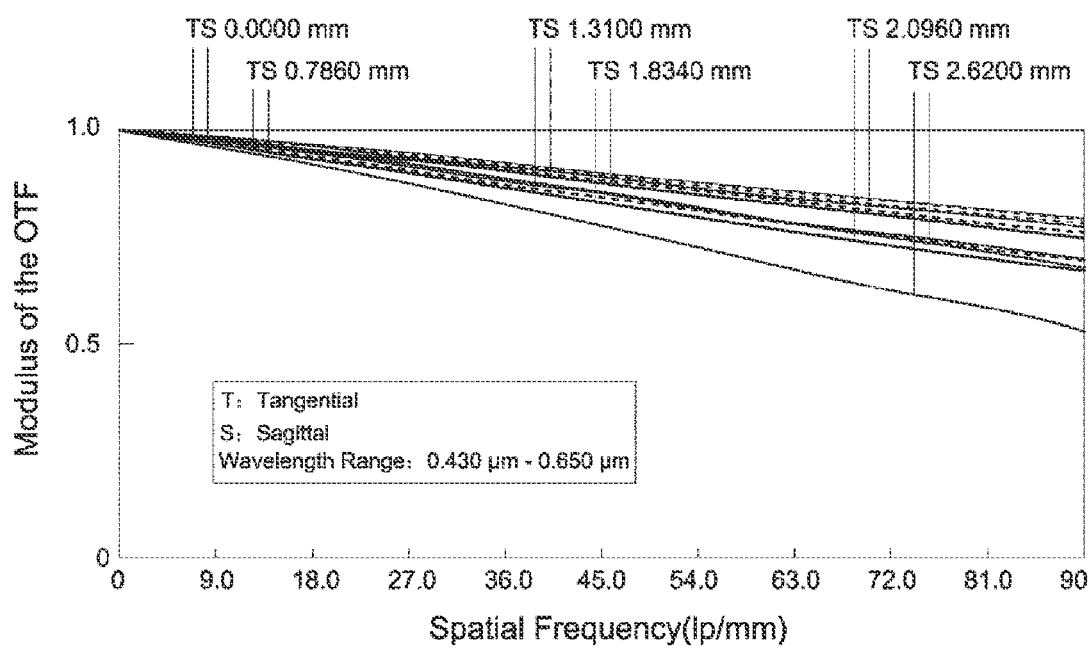
Fig. 11C

LENS ASSEMBLY

BACKGROUND OF THE INVENTION

Field of the Invention

The invention relates to a lens assembly.

Description of the Related Art

The total length of the traditional optical zoom lens is significantly longer, and as the zoom magnification becomes larger, the total length of the lens assembly becomes longer. Today's thin and light image capture apparatus such as smart phone, tablet, mobile device, etc. cannot be equipped with traditional optical zoom lens. Therefore, a lens assembly needs a new structure having miniaturization, high resolution, and optical zoom at the same time, in order to meet the requirement of smart phone for optical zoom function.

BRIEF SUMMARY OF THE INVENTION

The invention provides a lens assembly to solve the above problems. The lens assembly of the invention is provided with characteristics of a decreased total lens length, a decreased lens thickness, an increased resolution, an optical zoom function, and still has a good optical performance.

The lens assembly in accordance with an exemplary embodiment of the invention includes a first lens group, a second lens group, a third lens group, a fourth lens group, and a reflective element. The first lens group is with refractive power. The second lens group is with positive refractive power. The third lens group is with positive refractive power. The fourth lens group is with refractive power. The reflective element includes a reflective surface. A light from an object sequentially passes through the first lens group, the second lens group, the third lens group, and the fourth lens group to an image side along an axis. The reflective element is disposed between an object side and the image side along the axis. Intervals of the lens groups are changeable when the lens assembly zooms from a wide-angle end to a telephoto end. The lens assembly satisfies at least one of the following conditions: $0.1 < DG34W/TTL < 0.5$; $0 < DG23W/Dmax < 1$; $0.3 < Dp/Dmax < 2$; $3.8 < TTL/Dmax < 5.2$; wherein DG23W is an interval from the second lens group to the third lens group along the axis as the lens assembly is at the wide-angle end, DG34W is an interval from the third lens group to the fourth lens group along the axis as the lens assembly is at the wide-angle end, TTL is an interval from an object side surface of the lens which is closest to the object side to an image plane along the axis, Dmax is a maximum effective optical diameter among all of the lenses, and Dp is an effective optical diameter of the reflective surface. The basic operation of the lens assembly in the present invention can be achieved by satisfying the features of the exemplary embodiment without requiring other conditions.

In another exemplary embodiment, the first lens group is with positive refractive power, the second lens group includes a 2-1 lens and a 2-2 lens, the third lens group includes a 3-1 lens and a 3-2 lens, and the fourth lens group is with negative refractive power and includes a 4-1 lens, a 4-2 lens, and a 4-3 lens. In yet another exemplary embodiment, the first lens group includes a 1-1 lens, the 1-1 lens is with positive refractive power, the 2-1 lens is with positive refractive power, the 2-2 lens is with negative refractive power, and the 2-1 lens and the 2-2 lens are arranged in order from the object side to the image side along the axis, the 3-1 lens is with negative refractive power, the 3-2 lens is with positive refractive power, and the 3-1 lens and the 3-2 lens are arranged in order from the object side to the image side along the axis, and the 4-1 lens is with positive refractive power, the 4-2 lens is with refractive power, the 4-3 lens is with negative refractive power, and the 4-1 lens, the 4-2 lens, and the 4-3 lens are arranged in order from the object side to the image side along the axis.

In another exemplary embodiment, the 1-1 lens is a meniscus lens and includes a convex surface facing the object side along the axis and a concave surface facing the image side along the axis, the 2-1 lens is a meniscus lens and includes a convex surface facing the object side along the axis and a concave surface facing the image side along the axis, the 2-2 lens is a meniscus lens and includes a convex surface facing the object side along the axis and a concave surface facing the image side along the axis, the 3-1 lens is a meniscus lens and includes a concave surface facing the object side along the axis and a convex surface facing the image side along the axis, the 3-2 lens is a biconvex lens and includes a convex surface facing the object side along the axis and another convex surface facing the image side along the axis, the 4-1 lens is a meniscus lens and includes a concave surface facing the object side along the axis and a convex surface facing the image side along the axis, the 4-2 lens is a meniscus lens and includes a concave surface facing the object side along the axis and a convex surface facing the image side along the axis, and the 4-3 lens includes a concave surface facing the image side along the axis.

In yet another exemplary embodiment, the 4-2 lens is with negative refractive power, and the 4-3 lens further includes a convex surface facing the object side along the axis. In another exemplary embodiment, the 4-2 lens is with positive refractive power, and the 4-3 lens further includes a concave surface facing the object side along the axis.

In yet another exemplary embodiment, the lens assembly further includes a stop disposed between the object side and the image side along the axis, wherein the stop is a multi-stage variable stop, a F-number of the lens assembly changes during zooming process from the wide-angle end to the telephoto end, and the 2-1 lens and the 2-2 lens are cemented.

In another exemplary embodiment, the second lens group moves to the object side along the axis, the third lens group moves to the image side along the axis, and the first lens group and the fourth lens group are fixed and thereby perform zooming from the wide-angle end to the telephoto end. In yet another exemplary embodiment, the reflective element is disposed between the object side and the first lens group along the axis, the second lens group and the third lens group can move along the axis and thereby perform auto focus, and the reflective element can operate with the axis or the direction perpendicular to the axis as an axis to achieve optical image stabilization.

In another exemplary embodiment, the lens assembly further includes a first annular body and a second annular body, wherein the first lens group is fixed when the lens assembly zooms from the wide-angle end to the telephoto end, the first annular body is disposed between the first lens group and the fourth lens group and has function of stop when the lens assembly is at the telephoto end, and the second annular body is disposed between the first lens group and the fourth lens group, wherein the position of the second annular body is different from that of the first annular body and has function of stop when the lens assembly is at the wide-angle end.

In yet another exemplary embodiment, the first lens group includes a 1-1 lens having negative refractive power, and the second lens group includes a 2-1 lens having positive refractive power and a 2-2 lens having negative refractive power, and the 2-1 lens and the 2-2 lens are arranged in order from the object side to the image side along the axis. In another exemplary embodiment, the third lens group includes a 3-1 lens having negative refractive power and a 3-2 lens having positive refractive power, and the 3-1 lens and the 3-2 lens are arranged in order from the object side to the image side along the axis, and the fourth lens group includes a 4-1 lens having positive refractive power, a 4-2 lens having negative refractive power, and a 4-3 lens having negative refractive power, and the 4-1 lens, the 4-2 lens, and the 4-3 lens are arranged in order from the object side to the image side along the axis.

In yet another exemplary embodiment, the 1-1 lens is a meniscus lens and includes a convex surface facing the object side along the axis and a concave surface facing the image side along the axis, the 2-1 lens is a meniscus lens and includes a convex surface facing the object side along the axis and a concave surface facing the image side along the axis, and the 2-2 lens is a meniscus lens and includes a convex surface facing the object side along the axis and a concave surface facing the image side along the axis. In another exemplary embodiment, the 3-1 lens is a meniscus lens and includes a concave surface facing the object side along the axis and a convex surface facing the image side along the axis, the 3-2 lens is a biconvex lens and includes a convex surface facing the object side along the axis and another convex surface facing the image side along the axis, the 4-1 lens is a meniscus lens and includes a concave surface facing the object side along the axis and a convex surface facing the image side along the axis, and the 4-2 lens is a meniscus lens and includes a concave surface facing the object side along the axis and a convex surface facing the image side along the axis.

In yet another exemplary embodiment, the 4-3 lens is a biconcave lens and includes a concave surface facing the object side along the axis and another concave surface facing the image side along the axis, or the 4-3 lens is a meniscus lens and includes a convex surface facing the object side along the axis and a concave surface facing the image side along the axis.

In another exemplary embodiment, the first annular body is disposed between the first lens group and the second lens group, the second annular body is disposed between the second lens group and the third lens group, the first annular body includes a first hole having fixed dimension, and the second annular body includes a second hole having fixed dimension.

In yet another exemplary embodiment, the lens assembly satisfies at least one of the following conditions: $0.1<$(DG12W−DG12T)/(fT−fW)$<1$; $0.1<$(DG23T−DG23W)/(fT−fW)$<1$; $0.1<$(DG34W−DG34T)/(fT−fW)$<1$; $0.1<$DG12W/TTL$<0.5$; wherein DG12W is an interval from the first lens group to the second lens group along the axis as the lens assembly is at the wide-angle end, DG12T is an interval from the first lens group to the second lens group along the axis as the lens assembly is at the telephoto end, DG23W is the interval from the second lens group to the third lens group along the axis as the lens assembly is at the wide-angle end, DG23T is an interval from the second lens group to the third lens group along the axis as the lens assembly is at the telephoto end, DG34W is the interval from the third lens group to the fourth lens group along the axis as the lens assembly is at the wide-angle end, DG34T is an interval from the third lens group to the fourth lens group along the axis as the lens assembly is at the telephoto end, fW is an effective focal length of the lens assembly as the lens assembly is at the wide-angle end, fT is an effective focal length of the lens assembly as the lens assembly is at the telephoto end, and TTL is the interval from the object side surface of the lens which is closest to the object side to the image plane along the axis.

In another exemplary embodiment, the lens assembly satisfies at least one of the following conditions: $0.2<$ST1 MaxD/ST2 MaxD$<3.2$; $3<$TC12wide/TC12tele$<6$; $4<$TTL1/ST1 MaxD$<6$; $7<$TTL1/ST2 MaxD$<9$; $0.5<$Dmax/ST1 MaxD$<3$; $1<$Dmax/ST2 MaxD$<3.5$; $0<$ST1 MaxD/(TC12wide−TC12tele)$<1.5$; $0<$ST2 MaxD/(TC12wide−TC12tele)$<1$; $0.6<$ST1 MaxD/(TC34wide−TC34tele)$<2.5$; $0.1<$ST2 MaxD/(TC34wide−TC34tele)$<1.8$; $-1<$(TC12wide−TC12tele)/(fW−fT)$<0$; $2<$f/STOPactiveD$<6$; $0.8$ mm$<$STOPactiveD/F #$<2.5$ mm; $1.5$ degree/mm$<$FOV/STOPactiveD$<8.5$ degree/mm; $0.7<$EPD/STOPactiveD$<2$; $0.3<$ST1 MaxD/TC12$<4$; $0.1<$ST2 MaxD/TC12$<2.9$; $1<$f/ST1 MaxD$<6$; $2<$f/ST2 MaxD$<9$; $0.7$ mm$<$ST1 MaxD/F #$<3$ mm; $0.3$ mm$<$ST2 MaxD/F #$<1.1$ mm; $0.8$ degree/mm$<$FOV/ST1 MaxD$<5.5$ degree/mm; $1.9$ degree/1 nm$<$FOV/ST2 MaxD$<8.5$ degree/mm; $0<$ST1 MaxD/EPD$<3$; $0.7<$EPD/ST2 MaxD$<2.8$; $0.1<$TCs1g2/TCs1g1$<5.5$; $0.7<$TCs2g2/TCs2g3$<3$; wherein ST1 MaxD is an effective optical diameter of the first annular body, ST2 MaxD is an effective optical diameter of the second annular body, TC12wide is an interval from the first lens group to the second lens group along the axis as the lens assembly is at the wide-angle end, TC12tele is an interval from the first lens group to the second lens group along the axis as the lens assembly is at the telephoto end, TTL1 is an interval from an object side surface of the 1-1 lens to an image plane along the axis, Dmax is the maximum effective optical diameter among all of the lenses, TC34wide is an interval from the third lens group to the fourth lens group along the axis as the lens assembly is at the wide-angle end, TC34tele is an interval from the third lens group to the fourth lens group along the axis as the lens assembly is at the telephoto end, fW is an effective focal length of the lens assembly as the lens assembly is at the wide-angle end, fT is an effective focal length of the lens assembly as the lens assembly is at the telephoto end, f is an effective focal length of the lens assembly, STOPactiveD is an effective optical diameter of the annular body which has function of stop as the lens assembly having different effective focal length, F # is a F-number of the lens assembly, FOV is a field of view of the lens assembly, EPD is an entrance pupil diameter of the lens assembly, TC12 is an interval from the first lens group to the second lens group along the axis, TCs1g1 is an interval from the first annular body to the first lens group along the axis, TCs1g2 is an interval from the first annular body to the second lens group along the axis, TCs2g2 is an interval from the second annular body to the second lens group along the axis, and TCs2g3 is an interval from the second annular body to the third lens group along the axis.

In yet another exemplary embodiment, the fourth lens group is with positive refractive power and includes a 4-1 lens, a 4-2 lens, and a 4-3 lens, and all of which are arranged in order from the object side to the image side along the axis, and the 4-3 lens is a meniscus lens with positive refractive power and includes a concave surface facing the object side along the axis and a convex surface facing the image side along the axis.

In another exemplary embodiment, the lens assembly satisfies at least one of the following conditions: $0.1<$ (DG12W−DG12T)/(fT−fW)<1; 0.1<(DG23T−DG23W)/(fT−fW)<1; 0.1<(DG34W−DG34T)/(fT−fW)<1; 0.1<DG12W/TTL<0.5; 0.1<ed78/L7Ø; L8R1/SD8R1<0; T2/L2R2<0.4; SD2/L2R2<0.5; wherein DG12W is an interval from the first lens group to the second lens group along the axis as the lens assembly is at the wide-angle end, DG12T is an interval from the first lens group to the second lens group along the axis as the lens assembly is at the telephoto end, DG23W is the interval from the second lens group to the third lens group along the axis as the lens assembly is at the wide-angle end, DG23T is an interval from the second lens group to the third lens group along the axis as the lens assembly is at the telephoto end, DG34W is the interval from the third lens group to the fourth lens group along the axis as the lens assembly is at the wide-angle end, DG34T is an interval from the third lens group to the fourth lens group along the axis as the lens assembly is at the telephoto end, fW is an effective focal length of the lens assembly as the lens assembly is at the wide-angle end, fT is an effective focal length of the lens assembly as the lens assembly is at the telephoto end, TTL is the interval from the object side surface of the lens which is closest to the object side to the image plane along the axis, ed78 is an interval between two edges of lenses which are closest to the image side, L7Ø is an effective optical diameter of an image side surface of the lens which is second closest to the image side, L8R1 is a radius of curvature of an object side surface of the lens which is closest to the image side, SD8R1 is an effective optical radius of the object side surface of the lens which is closest to the image side, T2 is an interval from an object side surface to an image side surface of a lens which is second closest to the object side along the axis, L2R2 is a radius of curvature of an image side surface of the lens which is second closest to the object side, and SD2 is an effective optical radius of the lens which is second closest to the object side.

The lens assembly in accordance with another exemplary embodiment of the invention includes a first lens group, a second lens group, a third lens group, and a fourth lens group. The first lens group is with refractive power. The second lens group is with positive refractive power. The third lens group is with positive refractive power. The fourth lens group is with refractive power. A light from an object sequentially passes through the first lens group, the second lens group, the third lens group, and the fourth lens group to an image side along an axis. Intervals of the lens groups are changeable when the lens assembly zooms from a wide-angle end to a telephoto end. The lens assembly satisfies at least one of the following conditions: 0.1<DG34W/TTL<0.5; 0<DG23W/Dmax<1; 3.8<TTL/Dmax<5.2; wherein DG23W is an interval from the second lens group to the third lens group along the axis as the lens assembly is at the wide-angle end, DG34W is an interval from the third lens group to the fourth lens group along the axis as the lens assembly is at the wide-angle end, TTL is an interval from an object side surface of the lens which is closest to an object side to an image plane along the axis, and Dmax is a maximum effective optical diameter among all of the lenses.

In another exemplary embodiment, the second lens group includes a 2-1 lens and a 2-2 lens, the third lens group includes a 3-1 lens and a 3-2 lens, the 2-1 lens includes a convex surface facing the image side, the 3-1 lens is a meniscus lens and includes a convex surface facing the object side and a concave surface facing the image side, the 2-1 lens and the 2-2 lens are arranged in order from the object side to the image side along the axis, and the 3-1 lens and the 3-2 lens are arranged in order from the object side to the image side along the axis.

In yet another exemplary embodiment, the lens assembly satisfies at least one of the following conditions: −0.1<f2/f7<−5; −0.1<f2/f8<−5; 0.04<R22/R52<25; −0.04<R42/R62<−25; wherein f2 is an effective focal length of a lens second close to the object side, f7 is an effective focal length of a lens seventh close to the object side, f8 is an effective focal length of a lens eighth close to the object side, R22 is a radius of curvature of an image side surface of the lens second close to the object side, R42 is a radius of curvature of an image side surface of a lens fourth close to the object side, R52 is a radius of curvature of an image side surface of a lens fifth close to the object side, and R62 is a radius of curvature of an image side surface of a lens sixth close to the object side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 11A, FIG. 11B, and FIG. 11C depict a field curvature diagram, a distortion diagram, and a modulation transfer function diagram of the lens assembly at the wide-angle end in accordance with the fourth embodiment of the invention, respectively;

DETAILED DESCRIPTION OF THE INVENTION

Figure 1:
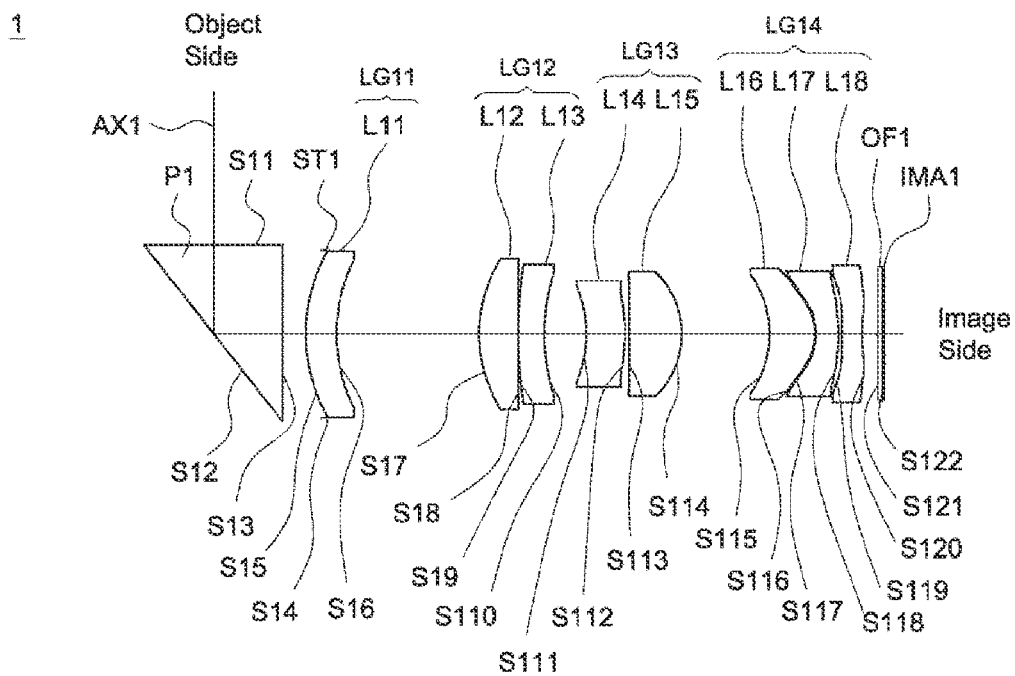
FIG. 1 and FIG. 2 are lens layout diagrams of a lens assembly at a wide-angle end and a telephoto end in accordance with a first embodiment of the invention, respectively.

The following description is made for the purpose of illustrating the general principles of the invention and should not be taken in a limiting sense. The scope of the invention is best determined by reference to the appended claims.

The present invention provides a lens assembly including a first lens group, a second lens group, a third lens group, a fourth lens group, and a reflective element. The first lens group is with refractive power. The second lens group is with positive refractive power. The third lens group is with positive refractive power. The fourth lens group is with refractive power. The reflective element includes a reflective surface. A light from an object sequentially passes through the first lens group, the second lens group, the third lens group, and the fourth lens group to an image side along an axis. The reflective element is disposed between an object side and the image side along the axis. Intervals of the lens groups are changeable when the lens assembly zooms from a wide-angle end to a telephoto end. The lens assembly satisfies at least one of the following conditions: $0.1<DG34W/TTL<0.5$; $0<DG23W/Dmax<1$; $0.3<Dp/Dmax<2$; $3.8<TTL/Dmax<5.2$: wherein DG23W is an interval from the second lens group to the third lens group along the axis as the lens assembly is at the wide-angle end, DG34W is an interval from the third lens group to the fourth lens group along the axis as the lens assembly is at the wide-angle end, TTL is an interval from an object side surface of the lens which is closest to the object side to an image plane along the axis, Dmax is a maximum effective optical diameter among all of the lenses, and Dp is an effective optical diameter of the reflective surface.

The focal length of the lens assembly of the present invention is a variable focal length and the zoom magnification of each embodiment of the lens assembly is about 2 times from the wide-angle end to the telephoto end. When the lens assembly is equipped with another fixed-focus wide-angle lens in a mobile phone, tablet or other camera device, the effective focal length of the lens assembly of the present invention has a zoom magnification of 4 to 8 times relative to the effective focal length of the fixed-focus wide-angle lens. Taking the lens assembly of the first embodiment of the present invention as an example, the effective focal length at the wide-angle end is 14.0754 mm, the effective focal length at the telephoto end is 28.0208 mm, and the zoom magnification is 1.991 (28.0208 mm/14.0754 mm=1.991) times from the wide-angle end to the telephoto end, which is approximately 2 times. When equipped with a fixed-focus wide-angle lens having an effective focal length of 3.52 mm in a mobile phone, tablet or other image capture apparatus and let the effective focal length of the fixed-focus wide-angle lens as the magnification basis, so the lens assembly of the present invention has a zoom magnification ranging from 4 (14.0754 mm/3.52 mm=3.999≈4) times to 8 (28.0208 mm/3.52 mm=7.960≈8) times relative to a fixed-focus wide-angle lens with an effective focal length of 3.52 mm. However, the present invention is not limited thereto. When another fixed-focus wide-angle lens is equipped together in the image capture apparatus, it can have a higher zoom magnification, such as 10 times or more.

Figure 2:
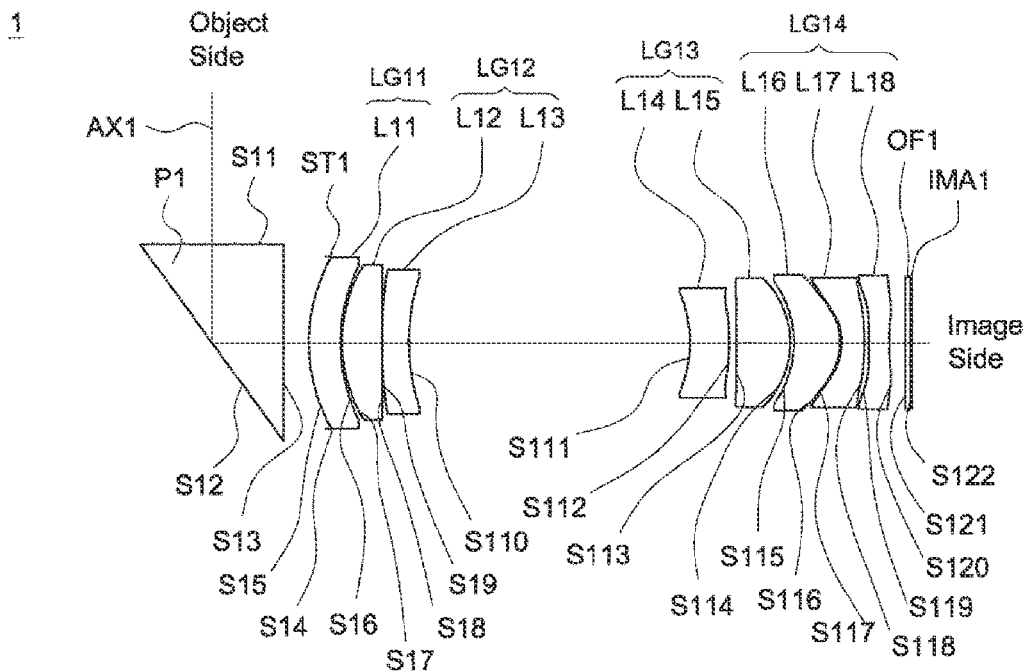
Figure 3A:
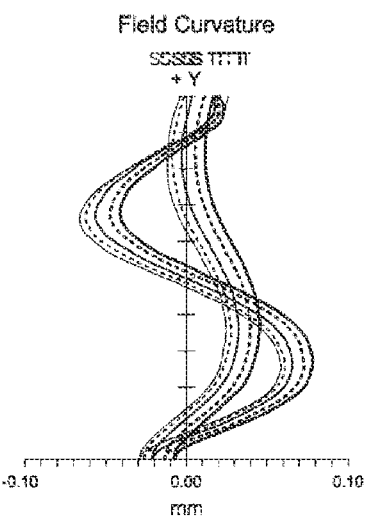
FIG. 3A, FIG. 3B, and FIG. 3C depict a field curvature diagram, a distortion diagram, and a modulation transfer function diagram of the lens assembly at the wide-angle end in accordance with the first embodiment of the invention, respectively.
Figure 3B:
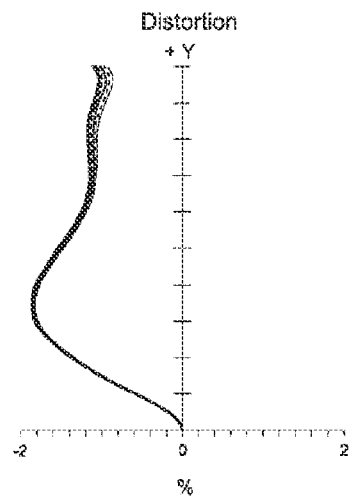
Figure 3C:
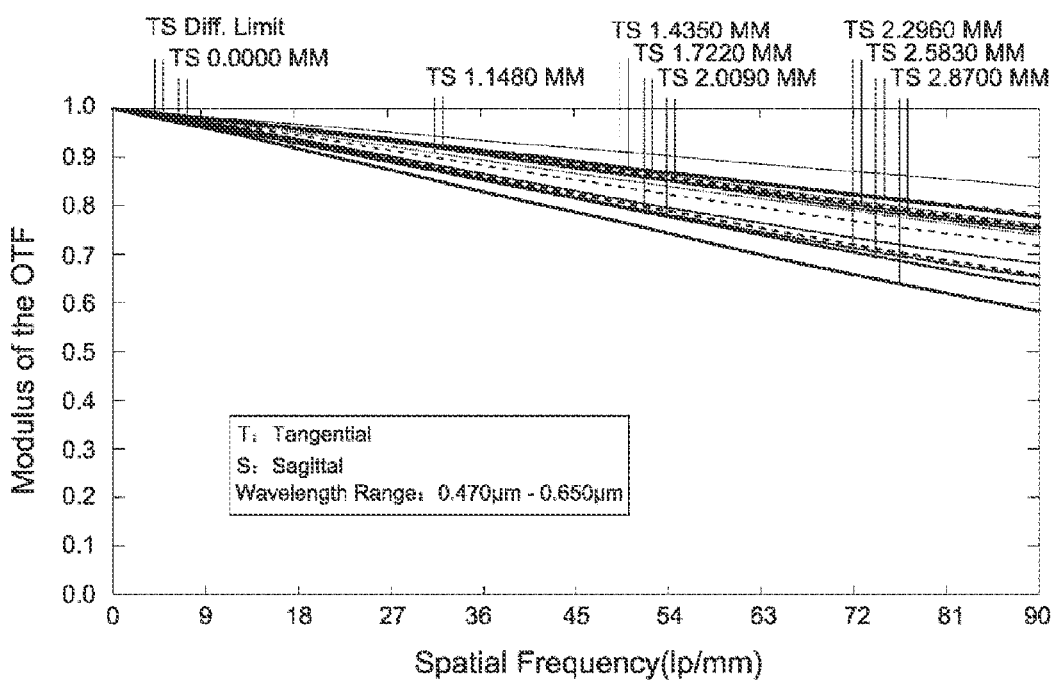
Figure 4A:
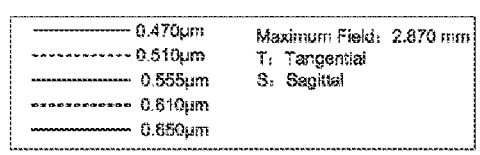
FIG. 4A, FIG. 4B, and FIG. 4C depict a field curvature diagram, a distortion diagram, and a modulation transfer function diagram of the lens assembly at the telephoto end in accordance with the first embodiment of the invention, respectively.
Figure 4A:
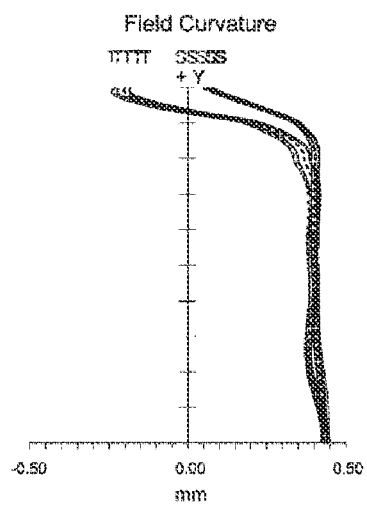
Figure 4B:
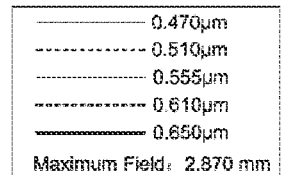
Figure 4B:
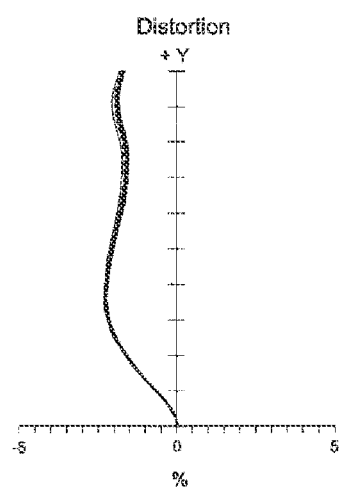
Figure 4C:
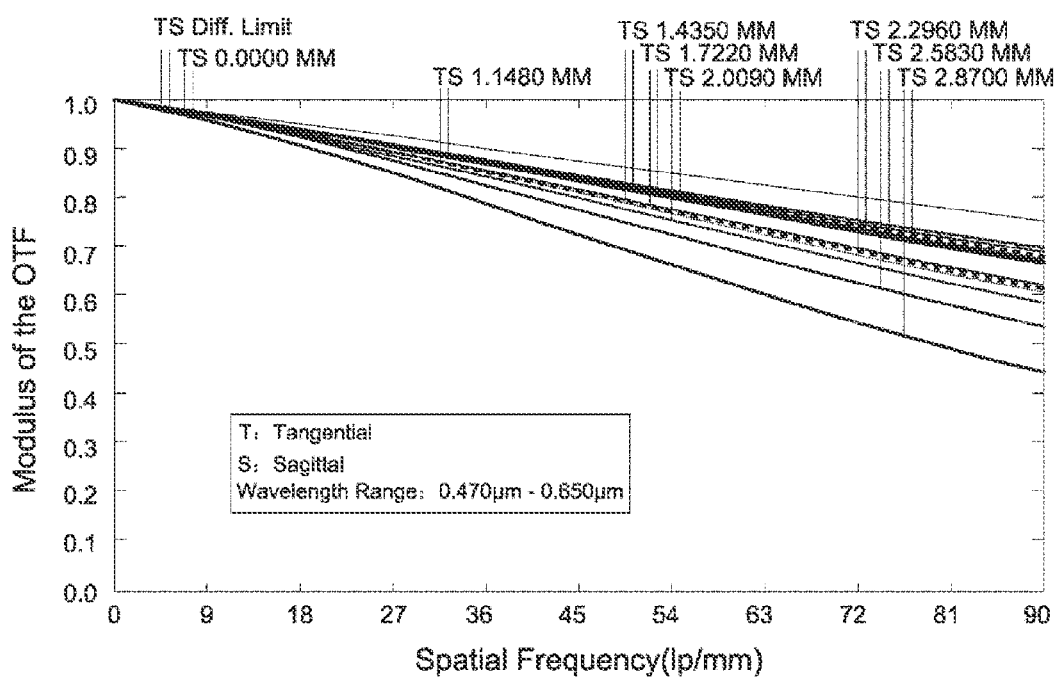
Figure 5:
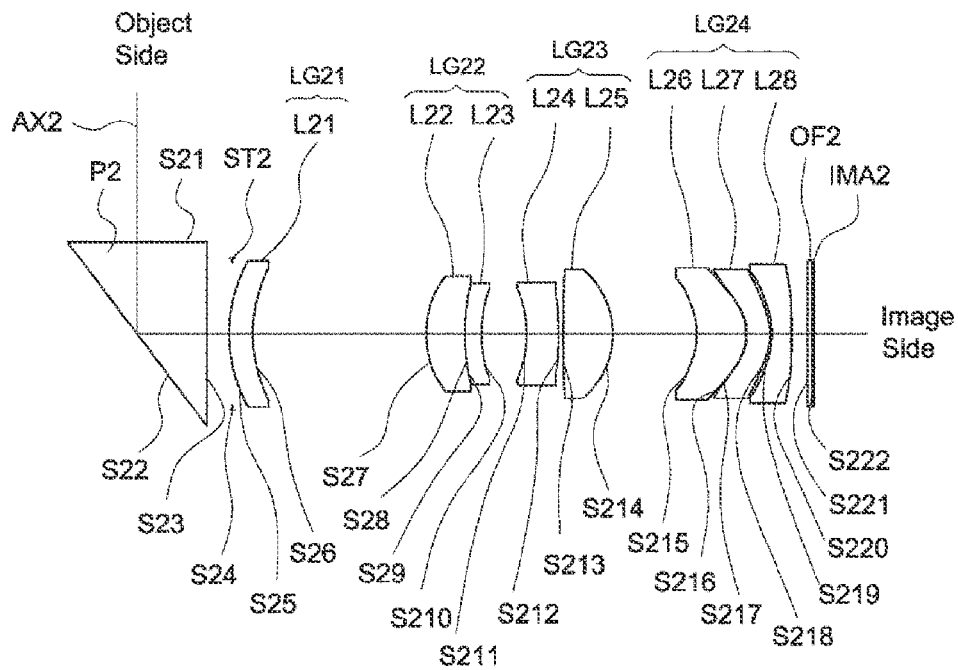
FIG. 5 and FIG. 6 are lens layout diagrams of a lens assembly at a wide-angle end and a telephoto end in accordance with a second embodiment of the invention, respectively.
Figure 6:
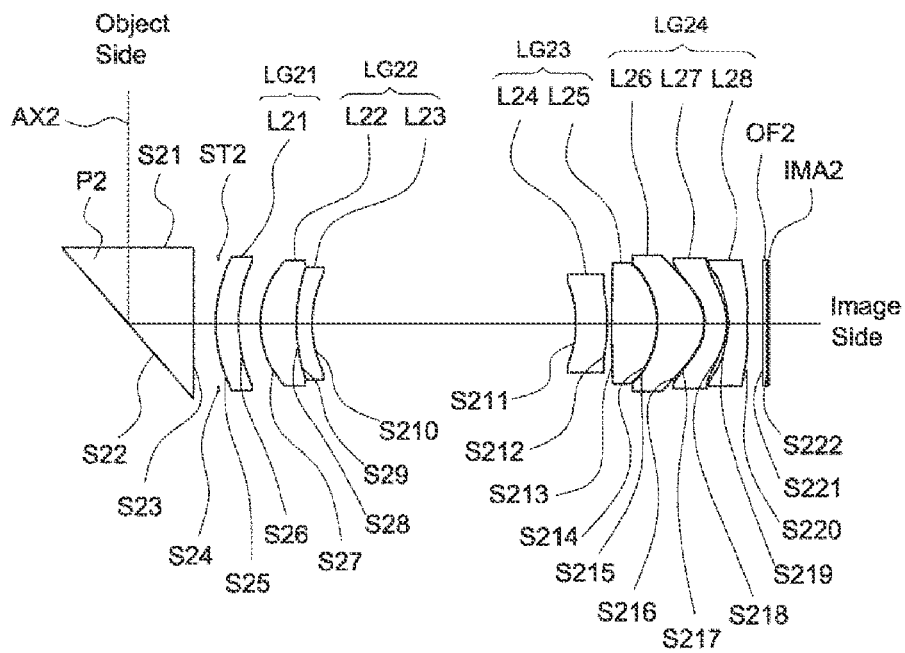
Figure 7:
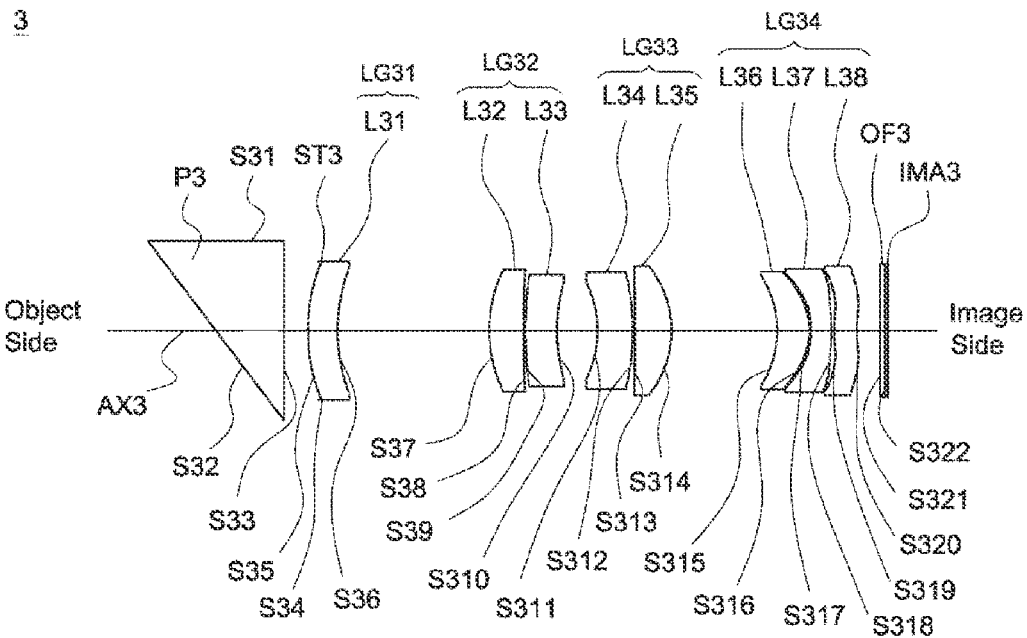
FIG. 7 and FIG. 8 are lens layout diagrams of a lens assembly at a wide-angle end and a telephoto end in accordance with a third embodiment of the invention, respectively.
Figure 8:
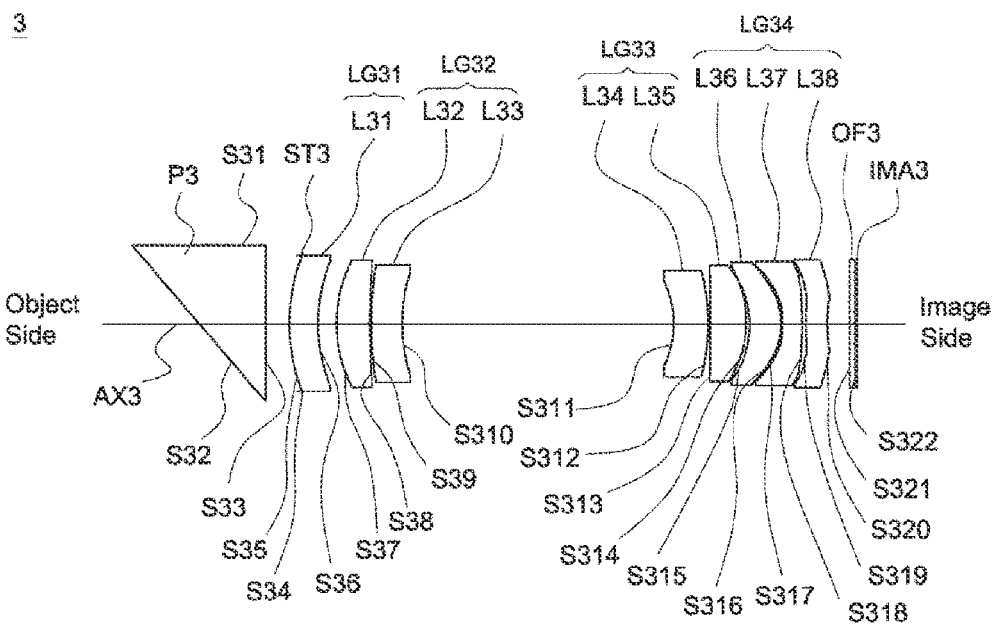

Referring to Table 1, Table 2, Table 4, Table 5, Table 7, and Table 8, wherein Table 1, Table 4, and Table 7 show optical specification in accordance with a first, second, and third embodiments of the invention, respectively and Table 2, Table 5, and Table 8 show aspheric coefficients of each aspheric lens in Table 1, Table 4, and Table 7, respectively. FIG. 1, FIG. 5, and FIG. 7 are lens layout diagrams of a lens assembly at a wide-angle end in accordance with a first, second, and third embodiments of the invention, respectively. FIG. 2, FIG. 6, and FIG. 8 are lens layout diagrams of the lens assembly at a telephoto end in accordance with the first, second, and third embodiments of the invention, respectively. The reflective elements P1, P2, P3 include incident surfaces S11, S21, S31, reflective surfaces S12, S22, S32, and exit surfaces S13, S23, S33, respectively. The first lens groups LG11, LG21, LG31 are with positive refractive power and include 1-1 lenses L11, L21, L31, respectively. The second lens groups LG12, LG22, LG32 are with positive refractive power and include 2-1 lenses L12, L22, L32 and 2-2 lenses L13, L23, L33, respectively. The third lens groups LG13, LG23, LG33 are with positive refractive power and include 3-1 lenses L14, L24, L34 and 3-2 lenses L15, L25, L35, respectively. The fourth lens groups LG14, LG24, LG34 are with negative refractive power and include 4-1 lenses L16, L26, L36, 4-2 lenses L17, L27, L37, and 4-3 lenses L18, L28, L38, respectively.

The reflective elements P1, P2, P3 are made of glass or plastic material, wherein the incident surfaces S11, S21, S31 and the exit surfaces S13, S23, S33 connect to the reflective surfaces S12, S22, S32. The incident surfaces S11, S21, S31 and the exit surfaces S13, S23, S33 are perpendicular to each other. The incident surfaces S11, S21, S31, the reflective surfaces S12, S22, S32, and the exit surfaces S13, S23, S33 are plane surfaces. The 1-1 lenses L11, L21, L31 are meniscus lenses with positive refractive power and made of glass material, wherein the object side surfaces S15, S25, S35 are convex surfaces, the image side surfaces S16, S26, S36 are concave surfaces, and both of the object side surfaces S15, S25, S35 and image side surfaces S16, S26, S36 are aspheric surfaces. The 2-1 lenses L12, L22, L32 are meniscus lenses with positive refractive power and made of glass material, wherein the object side surfaces S17, S27, S37 are convex surfaces, the image side surfaces S18, S28, S38 are concave surfaces, and both of the object side surfaces S17, S27, S37 and image side surfaces S18, S28, S38 are aspheric surfaces. The 2-2 lenses L13, L23, L33 are meniscus lenses with negative refractive power and made of glass material, wherein the object side surfaces S19, S29, S39 are convex surfaces, the image side surfaces S110, S210, S310 are concave surfaces, and both of the object side surfaces S19, S29, S39 and image side surfaces S110, S210, S310 are aspheric surfaces. The 3-1 lenses L14, L24, L34 are meniscus lenses with negative refractive power and made of plastic material, wherein the object side surfaces S111, S211, S311 are concave surfaces, the image side surfaces S112, S212, S312 are convex surfaces, and both of the object side surfaces S111, S211, S311 and image side surfaces S112, S212, S312 are aspheric surfaces. The 3-2 lenses L15, L25, L35 are biconvex lenses with positive refractive power and made of plastic material, wherein the object side surfaces S113, S213, S313 are convex surfaces, the image side surfaces S114, S214, S314 are convex surfaces, and both of the object side surfaces S113, S213, S313 and image side surfaces S114, S214, S314 are aspheric surfaces. The 4-1 lenses L16, L26, L36 are meniscus lenses with positive refractive power and made of plastic material, wherein the object side surfaces S115, S215, S315 are concave surfaces, the image side surfaces S116, S216, S316 are convex surfaces, and both of the object side surfaces S115, S215, S315 and image side surfaces S116, S216, S316 are aspheric surfaces. The 4-2 lenses L17, L27, L37 are meniscus lenses with refractive power and made of plastic material, wherein the object side surfaces S117, S217, S317 are concave surfaces, the image side surfaces S118, S218, S318 are convex surfaces, and both of the object side surfaces S117, S217, S317 and image side surfaces S118, S218, S318 are aspheric surfaces. The 4-3 lenses L18, L28, L38 are with negative refractive power and made of plastic material, wherein the image side surfaces S120, S220, S320 are concave surfaces, and both of the object side surfaces S119, S219, S319 and image side surfaces S120, S220, S320 are aspheric surfaces.

In addition, the lens assemblies 1, 2, 3 satisfy at least one of the following conditions:

$$0.1 < (DG12W - DG12T)/(fT - fW) < 1; \quad (1)$$

$$0.1 < (DG23T - DG23W)/(fT - fW) < 1; \quad (2)$$

$$0.1 < (DG34W - DG34T)/(fT - fW) < 1; \quad (3)$$

$$0.1 < DG12W/TTL < 0.5; \quad (4)$$

$$0.1 < DG34W/TTL < 0.5; \quad (5)$$

$$0 < DG23W/D\max < 1; \quad (6)$$

$$0.3 < Dp/D\max < 2; \quad (7)$$

$$3.8 < TTL/D\max < 5.2; \quad (8)$$

wherein DG12W is respectively an interval from the first lens groups LG11, LG21, LG31 to the second lens groups LG12, LG22, LG32 at the wide-angle end along the axes AX1, AX2, AX3 for the first to third embodiments, DG12T is respectively an interval from the first lens groups LG11, LG21, LG31 to the second lens groups LG12, LG22, LG32 at the telephoto end along the axes AX1, AX2, AX3 for the first to third embodiments, DG23W is respectively an interval from the second lens groups LG12, LG22, LG32 to the third lens groups LG13, LG23, LG33 at the wide-angle end along the axes AX1, AX2, AX3 for the first to third embodiments, DG23T is respectively an interval from the second lens groups LG12, LG22, LG32 to the third lens groups LG13, LG23, LG33 at the telephoto end along the axes AX1, AX2, AX3 for the first to third embodiments, DG34W is respectively an interval from the third lens groups LG13, LG23, LG33 to the fourth lens groups LG14, LG24, LG34 at the wide-angle end along the axes AX1, AX2, AX3 for the first to third embodiments, DG34T is respectively an interval from the third lens groups LG13, LG23, LG33 to the fourth lens groups LG14, LG24, LG34 at the telephoto end along the axes AX1, AX2, AX3 for the first to third embodiments, fW is an effective focal length of the lens assemblies 1, 2, 3 at the wide-angle end for the first to third embodiments, fT is an effective focal length of the lens assemblies 1, 2, 3 at the telephoto end for the first to third embodiments, TTL is respectively an interval from the object side surfaces S15, S25, S35 of the lenses L11, L21, L31 closest to the object side to image planes IMA1, IMA2, IMA3 along the axes AX1, AX2, AX3 for the first to third embodiments, Dmax is a maximum effective optical diameter of all the lenses of the lens assemblies 1, 2, 3 for the first to third embodiments, and Dp is an effective optical diameter of the reflective surfaces S12, S22, S32 for the first to third embodiments. With the lens assemblies 1, 2, 3 satisfying at least one of the above conditions (1)-(8), the total lens length can be effectively shortened, the thickness can be effectively shortened, the resolution can be effectively increased, the aberration can be effectively corrected, the chromatic aberration can be effectively corrected, and optical zoom function can be realized. The preferred embodiment of the present invention can be achieved when the lens assembly satisfies at least one of the conditions (1)-(8).

A detailed description of a lens assembly in accordance with a first embodiment of the invention is as follows. Referring to FIG. 1 and FIG. 2, the lens assembly 1 includes a reflective element P1, a stop ST1, a first lens group LG11, a second lens group LG12, a third lens group LG13, a fourth lens group LG14, and an optical filter OF1, all of which are arranged in order from an object side to an image side along an axis AX1. The reflective element P1 is a prism and includes an incident surface S11, a reflective surface S12, and an exit surface S13. The first lens group LG11 includes a 1-1 lens L11. The second lens group LG12 includes a 2-1 lens L12 and a 2-2 lens L13, both of which are arranged in order from the object side to the image side along the axis AX1. The third lens group LG13 includes a 3-1 lens L14 and a 3-2 lens L15, both of which are arranged in order from the object side to the image side along the axis AX1. The fourth lens group LG14 includes a 4-1 lens L16, a 4-2 lens L17, and a 4-3 lens L18, all of which are arranged in order from the object side to the image side along the axis AX1. In operation, a light from an object (not shown) incident on the reflective element P1 from the incident surface S11 first, then reflected by the reflective surface S12 to change propagation direction, then sequentially passes through the exit surface S13, the stop ST1, the first lens group LG11, the second lens group LG12, the third lens group LG13, the fourth lens group LG14, and the optical filter OF1, and finally imaged on an image plane IMA1. The image plane IMA1 is perpendicular to the incident surface S11 and parallel to the exit surface S13. In the first embodiment, the reflective element P1 is a prism and is not limited thereto. The reflective element P1 can also be a mirror and only includes a reflective surface.

When the lens assembly 1 zooms from the wide-angle end (as shown in FIG. 1) to the telephoto end (as shown in FIG. 2), the first lens group LG11 is fixed, the second lens group LG12 moves to the object side along the axis AX1, the third lens group LG13 moves to the image side along the axis AX1, and the fourth lens group LG14 is fixed, so that the interval between the first lens group LG11 and the second lens group LG12 is decreased, the interval between the second lens group LG12 and the third lens group LG13 is increased, and the interval between the third lens group LG13 and the fourth lens group LG14 is decreased. The zoom magnification is approximately 2 times (28.0208 mm/14.0754 mm≈1.99) as the lens assembly 1 of the first embodiment zooms from the wide-angle end (as shown in FIG. 1) to the telephoto end (as shown in FIG. 2). The reflective element P1 can operate with the axis AX1 or the direction perpendicular to the axis AX1 as an axis, thereby performing optical image stabilization. The second lens group LG12 and the third lens group LG13 can move along the axis AX1, thereby performing auto focus. According to the foregoing, wherein: the 4-2 lens L17 is with negative refractive power; the 4-3 lens L18 is a meniscus lens, wherein the object side surface S119 is a convex surface; and both of the object side surface S121 and image side surface S122 of the optical filter OF1 are plane surfaces. The preferred embodiment of the present invention can be achieved when the lens assembly satisfies conditions (1)-(8), refractive power distribution, and surface shape.

With the above design of the lenses, reflective element P1, stop ST1, and at least one of the conditions (1)-(8) satisfied, the lens assembly 1 can have an effective shortened total lens length, an effective decreased thickness, an effective increased resolution, an effective corrected aberration, an effective corrected chromatic aberration, and a realized optical zoom function. Table 1 shows the optical specification of the lens assembly 1 in FIG. 1, and FIG. 2 when the lens assembly 1 is at the wide-angle end and telephoto end, respectively.

TABLE 1

Wide-angle End
Effective Focal Length = 14.0745 mm F-number = 2.46
Total Lens Length = 24.48 mm Field of View = 23.04 degrees
Telephoto End
Effective Focal Length = 28.0208 mm F-number = 4.00
Total Lens Length = 24.48 mm Field of View = 11.69 degrees

| Surface Number | Radius of Curvature (mm) | Thickness (mm) | Nd | Vd | Effective Focal Length (mm) | Remark |
|---|---|---|---|---|---|---|
| S11 | ∞ | 2.929 | 2 | 28.3 | | P1 |
| S12 | ∞ | 2.929 | 2 | 28.3 | | |
| S13 | ∞ | 1 | | | | |
| S14 | ∞ | 0 | | | | ST1 |
| S15 | 7.659585 | 1.297825 | 2.01 | 19.31 | 68.69 | L11 |

TABLE 1-continued

Wide-angle End
Effective Focal Length = 14.0745 mm F-number = 2.46
Total Lens Length = 24.48 mm Field of View = 23.04 degrees
Telephoto End
Effective Focal Length = 28.0208 mm F-number = 4.00
Total Lens Length = 24.48 mm Field of View = 11.69 degrees

| Surface Number | Radius of Curvature (mm) | Thickness (mm) | Nd | Vd | Effective Focal Length (mm) | Remark |
|---|---|---|---|---|---|---|
| S16 | 7.852602 | 6.0544(w) 0.043242(t) | | | | |
| S17 | 6.024481 | 1.632164 | 1.52 | 70.00 | 12.3961 | L12 |
| S18 | 71.30145 | 0.04094546 | | | | |
| S19 | 30.55779 | 1.117406 | 2.00 | 19.32 | −17.5922 | L13 |
| S110 | 11.03633 | 1.7529(w) 11.39121(t) | | | | |
| S111 | −4.510072 | 1.601993 | 1.67 | 20.39 | −18.8505 | L14 |
| S112 | −7.973671 | 0.194971 | | | | |
| S113 | 32.3976 | 2.219321 | 1.53 | 56.11 | 6.7618 | L15 |
| S114 | −3.991176 | 3.755(w) 0.134503(t) | | | | |
| S115 | −3.413062 | 1.889845 | 1.64 | 20.4 | 5.7616 | L16 |
| S116 | −2.176501 | 0.03779581 | | | | |
| S117 | −2.272523 | 0.9448952 | 1.53 | 56.09 | −4.8972 | L17 |
| S118 | −19.23689 | 0.1579493 | | | | |
| S119 | 5.919351 | 0.873143 | 1.53 | 56.10 | −12.3894 | L18 |
| S120 | 2.970835 | 0.65 | | | | |
| S121 | ∞ | 0.21 | 1.52 | 57.1 | | OF1 |
| S122 | ∞ | 0.04657623 | | | | | w: Wide-angle End
t: Telephoto End

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the axis, k is conic constant and A, B, C, D, E, F and G are aspheric coefficients.

In the first embodiment, the conic constant k and the aspheric coefficients A, B, C, D, E, F, G of each aspheric lens are shown in Table 2.

TABLE 2

| Surface Number | k | A | B | C | D | E | F | G |
|---|---|---|---|---|---|---|---|---|
| S15 | 2.66 | −3.14E−04 | −5.36E−05 | 6.42E−06 | −9.29E−07 | 1.88E−08 | 2.90E−09 | −1.85E−10 |
| S16 | 1.90 | 4.07E−05 | 2.77E−05 | −6.32E−06 | 3.14E−07 | −6.50E−09 | −1.18E−10 | −5.87E−12 |
| S17 | 0.32 | −9.90E−06 | −3.71E−05 | −2.83E−07 | −4.70E−08 | 3.40E−08 | 4.97E−10 | −2.55E−10 |
| S18 | 61.91 | −1.16E−04 | −4.98E−05 | 4.71E−06 | 1.90E−07 | 2.27E−07 | −3.87E−08 | 1.05E−09 |
| S19 | 39.23 | 8.96E−05 | 5.39E−05 | 9.59E−07 | −1.92E−06 | 2.30E−07 | 9.44E−10 | −1.25E−09 |
| S110 | 2.85 | 1.49E−04 | 2.99E−04 | −5.92E−05 | 3.34E−06 | 3.67E−07 | −3.36E−08 | −5.93E−10 |
| S111 | −10.15 | −1.14E−02 | 3.51E−03 | −7.55E−04 | 5.19E−05 | 2.08E−05 | −4.39E−06 | 1.89E−07 |
| S112 | −9.22 | 6.56E−04 | 2.34E−04 | 2.46E−04 | −7.85E−05 | 1.14E−05 | 3.55E−07 | −7.19E−08 |
| S113 | 37.94 | −4.19E−03 | 1.01E−04 | −7.64E−05 | 8.68E−06 | −6.79E−08 | 4.16E−07 | −3.48E−08 |
| S114 | −6.21 | −1.23E−02 | 8.56E−04 | −1.04E−04 | −4.86E−07 | 1.35E−06 | −1.74E−07 | 6.15E−09 |
| S115 | −11.25 | −1.54E−02 | 4.14E−03 | −7.81E−04 | 4.16E−05 | 9.79E−06 | −2.12E−06 | 1.26E−07 |
| S116 | −0.65 | 9.56E−03 | −9.73E−04 | 1.06E−04 | 8.87E−05 | −2.42E−05 | 2.24E−06 | −7.13E−08 |
| S117 | −0.41 | 4.12E−03 | 8.93E−04 | 1.34E−04 | 3.91E−05 | −7.70E−06 | −4.87E−08 | 5.46E−08 |
| S118 | −101.66 | −1.20E−02 | −4.64E−04 | 2.95E−04 | 3.03E−05 | 4.44E−06 | −3.09E−06 | 2.41E−07 |
| S119 | −236.87 | −3.09E−02 | 7.41E−04 | 5.59E−04 | 5.80E−05 | −2.04E−05 | 3.84E−07 | 8.02E−08 |
| S120 | −72.23 | −3.44E−02 | 9.71E−03 | −1.54E−03 | 1.29E−04 | −1.37E−07 | −7.31E−07 | 3.14E−08 |

Table 3 shows the parameters and condition values for conditions (1)-(8) in accordance with the first embodiment of the invention. It can be seen from Table 3 that the lens assembly 1 of the first embodiment satisfies the conditions (1)-(8).

TABLE 3

| | | | | | |
|---|---|---|---|---|---|
| DG12W | 6.0544 mm | DG12T | 0.043242 mm | DG23W | 1.7529 mm |
| DG23T | 11.39121 mm | DG34W | 3.755 mm | DG34T | 0.134503 mm |
| Dmax | 5.701214 mm | Dp | 7.524747 mm | | |
| (DG12W − DG12T)/(fT − fW) | | 0.4311 | (DG23T − DG23W)/(fT − fW) | | 0.6911 |
| (DG34W − DG34T)/(fT − fW) | | 0.2597 | DG12W/TTL | | 0.2474 |
| DG34W/TTL | | 0.1535 | DG23W/Dmax | | 0.3074 |
| Dp/Dmax | | 1.3199 | TTL/Dmax | | 4.2921 |

In addition, the lens assembly 1 of the first embodiment can meet the requirements of optical performance as seen in FIGS. 3A-3C and 4A-4C. It can be seen from FIG. 3A that the field curvature of tangential direction and sagittal direction in the lens assembly 1 of the first embodiment at the wide-angle end ranges from −0.07 mm to 0.08 mm. It can be seen from FIG. 3B that the distortion in the lens assembly 1 of the first embodiment at the wide-angle end ranges from −2% to 0%. It can be seen from FIG. 3C that the modulation transfer function of tangential direction and sagittal direction in the lens assembly 1 of the first embodiment at the wide-angle end ranges from 0.58 to 1.0. It can be seen from FIG. 4A that the field curvature of tangential direction and sagittal direction in the lens assembly 1 of the first embodiment at the telephoto end ranges from −0.25 mm to 0.45 mm. It can be seen from FIG. 4B that the distortion in the lens assembly 1 of the first embodiment at the telephoto end ranges from −2.5% to 0%. It can be seen from FIG. 4C that the modulation transfer function of tangential direction and sagittal direction in the lens assembly 1 of the first embodiment at the telephoto end ranges from 0.45 to 1.0. It is obvious that the field curvature and the distortion of the lens assembly 1 of the first embodiment can be corrected effectively, the image resolution can meet the requirements. Therefore, the lens assembly 1 of the first embodiment is capable of good optical performance.

Referring to FIG. 5 and FIG. 6, the lens assembly 2 includes a reflective element P2, a stop ST2, a first lens group LG21, a second lens group LG22, a third lens group LG23, a fourth lens group LG24, and an optical filter OF2, all of which are arranged in order from an object side to an image side along an axis AX2. The reflective element P2 is a prism and includes an incident surface S21, a reflective surface S22, and an exit surface S23. The first lens group LG21 includes a 1-1 lens L21. The second lens group LG22 includes a 2-1 lens L22 and a 2-2 lens L23, both of which are arranged in order from the object side to the image side along the axis AX2 and the 2-1 lens L22 is cemented with the 2-2 lens L23. The third lens group LG23 includes a 3-1 lens L24 and a 3-2 lens L25, both of which are arranged in order from the object side to the image side along the axis AX2. The fourth lens group LG24 includes a 4-1 lens L26, a 4-2 lens L27, and a 4-3 lens L28, all of which are arranged in order from the object side to the image side along the axis AX2. The incident surface S21 faces an object (not shown) along the axis AX2. In operation, a light from the object (not shown) incident on the reflective element P2 from the incident surface S21 first, then reflected by the reflective surface S22 to change propagation direction, then sequentially passes through the exit surface S23, the stop ST2, the first lens group LG21, the second lens group LG22, the third lens group LG23, the fourth lens group LG24, and the optical filter OF2, and finally imaged on an image plane IMA2. The image plane IMA2 is perpendicular to the incident surface S21 and parallel to the exit surface S23. In the second embodiment, the reflective element P2 is a prism and is not limited thereto. The reflective element P2 can also be a mirror and only includes a reflective surface.

When the lens assembly 2 zooms from the wide-angle end (as shown in FIG. 5) to the telephoto end (as shown in FIG. 6), the first lens group LG21 is fixed, the second lens group LG22 moves to the object side along the axis AX2, the third lens group LG23 moves to the image side along the axis AX2, and the fourth lens group LG24 is fixed, so that the interval between the first lens group LG21 and the second lens group LG22 is decreased, the interval between the second lens group LG22 and the third lens group LG23 is increased, and the interval between the third lens group LG23 and the fourth lens group LG24 is decreased. The zoom magnification is approximately 2 times (27.9953 mm/14.043 mm≈1.99) as the lens assembly 2 of the second embodiment zooms from the wide-angle end (as shown in FIG. 5) to the telephoto end (as shown in FIG. 6). The reflective element P2 can operate with the axis AX2 or the direction perpendicular to the axis AX2 as an axis, thereby performing optical image stabilization. The second lens group LG22 and the third lens group LG23 can move along the axis AX2, thereby performing auto focus. According to the foregoing, wherein: the 4-2 lens L27 is with positive refractive power; the 4-3 lens L28 is a biconcave lens, wherein the object side surface S219 is a concave surface; and both of the object side surface S221 and image side surface S222 of the optical filter OF2 are plane surfaces. The preferred embodiment of the present invention can be achieved when the lens assembly satisfies conditions (1)-(8), refractive power distribution, and surface shape.

With the above design of the lenses, reflective element P2, stop ST2, and at least one of the conditions (1)-(8) satisfied, the lens assembly 2 can have an effective shortened total lens length, an effective decreased thickness, an effective increased resolution, an effective corrected aberration, an effective corrected chromatic aberration, and a realized optical zoom function. Table 4 shows the optical specification of the lens assembly 2 in FIG. 5, and FIG. 6 when the lens assembly 2 is at the wide-angle end and telephoto end, respectively.

TABLE 4

Wide-angle End
Effective Focal Length = 14.043 mm F-number = 2.38
Total Lens Length = 24.49 mm Field of View = 24.89 degrees
Telephoto End
Effective Focal Length = 27.9953 mm F-number = 4.75
Total Lens Length = 24.49 mm Field of View = 12.64 degrees

| Surface Number | Radius of Curvature (mm) | Thickness (mm) | Nd | Vd | Effective Focal Length (mm) | Remark |
|---|---|---|---|---|---|---|
| S21 | ∞ | 2.929 | 2 | 28.3 | | P2 |
| S22 | ∞ | 2.929 | 2 | 28.3 | | |
| S23 | ∞ | 1.1 | | | | |
| S24 | ∞ | −0.1 | | | | ST2 |
| S25 | 6.898001 | 0.9813051 | 2.00 | 19.31 | 77.3177 | L21 |
| S26 | 7.024438 | 7.2509(w) 0.9693(t) | | | | |
| S27 | 4.1899 | 1.632164 | 1.52 | 70.00 | 11.9053 | L22 |
| S28 | 10.94733 | 0 | | | | |
| S29 | 10.94733 | 0.6893653 | 2.00 | 19.31 | −15.785 | L23 |
| S210 | 6.287848 | 1.8930(w) 11.6963(t) | | | | |
| S211 | −4.059965 | 1.361447 | 1.63 | 21.50 | −16.2197 | L24 |
| S212 | −7.534218 | 0.1820348 | | | | |
| S213 | 16.15653 | 2.040744 | 1.53 | 56.11 | 6.19619 | L25 |
| S214 | −4.004983 | 3.54279(w) 0.023119(t) | | | | |
| S215 | −2.850012 | 2.080596 | 1.67 | 19.23 | 4.4397 | L26 |
| S216 | −1.894755 | 0.0292779 | | | | |
| S217 | −1.877041 | 0.9786429 | 1.53 | 56.09 | 7.95297 | L27 |
| S218 | −1.541062 | 0.05585171 | | | | |
| S219 | −2.322235 | 0.8059447 | 1.53 | 56.09 | −2.88541 | L28 |
| S220 | 5.21908 | 0.7 | | | | |
| S121 | ∞ | 0.21 | 1.52 | 57.1 | | OF2 |
| S122 | ∞ | 0.060472 | | | | | w: Wide-angle End
t: Telephoto End

The definition of aspheric surface sag z of each aspheric lens in table 4 is the same as that of in Table 1, and is not described here again. In the second embodiment, the conic constant k and the aspheric coefficients A, B, C, D, E, F, G of each aspheric lens are shown in Table 5.

TABLE 5

| Surface Number | k | A | B | C | D | E | F | G |
|---|---|---|---|---|---|---|---|---|
| S25 | 2.43 | −5.05E−04 | −5.36E−05 | 3.46E−06 | −6.91E−07 | 2.71E−08 | −2.11E−09 | 4.05E−11 |
| S26 | 1.79 | 2.07E−05 | −3.80E−05 | 6.41E−06 | −2.18E−07 | −1.37E−07 | 1.69E−08 | −6.25E−10 |
| S27 | 0.46 | 6.68E−05 | −5.85E−05 | 6.21E−06 | −1.58E−06 | 9.04E−08 | 3.36E−08 | −4.11E−09 |
| S28 | 13.26 | −4.88E−04 | 3.82E−04 | −3.47E−05 | −9.57E−06 | 4.69E−07 | 1.80E−07 | −1.51E−08 |
| S29 | 13.26 | −4.88E−04 | 3.82E−04 | −3.47E−05 | −9.57E−06 | 4.69E−07 | 1.80E−07 | −1.51E−08 |
| S210 | 3.41 | 4.07E−04 | 3.91E−04 | −5.14E−05 | −1.70E−06 | 2.46E−07 | 2.33E−07 | −2.38E−08 |
| S211 | −4.94 | −5.26E−03 | 1.42E−04 | −2.19E−04 | 1.40E−04 | 7.31E−05 | 1.61E−05 | −1.26E−06 |
| S212 | −0.15 | 1.32E−03 | 7.91E−04 | 2.95E−04 | −6.07E−05 | 1.19E−05 | −2.72E−06 | 3.01E−07 |
| S213 | 36.83 | −7.55E−03 | 3.15E−04 | 8.41E−05 | −3.28E−07 | −4.74E−06 | 3.76E−07 | 3.89E−09 |
| S214 | −7.31 | −1.43E−02 | 1.22E−03 | −1.56E−04 | 5.54E−06 | 7.65E−07 | −1.25E−07 | −1.06E−10 |
| S215 | −6.67 | −1.55E−02 | 4.23E−04 | −7.22E−04 | 1.89E−05 | 1.03E−05 | −1.76E−06 | 9.75E−08 |
| S216 | −0.79 | 1.21E−02 | −1.08E−03 | 5.22E−05 | 9.98E−05 | −2.41E−05 | 2.10E−06 | −6.41E−08 |
| S217 | −0.65 | 1.17E−02 | −1.02E−04 | 1.81E−04 | 2.74E−05 | −5.71E−06 | 2.37E−07 | 7.65E−09 |
| S218 | −8.48 | −5.93E−03 | 2.35E−03 | −6.76E−04 | 3.66E−05 | 1.14E−05 | −2.09E−06 | 1.28E−07 |
| S219 | −17.95 | −1.22E−02 | 2.14E−03 | −3.60E−04 | 1.22E−05 | −6.71E−06 | 2.03E−06 | −1.28E−07 |
| S220 | −199.22 | −3.74E−02 | 1.16E−02 | −1.97E−03 | 1.61E−04 | −1.69E−06 | −4.82E−07 | 1.54E−08 |

Table 6 shows the parameters and condition values for conditions (1)-(8) in accordance with the second embodiment of the invention. It can be seen from Table 6 that the lens assembly 2 of the second embodiment satisfies the conditions (1)-(8).

TABLE 6

| | | | | | |
|---|---|---|---|---|---|
| DG12W | 7.2509 mm | DG12T | 0.9693 mm | DG23W | 1.8930 mm |
| DG23T | 11.6963 mm | DG34W | 3.54279 mm | DG34T | 0.023119 mm |
| Dmax | 6.126256 mm | Dp | 7.603904 mm | | |
| (DG12W − DG12T)/(fT − fW) | 0.4502 | (DG23T − DG23W)/(fT − fW) | 0.7026 | | |
| (DG34W − DG34T)/(fT − fW) | 0.2523 | DG12W/TTL | 0.2960 | | |
| DG34W/TTL | 0.1446 | DG23W/Dmax | 0.3090 | | |
| Dp/Dmax | 1.2412 | TTL/Dmax | 3.9984 | | |

Referring to FIG. 7 and FIG. 8, the lens assembly 3 includes a reflective element P3, a stop ST3, a first lens group LG31, a second lens group LG32, a third lens group LG33, a fourth lens group LG34, and an optical filter OF3, all of which are arranged in order from an object side to an image side along an axis AX3. The reflective element P3 is a prism and includes an incident surface S31, a reflective surface S32, and an exit surface S33. The first lens group LG31 includes a 1-1 lens L31. The second lens group LG32 includes a 2-1 lens L32 and a 2-2 lens L33, both of which are arranged in order from the object side to the image side along the axis AX3. The third lens group LG33 includes a 3-1 lens L34 and a 3-2 lens L35, both of which are arranged in order from the object side to the image side along the axis AX3. The fourth lens group LG34 includes a 4-1 lens L36, a 4-2 lens L37, and a 4-3 lens L38, all of which are arranged in order from the object side to the image side along the axis AX3. The incident surface S31 faces an object (not shown) along the vertical direction of the axis AX3 In operation, a light from the object (not shown) incident on the reflective element P3 from the incident surface S31 first, then reflected by the reflective surface S32 to change propagation direction, then sequentially passes through the exit surface S33, the stop ST3, the first lens group LG31, the second lens group LG32, the third lens group LG33, the fourth lens group LG34, and the optical filter OF3, and finally imaged on an image plane IMA3. The image plane IMA3 is perpendicular to the incident surface S31 and parallel to the exit surface S33. In the third embodiment, the reflective element P3 is a prism and is not limited thereto. The reflective element P3 can also be a mirror and only includes a reflective surface. In the above description, the object side and the incident surface S31 are on the same side.

When the lens assembly 3 zooms from the wide-angle end (as shown in FIG. 7) to the telephoto end (as shown in FIG. 8), the first lens group LG31 is fixed, the second lens group LG32 moves to the object side along the axis AX3, the third lens group LG33 moves to the image side along the axis AX3, and the fourth lens group LG34 is fixed, so that the interval between the first lens group LG31 and the second lens group LG32 is decreased, the interval between the second lens group LG32 and the third lens group LG33 is increased, and the interval between the third lens group LG33 and the fourth lens group LG34 is decreased. The zoom magnification is approximately 2 times (27.9998 mm/14.586 mm≈1.92) as the lens assembly 3 of the third embodiment zooms from the wide-angle end (as shown in FIG. 7) to the telephoto end (as shown in FIG. 8). The reflective element P3 can operate with the axis AX3 or the direction perpendicular to the axis AX3 as an axis, thereby performing optical image stabilization. The second lens group LG32 and the third lens group LG33 can move along the axis AX3, thereby performing auto focus. According to the foregoing, wherein: the 4-2 lens L37 is with negative refractive power; the 4-3 lens L38 is a meniscus lens, wherein the object side surface S319 is a convex surface; and both of the object side surface S321 and image side surface S322 of the optical filter OF3 are plane surfaces. The preferred embodiment of the present invention can be achieved when the lens assembly satisfies conditions (1)-(8), refractive power distribution, and surface shape.

With the above design of the lenses, reflective element P3, stop ST3, and at least one of the conditions (1)-(8) satisfied, the lens assembly 3 can have an effective shortened total lens length, an effective decreased thickness, an effective increased resolution, an effective corrected aberration, an effective corrected chromatic aberration, and a realized optical zoom function. Table 7 shows the optical specification of the lens assembly 3 in FIG. 7, and FIG. 8 when the lens assembly 3 is at the wide-angle end and telephoto end, respectively.

TABLE 7

Wide-angle End
Effective Focal Length = 14.586 mm F-number = 2.47
Total Lens Length = 24.7196 mm Field of View = 24 degrees
Telephoto End
Effective Focal Length = 27.9998 mm F-number = 4.74
Total Lens Length = 24.7196 mm Field of View = 12.64 degrees

| Surface Number | Radius of Curvature (mm) | Thickness (mm) | Nd | Vd | Effective Focal Length (mm) | Remark |
|---|---|---|---|---|---|---|
| S31 | ∞ | 2.929 | 2 | 28.3 | | P3 |
| S32 | ∞ | 2.929 | 2 | 28.3 | | |
| S33 | ∞ | 1 | | | | |
| S34 | ∞ | 0 | | | | ST3 |
| S35 | 8.111099 | 1.270017 | 2.00 | 19.32 | 189.089 | L31 |
| S36 | 7.803695 | 6.4803(w) 0.8(t) | | | | |
| S37 | 6.398891 | 1.443704 | 1.59 | 67.29 | 12.7145 | L32 |
| S38 | 37.7304 | 0.05194802 | | | | |
| S39 | 12.46823 | 1.371705 | 2.00 | 19.32 | −21.4414 | L33 |
| S310 | 7.477756 | 1.7354(w) 11.78691(t) | | | | |
| S311 | −4.605034 | 1.514006 | 1.65 | 21.51 | −20.926 | L34 |
| S312 | −7.830348 | 0.04982432 | | | | |
| S313 | 47.92787 | 1.599928 | 1.54 | 55.95 | 7.86836 | L35 |
| S314 | −4.660611 | 4.506993(w) 0.135805(t) | | | | |
| S315 | −3.107075 | 1.380529 | 1.67 | 19.24 | 9.89822 | L36 |
| S316 | −2.504388 | 0.07681587 | | | | |
| S317 | −3.004398 | 0.8500296 | 1.54 | 55.95 | −7.10132 | L37 |
| S318 | −14.70655 | 0.1336846 | | | | |
| S319 | 6.742956 | 0.9449519 | 1.54 | 55.95 | −20.0728 | L38 |
| S320 | 3.967171 | 1 | | | | |
| S321 | ∞ | 0.21 | 1.52 | 57.1 | | OF3 |
| S322 | ∞ | 0.09975624 | | | | | w: Wide-angle End
t: Telephoto End

The definition of aspheric surface sag z of each aspheric lens in table 7 is the same as that of in Table 1, and is not described here again. In the third embodiment, the conic constant k and the aspheric coefficients A, B, C, D, E, F, G of each aspheric lens are shown in Table 8.

TABLE 8

| Surface Number | k | A | B | C | D | E | F | G |
|---|---|---|---|---|---|---|---|---|
| S35 | 1.14 | −5.29E−05 | −1.81E−05 | 1.64E−06 | −2.43E−07 | 5.01E−09 | 3.03E−10 | −9.20E−12 |
| S36 | 0.75 | 7.84E−05 | 2.11E−06 | −2.44E−06 | −2.61E−08 | −9.40E−11 | −9.82E−11 | 3.12E−11 |
| S37 | 0.42 | −8.08E−07 | 9.79E−06 | 3.54E−06 | 3.08E−07 | 4.29E−08 | 4.27E−09 | −3.94E−10 |
| S38 | −998.30 | 5.39E−04 | 1.31E−05 | 1.62E−05 | 1.55E−06 | 7.83E−08 | −2.46E−08 | −2.28E−10 |
| S39 | −12.43 | −1.48E−04 | 7.94E−05 | 1.39E−06 | −5.50E−07 | 1.73E−08 | 2.68E−09 | −1.54E−09 |
| S310 | 0.48 | −1.22E−04 | 2.17E−05 | −1.95E−05 | 7.10E−07 | 1.62E−07 | 4.46E−10 | −2.84E−09 |

TABLE 8-continued

| Surface Number | k | A | B | C | D | E | F | G |
|---|---|---|---|---|---|---|---|---|
| S311 | −7.30 | −9.53E−03 | 1.60E−03 | −2.81E−04 | 1.29E−05 | 2.71E−06 | −3.99E−07 | 3.33E−09 |
| S312 | −0.17 | 1.07E−03 | 2.31E−04 | 8.49E−05 | −2.82E−05 | 2.6069E−06 | −4.00E−08 | −5.16E−09 |
| S313 | 193.61 | −2.07E−03 | 2.38E−04 | −1.86E−05 | −3.12E−07 | −2.12E−07 | −3.09E−09 | 7.65E−10 |
| S314 | −6.33 | −7.95E−03 | 3.97E−04 | −2.64E−05 | −3.85E−07 | 2.49E−07 | −3.22E−08 | 3.44E−10 |
| S315 | −7.58 | −8.45E−03 | 1.77E−03 | −2.83E−04 | 1.81E−05 | 4.98E−06 | −3.20E−07 | 2.85E−08 |
| S316 | −0.58 | 8.46E−03 | −6.58E−04 | 4.47E−05 | 1.99E−05 | −5.10E−06 | 4.12E−07 | −8.62E−09 |
| S317 | 0.001 | −7.13E−04 | 3.20E−04 | 6.09E−05 | 1.79E−05 | −2.12E−06 | −8.98E−08 | 1.65E−08 |
| S318 | 17.62 | 4.90E−04 | −4.64E−04 | 3.58E−05 | −4.60E−06 | 1.05E−06 | −2.75E−07 | 1.94E−08 |
| S319 | −128.77 | −2.35E−02 | 2.31E−03 | −1.62E−04 | 2.31E−05 | −4.23E−06 | 2.32E−07 | 3.67E−09 |
| S320 | −55.35 | −2.27E−02 | 1.61E−03 | 3.08E−05 | 1.11E−07 | −6.66E−07 | −3.25E−09 | 3.31E−09 |

Table 9 shows the parameters and condition values for conditions (1)-(8) in accordance with the third embodiment of the invention. It can be seen from Table 9 that the lens assembly 3 of the third embodiment satisfies the conditions (1)-(8).

TABLE 9

| DG12W | 6.4803 mm | DG12T | 0.8 mm | DG23W | 1.7354 mm |
|---|---|---|---|---|---|
| DG23T | 11.78691 mm | DG34W | 4.506993 mm | DG34T | 0.135805 mm |
| Dmax | 5.9 mm | Dp | 7.657453 mm | | |
| (DG12W − DG12T)/(fT − fW) | 0.4235 | (DG23T − DG23W)/(fT − fW) | 0.7493 | | |
| (DG34W − DG34T)/(fT − fW) | 0.3259 | DG12W/TTL | 0.2622 | | |
| DG34W/TTL | 0.1823 | DG23W/Dmax | 0.2941 | | |
| Dp/Dmax | 1.2979 | TTL/Dmax | 4.1898 | | |

In the above embodiment, only one reflective element is disposed between the object side and the first lens group. However, it can be understood that another reflective element can also be added between the first lens group and the fourth lens group, or between the fourth lens group and the image side, that is, one reflective element is disposed between the object side and the first lens group, another reflective element is disposed between the first lens group and the fourth lens group or between the fourth lens group and the image side. In other words, the reflective element can be disposed between the object side and the image side, and falls into the scope of the invention.

In the above mentioned first and second embodiments, the object (not shown) is disposed on the object side and the image is formed on the image side. Alternatively, the object (not shown) can be disposed on the opposite side of the image side, so that it directly faces the reflective surface of the reflective element and images on the image side, and falls into the scope of the invention. In the above third embodiment, the object (not shown) is disposed in the vertical direction of the axis to directly face the incident surface of the reflective element and is imaged on the image side. Alternatively, the object (not shown) can be disposed on the object side to directly face the reflective surface of the reflective element and imaged on the image side, and falls into the scope of the invention.

The present invention provides another lens assembly including a first lens group, a second lens group, a third lens group, a fourth lens group, a first annular body, and a second annular body. The first lens group is with negative refractive power. The second lens group is with positive refractive power. The third lens group is with positive power. The fourth lens group is with negative power. The first lens group, the second lens group, the third lens group, and the fourth lens group are arranged in order from an object side to an image side along an axis. Intervals between the lens groups can be changed to make the lens assembly zooming from a wide-angle end to a telephoto end. The first lens group is fixed when the lens assembly zooms. The first annular body is disposed between the first lens group and the fourth lens group, wherein the first annular body has stop function when the lens assembly is at high zoom magnification. The second annular body is disposed between the first lens group and the fourth lens group, wherein the second annular body has stop function when the lens assembly is at low zoom magnification.

The present invention provides yet another lens assembly including a first lens group, a second lens group, a third lens group, and a fourth lens group. The first lens group is with refractive power. The second lens group is with refractive power. The third lens group is with refractive power. The fourth lens group is with refractive power. A light from an object sequentially passes through the first lens group, the second lens group, the third lens group, and the fourth lens group to an image side along an axis. The lens assembly further includes a reflective element disposed between an object side and the image side along the axis, wherein the reflective element includes a reflective surface. Intervals between the lens groups can be changed to make the lens assembly zooming from a wide-angle end to a telephoto end.

The focal length of the lens assembly of the present invention is a variable focal length, and the zoom magnification of each embodiment of the lens assembly is about 2.5 times from the wide-angle end to the telephoto end. When the lens assembly is equipped with another fixed-focus wide-angle lens in a mobile phone, tablet or other image capture apparatus, the effective focal length of the lens assembly of the present invention has a zoom magnification of 4 to 10 times relative to the effective focal length of the fixed-focus wide-angle lens. Taking the lens assembly of the fourth embodiment of the present invention as an example, the effective focal length at the wide-angle end is 11.69 mm, the effective focal length at the telephoto end is 28.21 mm, and the zoom magnification is 2.41 (28.21 mm/11.69 mm=2.41) times from the wide-angle end to the telephoto end, which is approximately 2.5 times. When equipped with a fixed-focus wide-angle lens having an effective focal length of 2.92 mm in a mobile phone, tablet or other image capture apparatus and let the effective focal length of the fixed-focus wide-angle lens as the magnification basis, so the lens assembly of the present invention has a zoom magnification ranging from 4 (11.69 mm/2.92 mm=4.003≈4) times to 10 (28.21 mm/2.92 mm=9.661≈10) times relative to a fixed-focus wide-angle lens with an effective focal length of 2.91 mm. However, the present invention is not limited thereto. When another fixed-focus wide-angle lens is equipped together in a mobile phone, tablet or other image capture apparatus, the zoom ratio is not limited to 4 times to 10 times, and can have different zoom ratio range. Referring to Table 10, Table 12, Table 13, Table 15, Table 16, and Table 18, wherein Table 10, Table 13, and Table 16 show optical specification in accordance with a fourth, fifth, and sixth embodiments of the invention, respectively and Table 11, Table 14, and Table 17 show aspheric coefficients of each aspheric lens in Table 10, Table 13, and Table 16, respectively.

Figure 9:
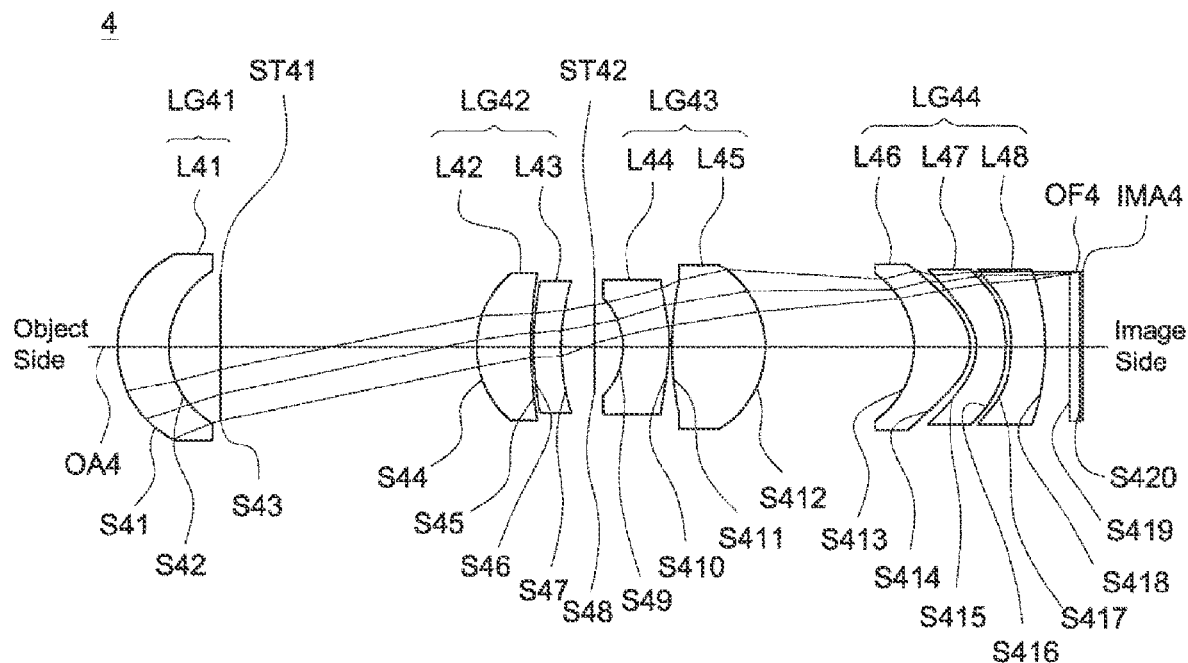
FIG. 9 and FIG. 10 are lens layout and optical path diagrams of a lens assembly at a wide-angle end and a telephoto end in accordance with a fourth embodiment of the invention, respectively.
Figure 10:
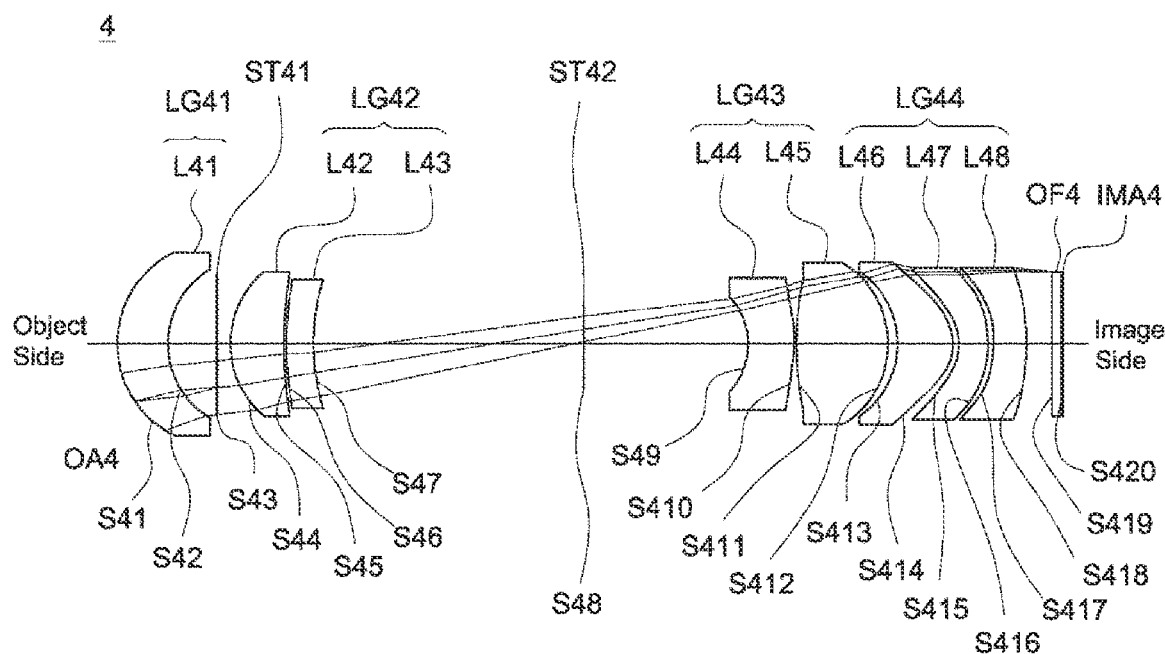
Figure 12A:
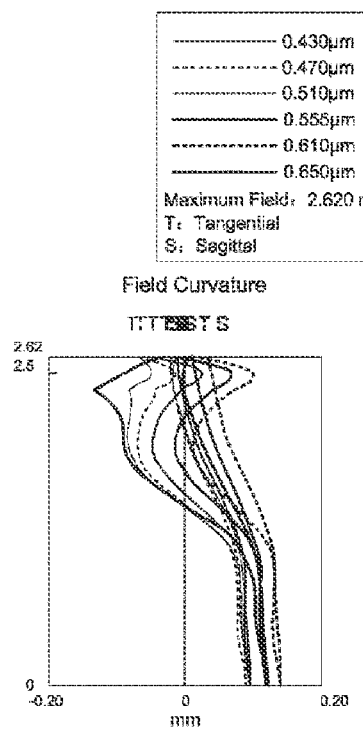
FIG. 12A, FIG. 12B, and FIG. 12C depict a field curvature diagram, a distortion diagram, and a modulation transfer function diagram of the lens assembly at the telephoto end in accordance with the fourth embodiment of the invention, respectively.
Figure 12B:
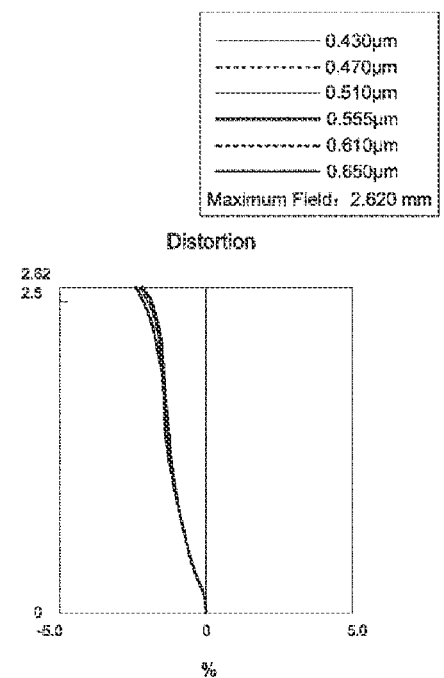
Figure 12C:
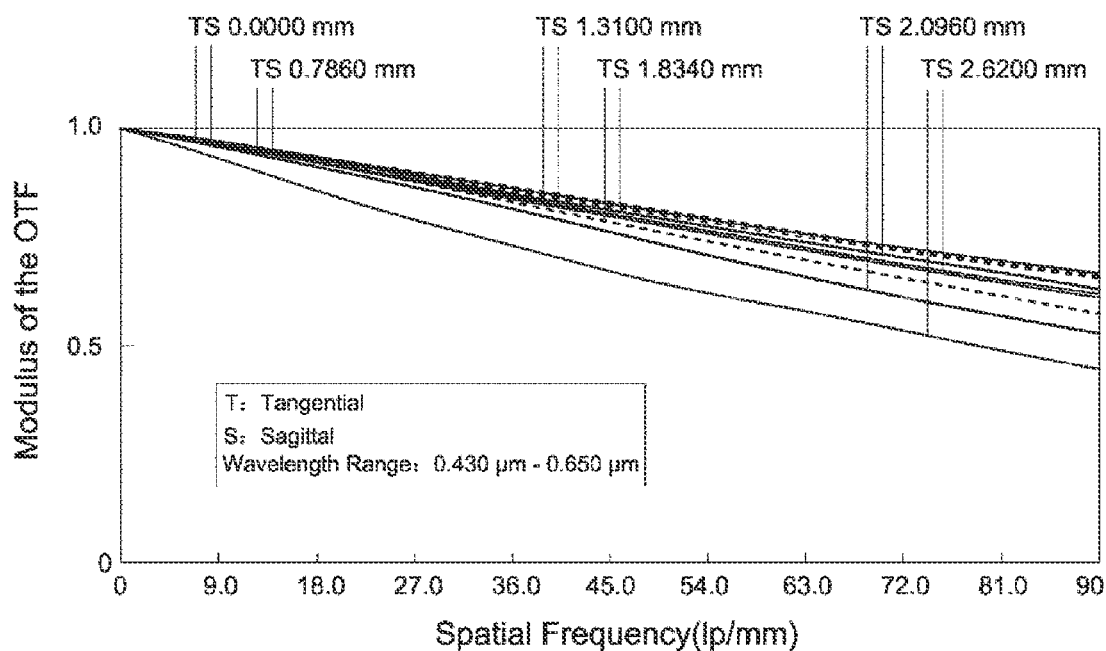
Figure 13:
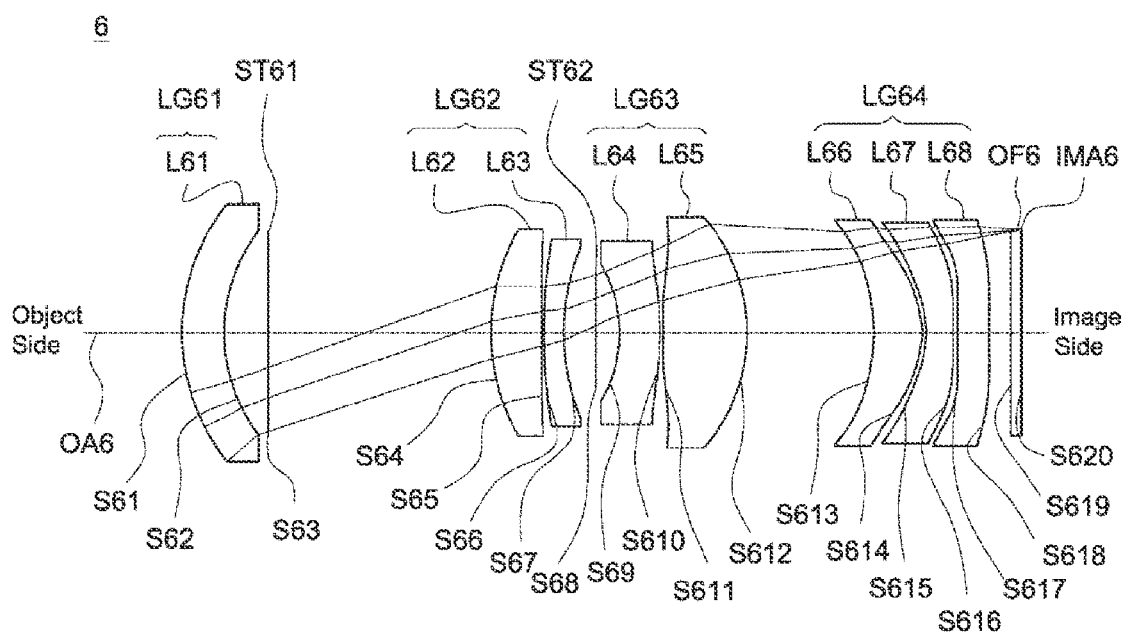
FIG. 13 and FIG. 14 are lens layout and optical path diagrams of a lens assembly at a wide-angle end and a telephoto end in accordance with a sixth embodiment of the invention, respectively.
Figure 14:
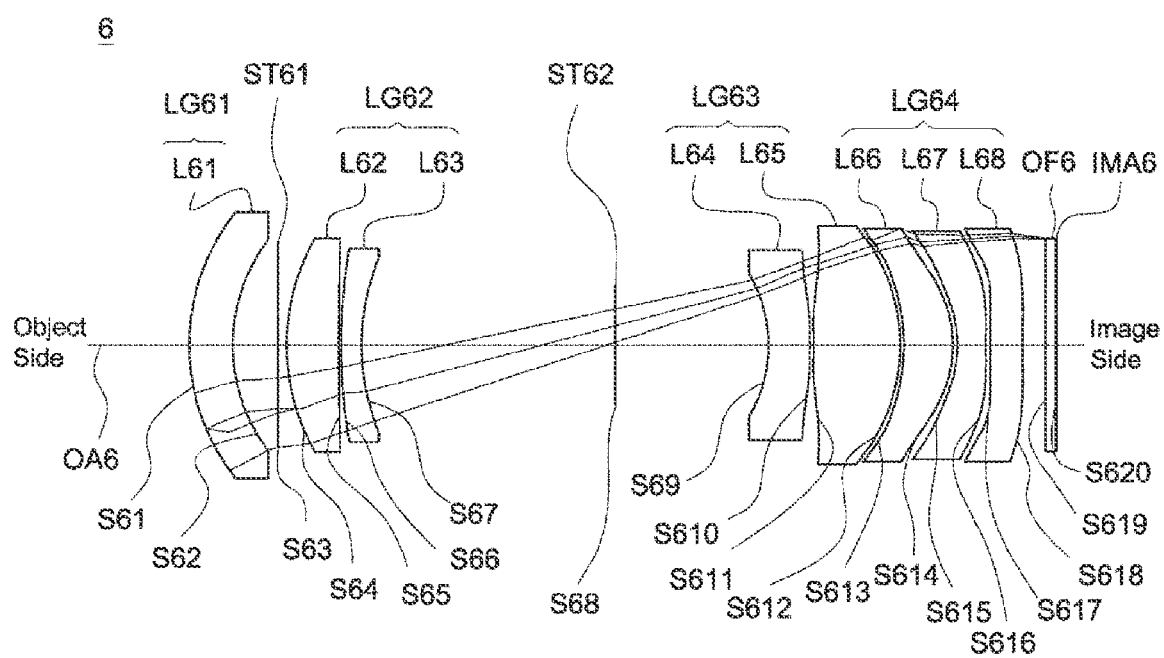

FIG. 9 and FIG. 10 are lens layout and optical path diagrams of a lens assembly at a wide-angle end and a telephoto end in accordance with a fourth embodiment of the invention, respectively. FIG. 13 and FIG. 14 are lens layout and optical path diagrams of a lens assembly at a wide-angle end and a telephoto end in accordance with a sixth embodiment of the invention, respectively. The lens layout and optical path diagram of a fifth embodiment similar to that of the fourth embodiment, so that the illustration is omitted. However, the content of the fifth embodiment below is the same as or similar to those of the fourth and sixth embodiments. The first lens groups LG41, LG61 are with negative refractive power and include 1-1 lenses L41, L61, respectively. The second lens groups LG42, LG62 are with positive refractive power and include 2-1 lenses L42, L62 and 2-2 lenses L43, L63, respectively. The third lens groups LG43, LG63 are with positive refractive power and include 3-1 lenses L44, L64 and 3-2 lenses L45, L65, respectively. The fourth lens groups LG44, LG64 are with negative refractive power and include 4-1 lenses L46, L66, 4-2 lenses L47, L67, and 4-3 lenses L48, L68, respectively. The first annular bodies ST41, ST61 include a first hole, respectively. The second annular bodies ST42, ST62 include a second hole, respectively.

The 1-1 lenses L41, L61 are meniscus lenses with negative refractive power and made of glass material, wherein the object side surfaces S41, S61 are convex surfaces, the image side surfaces S42, S62 are concave surfaces, and both of the object side surfaces S41, S61 and image side surfaces S42, S62 are aspheric surfaces. The 2-1 lenses L42, L62 are meniscus lenses with positive refractive power and made of glass material, wherein the object side surfaces S44, S64 are convex surfaces, the image side surfaces S45, S65 are concave surfaces, and both of the object side surfaces S44, S64 and image side surfaces S45, S65 are aspheric surfaces. The 2-2 lenses L43, L63 are meniscus lenses with negative refractive power and made of glass material, wherein the object side surfaces S46, S66 are convex surfaces, the image side surfaces S47, S67 are concave surfaces, and both of the object side surfaces S46, S66 and image side surfaces S47, S67 are aspheric surfaces. The 3-1 lenses L44, L64 are meniscus lenses with negative refractive power and made of plastic material, wherein the object side surfaces S49, S69 are concave surfaces, the image side surfaces S410, S610 are convex surfaces, and both of the object side surfaces S49, S69 and image side surfaces S410, S610 are aspheric surfaces. The 3-2 lenses L45, L65 are biconvex lenses with positive refractive power and made of plastic material, wherein the object side surfaces S411, S611 are convex surfaces, the image side surfaces S412, S612 are convex surfaces, and both of the object side surfaces S411, S611 and image side surfaces S412, S612 are aspheric surfaces. The 4-1 lenses L46, L66 are meniscus lenses with positive refractive power and made of plastic material, wherein the object side surfaces S413, S613 are concave surfaces, the image side surfaces S414, S614 are convex surfaces, and both of the object side surfaces S413, S613 and image side surfaces S414, S614 are aspheric surfaces. The 4-2 lenses L47, L67 are meniscus lenses with negative refractive power and made of plastic material, wherein the object side surfaces S415, S615 are concave surfaces, the image side surfaces S416, S616 are convex surfaces, and both of the object side surfaces S415, S615 and image side surfaces S416, S616 are aspheric surfaces. The 4-3 lenses L48, L68 are with negative refractive power and made of plastic material, wherein the image side surfaces S418, S618 are concave surfaces, and both of the object side surfaces S417, S617 and image side surfaces S418, S618 are aspheric surfaces. The fifth embodiment is the same as above.

In addition, the lens assemblies of the fourth to sixth embodiments satisfy at least one of the conditions (1)-(6), (8), and the following conditions (9)-(35):

$$0.2 < ST1\ \text{Max}D/ST2\ \text{Max}D < 3.2; \quad (9)$$

$$3 < TC12\text{wide}/TC12\text{tele} < 6; \quad (10)$$

$$4 < TTL1/ST1\ \text{Max}D < 6; \quad (11)$$

$$7 < TTL1/ST2\ \text{Max}D < 9; \quad (12)$$

$$0.5 < D\text{max}/ST1\ \text{Max}D < 3; \quad (13)$$

$$1 < D\text{max}/ST2\ \text{Max}D < 3.5; \quad (14)$$

$$0 < ST1\ \text{Max}D/(TC12\text{wide}-TC12\text{tele}) < 1.5; \quad (15)$$

$$0 < ST2\ \text{Max}D/(TC12\text{wide}-TC12\text{tele}) < 1; \quad (16)$$

$$0.6 < ST1\ \text{Max}D/(TC34\text{wide}-TC34\text{tele}) < 2.5; \quad (17)$$

$$0.1 < ST2\ \text{Max}D/(TC34\text{wide}-TC34\text{tele}) < 1.8; \quad (18)$$

$$-1 < (TC12\text{wide}-TC12\text{tele})/(fW-fT) < 0 \quad (19)$$

$$2 < f/\text{STOPactive}D < 6; \quad (20)$$

$$0.8\ \text{mm} < \text{STOPactive}D/F\ \# < 2.5\ \text{mm}; \quad (21)$$

$$1.5\ \text{degree}/mm < FOV/\text{STOPactive}D < 8.5\ \text{degree}/mm; \quad (22)$$

$$0.7 < EPD/\text{STOPactive}D < 2; \quad (23)$$

$$0.3 < ST1\ \text{Max}D/TC12 < 4; \quad (24)$$

$$0.1 < ST2\ \text{Max}D/TC12 < 2.9; \quad (25)$$

$$1 < f/ST1\ \text{Max}D < 6; \quad (26)$$

$$2 < f/ST2\ \text{Max}D < 9; \quad (27)$$

$$0.7\ \text{mm} < ST1\ \text{Max}D/F\ \# < 3\ \text{mm}; \quad (28)$$

$$0.3\ \text{mm} < ST2\ \text{Max}D/F\ \# < 1.1\ \text{mm}; \quad (29)$$

$$0.8\ \text{degree}/mm < FOV/ST1\ \text{Max}D < 5.5\ \text{degree}/mm; \quad (30)$$

$$1.9\ \text{degree}/mm < FOV/ST2\ \text{Max}D < 8.5\ \text{degree}/mm; \quad (31)$$

$$0 < ST1\ \text{Max}D/EPD < 3; \quad (32)$$

$$0.7 < EPD/ST2\ \text{Max}D < 2.8; \quad (33)$$

$0.1 < TCs1g2/TCs1g1 < 5.5;$ (34)

$0.7 < TCs2g2/TCs2g3 < 3;$ (35)

wherein ST1 MaxD is an effective optical diameter of the first annular bodies ST41, ST61 for the fourth to sixth embodiments, ST2 MaxD is an effective optical diameter of the second annular bodies ST42, ST62 for the fourth to sixth embodiments, TC12wide is respectively an interval from the first lens groups LG41, LG61 to the second lens groups LG42, LG62 at the wide-angle end along the optical axes OA4, OA6 for the fourth to sixth embodiments, TC12tele is respectively an interval from the first lens groups LG41, LG61 to the second lens groups LG42, LG62 at the telephoto end along the optical axes OA4, OA6 for the fourth to sixth embodiments, TTL1 is respectively an interval from the object side surfaces S41, S61 of the 1-1 lenses L41, L61 (the lenses closest to the object side) to the image planes IMA4, IMA6 along the optical axes OA4, OA6 for the fourth to sixth embodiments, Dmax is a maximum effective optical diameter of all the lenses of the lens assemblies 4, 6 for the fourth to sixth embodiments, TC34wide is respectively an interval from the third lens groups LG43, LG63 to the fourth lens groups LG44, LG64 at the wide-angle end along the optical axes OA4, OA6 for the fourth to sixth embodiments, TC34tele is respectively an interval from the third lens groups LG43, LG63 to the fourth lens groups LG44, LG64 at the telephoto end along the optical axes OA4, OA6 for the fourth to sixth embodiments, fW is an effective focal length of the lens assemblies 4, 6 at the wide-angle end for the fourth to sixth embodiments, fT is an effective focal length of the lens assemblies 4, 6 at the telephoto end for the fourth to sixth embodiments, STOPactiveD is an effective optical diameter of the annular body with the stop function of the lens assemblies 4, 6 at different effective focal length for the fourth to sixth embodiments, f is an effective focal length of the lens assemblies 4, 6 for the fourth to sixth embodiments, F # is a F-number of the lens assemblies 4, 6 for the fourth to sixth embodiments, FOV is a field of view of the lens assemblies 4, 6 for the fourth to sixth embodiments, EPD is an entrance pupil diameter of the lens assemblies 4, 6 for the fourth to sixth embodiments, TC12 is respectively an interval from the first lens groups LG41, LG61 to the second lens groups LG42, LG62 along the optical axes OA4, OA6 for the fourth to sixth embodiments, TCs1g1 is respectively an interval from the first annular bodies ST41, ST61 to the first lens group LG41, LG61 along the optical axes OA4, OA6 for the fourth to sixth embodiments, TCs1g2 is respectively an interval from the first annular bodies ST41, ST61 to the second lens group LG42, LG62 along the optical axes OA4, OA6 for the fourth to sixth embodiments, TCs2g2 is respectively an interval from the second annular bodies ST42, ST62 to the second lens group LG42, LG62 along the optical axes OA4, OA6 for the fourth to sixth embodiments, and TCs2g3 is respectively an interval from the second annular bodies ST42, ST62 to the third lens group LG43, LG63 along the optical axes OA4, OA6 for the fourth to sixth embodiments. With the lens assemblies 4, 6 satisfying at least one of the above conditions (1)-(6), (8), (9)-(35), the total lens length can be effectively shortened, the thickness can be effectively shortened, the resolution can be effectively increased, the aberration can be effectively corrected, the chromatic aberration can be effectively corrected, and optical zoom function can be realized. The preferred embodiment of the present invention can be achieved when the lens assembly satisfies at least one of the conditions (1)-(6), (8), and (9)-(35). It is noted that the above content is still applicable to the fifth embodiment even when no figure is provided to depict the fifth embodiment and no reference symbols are provided to indicate the elements of the lens assembly of the fifth embodiment.

A detailed description of a lens assembly in accordance with a fourth embodiment of the invention is as follows. Referring to FIG. 9 and FIG. 10, the lens assembly 4 includes a first lens group LG41, a first annular body ST41, a second lens group LG42, a second annular body ST42, a third lens group LG43, a fourth lens group LG44, and an optical filter OF4, all of which are arranged in order from an object side to an image side along an axis OA4. The first lens group LG41 includes a 1-1 lens L41. The second lens group LG42 includes a 2-1 lens L42 and a 2-2 lens L43, both of which are arranged in order from the object side to the image side along the axis OA4. The third lens group LG43 includes a 3-1 lens L44 and a 3-2 lens L45, both of which are arranged in order from the object side to the image side along the axis OA4. The fourth lens group LG44 includes a 4-1 lens L46, a 4-2 lens L47, and a 4-3 lens L48, all of which are arranged in order from the object side to the image side along the axis OA4. In operation, a light from the object side is imaged on an image plane IMA4.

When the lens assembly 4 zooms from the wide-angle end (as shown in FIG. 9) to the telephoto end (as shown in FIG. 10), the first lens group LG41 is fixed, the second lens group LG42 moves to the object side along the axis OA4, the third lens group LG43 moves to the image side along the axis OA4, the fourth lens group LG44 is fixed, the first annular body is fixed, and the second annular body is fixed, so that the interval between the first lens group LG41 and the second lens group LG42 is decreased, the interval between the second lens group LG42 and the third lens group LG43 is increased, and the interval between the third lens group LG43 and the fourth lens group LG44 is decreased. The above mentioned intervals change as the lens assembly zooming from the wide-angle end to the telephoto end can be clearly seen in FIG. 9 and FIG. 10. The zoom magnification is approximately 2.5 times (28.21 mm/11.69 mm≈2.41) as the lens assembly 4 of the fourth embodiment zooms from the wide-angle end (as shown in FIG. 9) to the telephoto end (as shown in FIG. 10).

The first hole of the first annular body ST41 has a fixed size. The second hole of the second annular body ST42 has a fixed size. The aforementioned fixed size means that the value of the hole diameter is fixed. When the lens assembly 4 zooms at a low zoom magnification (zoom magnification is about 1× to 1.25×), the second annular body ST42 has a stop function and the first annular body ST41 does not have a stop function. When the lens assembly 4 zooms at a high zoom magnification (zoom magnification is about 1.5× to 2.5×), the first annular body ST41 has a stop function and the second annular body ST42 does not have a stop function. In other words, when the lens assembly 4 zooms from the wide-angle end to the telephoto end, different annular body can be used as the stop of the lens assembly 4 as the zoom magnification changes. According to the foregoing, wherein: the 4-3 lens L48 is a biconcave lens, wherein the object side surface S417 is a concave surface; and both of the object side surface S419 and image side surface S420 of the optical filter OF4 are plane surfaces. The preferred embodiment of the present invention can be achieved when the lens assembly satisfies conditions (1)-(6), (8), (9)-(35), refractive power distribution, and surface shape.

With the above design of the lenses, first annular body ST41, second annular body ST42, and at least one of the conditions (1)-(6), (8), and (9)-(35) satisfied, the lens assembly 4 can have an effective shortened total lens length, an effective decreased thickness, an effective increased resolution, an effective corrected aberration, an effective corrected chromatic aberration, and a realized optical zoom function. Table 10 shows the optical specification of the lens assembly 4 in FIG. 9, and FIG. 10 when the lens assembly 4 is at the wide-angle end and telephoto end, respectively.

TABLE 10

Wide-angle End
Effective Focal Length = 11.69 mm F-number = 2.6
Total Lens Length = 28.2 mm Field of View = 25.2 degrees
Telephoto End
Effective Focal Length = 28.21 mm F-number = 4.4
Total Lens Length = 28.2 mm Field of View = 10.6 degrees

| Surface Number | Radius of Curvature (mm) | Thickness (mm) | Nd | Vd | Effective Focal Length (mm) | Remark |
|---|---|---|---|---|---|---|
| S41 | 4.53908175 | 1.4476 | 1.9973 | 19.32 | −249.604 | L41 |
| S42 | 3.74527757 | 1.4973 | | | | |
| S43 | ∞ | 7.4676(w) | | | | ST41 |
| | | 0.3510(t) | | | | |
| S44 | 4.72953611 | 1.6807 | 1.51869 | 69.87 | 9.83872 | L42 |
| S45 | 54.9103979 | 0.0342 | | | | |
| S46 | 16.3225003 | 0.7635 | 1.9973 | 19.32 | −16.2027 | L43 |
| S47 | 7.9662517 | 1.0377(w) | | | | |
| | | 8.155(t) | | | | |
| S48 | ∞ | 0.8136(w) | | | | ST42 |
| | | 4.9278(t) | | | | |
| S49 | −2.6610125 | 1.3546 | 1.6355 | 23.97 | −9.44966 | L44 |
| S410 | −5.6939466 | 0.0636 | | | | |
| S411 | 10.4080223 | 2.8301 | 1.5445 | 55.987 | 5.78168 | L45 |
| S412 | −4.0987759 | 4.2544(w) | | | | |
| | | 0.1447(t) | | | | |
| S413 | −3.9675742 | 1.683 | 1.6713 | 19.24 | 5.087 | L46 |
| S414 | −2.1605368 | 0.0479 | | | | |
| S415 | −2.9555932 | 1.0166 | 1.5352 | 56.1 | −13.1718 | L47 |
| S416 | −5.685377 | 0.0871 | | | | |
| S417 | −7.0070098 | 1.0106 | 1.5352 | 56.1 | −7.02615 | L48 |
| S418 | 8.5853521 | 0.84 | | | | |
| S419 | ∞ | 0.21 | 1.521754 | 57.1 | | OF4 |
| S420 | ∞ | 0.0535 | | | | | w: Wide-angle End
t: Telephoto End

The definition of aspheric surface sag z of each aspheric lens in table 10 is the same as that of in Table 1, and is not described here again. In the fourth embodiment, the conic constant k and the aspheric coefficients A, B, C, D, E, F, G of each aspheric lens are shown in Table 11.

TABLE 11

| Surface Number | k | A | B | C | D | E | F | G |
|---|---|---|---|---|---|---|---|---|
| S41 | 0.19 | −3.75E−04 | −3.67E−05 | 1.46E−06 | −3.43E−07 | 4.81E−09 | 1.25E−09 | −9.95E−11 |
| S42 | 0.04 | −4.70E−04 | 7.67E−06 | −1.62E−05 | 9.33E−07 | 1.32E−07 | −2.57E−08 | 8.08E−10 |
| S44 | 0.16 | −2.67E−04 | 3.85E−05 | 2.42E−06 | 1.40E−06 | 5.27E−08 | 1.45E−08 | −1.89E−09 |
| S45 | −75.71 | −8.25E−04 | 1.09E−04 | 1.61E−05 | 3.86E−06 | −2.33E−07 | −6.16E−08 | 7.15E−09 |
| S46 | −24.40 | 4.99E−04 | −4.87E−06 | −3.48E−05 | 1.90E−07 | 1.87E−07 | 3.98E−08 | −4.16E−10 |
| S47 | 2.60 | 3.22E−04 | 8.63E−05 | −9.13E−05 | 3.04E−07 | 1.56E−06 | 2.45E−08 | −4.07E−09 |
| S49 | −2.68 | −3.20E−04 | 7.83E−04 | −5.37E−05 | −2.22E−06 | −1.50E−05 | 8.13E−06 | −1.73E−06 |
| S410 | −4.04 | 3.77E−03 | 9.82E−04 | 1.56E−04 | −3.39E−05 | 2.58E−06 | −1.13E−06 | 1.07E−07 |
| S411 | 5.52 | −6.34E−03 | 9.95E−04 | 5.31E−05 | −1.89E−05 | −1.78E−06 | 5.36E−07 | −3.25E−08 |
| S412 | −4.45 | −8.02E−03 | 2.76E−04 | 1.72E−05 | −5.46E−06 | 3.60E−07 | 1.22E−08 | −2.20E−09 |
| S413 | −8.99 | −7.20E−03 | 6.59E−04 | −7.69E−05 | 1.72E−07 | −7.40E−07 | −5.31E−08 | 1.32E−08 |
| S414 | −1.05 | 6.73E−03 | −6.03E−04 | 4.56E−05 | 4.39E−06 | −1.19E−06 | 1.16E−08 | 3.72E−09 |
| S415 | −0.99 | −1.12E−02 | 1.34E−03 | 5.60E−05 | 8.39E−06 | −4.28E−07 | −2.79E−07 | 2.02E−08 |
| S416 | −44.98 | −1.18E−02 | −1.72E−03 | 2.52E−04 | 7.83E−06 | −1.89E−06 | −2.35E−07 | 1.26E−08 |
| S417 | −21.33 | −1.57E−02 | 2.03E−03 | −2.66E−04 | −3.83E−06 | 1.34E−06 | 3.59E−07 | −3.41E−08 |
| S418 | −298.97 | −3.21E−02 | 7.95E−03 | −8.00E−04 | 2.32E−07 | 3.04E−06 | 1.46E−07 | −1.96E−08 |

Table 12 shows the parameters and condition values for conditions (1)-(6), (8), and (9)-(35) in accordance with the fourth embodiment of the invention. It can be seen from Table 12 that the lens assembly 4 of the fourth embodiment satisfies the conditions (1)-(6), (8), and (9)-(35).

TABLE 12

| ST1MaxD | 5.51 mm(w) | ST2 MaxD | 3.43 mm(w) |
|---|---|---|---|
| | 5.51 mm(t) | | 3.43 mm(t) |

TABLE 12-continued

| | | | |
|---|---|---|---|
| STOPactiveD | 3.43 mm(w) | Dmax | 7 mm(w) |
| | 5.51 mm(t) | | 7 mm(t) |
| EPD | 4.72 mm(w) | TCs1g2 | 7.468 mm(w) |
| | 6.6 mm(t) | | 0.351 mm(t) |
| TCs1g1 | 1.497 mm(w) | TCs2g3 | 0.814 mm(w) |
| | 1.497 mm(t) | | 4.928 mm(t) |
| TCs2g2 | 1.038 mm(w) | TC12wide | 8.964 mm |
| | 8.155 mm(t) | TC12tele | 1.848 mm |
| TC34wide | 4.254 mm | TC34tele | 0.145 mm |
| ST1MaxD/ST2MaxD | 1.61(w) | TTL1/ST1MaxD | 5.12(w) |
| | 1.61(t) | | 5.12(w) |
| TTL1/ST2MaxD | 8.22(w) | Dmax/ST1MaxD | 1.27(w) |
| | 8.22(w) | | 1.27(t) |
| Dmax/ST2MaxD | 2.04(w) | ST1MaxD/ | 0.77(w) |
| | 2.04(t) | (TC12wide − TC12tele) | 0.77(t) |
| ST2MaxD/ | 0.48(w) | ST1MaxD/ | 1.34(w) |
| (TC12wide − TC12tele) | 0.48(t) | (TC34wide − TC34tele) | 1.34(t) |
| ST2MaxD/ | 0.83(w) | (TC12wide − TC12tele)/ | −0.43(w) |
| (TC34wide − TC34tele) | 0.83(t) | (fW − fT) | −0.43(t) |
| f/STOPactiveD | 3.41(w) | STOPactiveD/F# | 1.32 mm(w) |
| | 5.12(t) | | 1.25 mm(t) |
| FOV/STOPactiveD | 7.35 degree/mm(w) | EPD/STOPactiveD | 1.38(w) |
| | 1.92 degree/mm(t) | | 1.20(t) |
| ST1MaxD/TC12 | 0.61(w) | ST2MaxD/TC12 | 0.38(w) |
| | 2.98(t) | | 1.86(t) |
| f/ST1MaxD | 2.12(w) | f/ST2MaxD | 3.41(w) |
| | 5.12(t) | | 8.22(t) |
| ST1MaxD/F# | 2.12 mm(w) | ST2MaxD/F# | 1.32 mm(w) |
| | 1.25 mm(t) | | 0.78 mm(t) |
| FOV/ST1MaxD | 4.57 degree/mm(w) | ST1MaxD/EPD | 1.17(w) |
| | 1.92 degree/mm(t) | | 0.83(t) |
| FOV/ST2MaxD | 7.35 degree/mm(w) | EPD/ST2MaxD | 1.38(w) |
| | 3.09 degree/mm(w) | | 1.92(t) |
| TCs1g2/TCs1g1 | 4.99(w) | TCs2g2/TCs2g3 | 1.28(w) |
| | 0.23(t) | | 1.65(t) |
| TC12wide/TC12tele | 4.85 | | |
| DG12W 8.9649 mm | DG12T | 1.8483 mm DG23W | 1.8513 mm |
| DG23T 13.0828 mm | DG34W | 4.2544 mm DG34T | 0.1447 mm |
| (DG12W − DG12T)/(fT − fW) | 0.4308 | (DG23T − DG23W)/(fT − fW) | 0.6799 |
| (DG34W − DG34T)/(fT − fW) | 0.2488 | DG12W/TTL | 0.3179 |
| DG34W/TTL | 0.1509 | DG23W/Dmax | 0.2645 |
| TTL/Dmax | 4.0286 | | | w: Wide-angle End
t: Telephoto End

In addition, the lens assembly 4 of the fourth embodiment can meet the requirements of optical performance as seen in FIGS. 11A-11C and 12A-12C. It can be seen from FIG. 11A that the field curvature of tangential direction and sagittal direction in the lens assembly 4 of the fourth embodiment at the wide-angle end ranges from −0.12 mm to 0.04 mm. It can be seen from FIG. 11B that the distortion in the lens assembly 4 of the fourth embodiment at the wide-angle end ranges from −1.6% to 0%. It can be seen from FIG. 11C that the modulation transfer function of tangential direction and sagittal direction in the lens assembly 4 of the fourth embodiment at the wide-angle end ranges from 0.52 to 1.0. It can be seen from FIG. 12A that the field curvature of tangential direction and sagittal direction in the lens assembly 4 of the fourth embodiment at the telephoto end ranges from −0.16 mm to 0.16 mm. It can be seen from FIG. 12B that the distortion in the lens assembly 4 of the fourth embodiment at the telephoto end ranges from −2.5% to 0%. It can be seen from FIG. 12C that the modulation transfer function of tangential direction and sagittal direction in the lens assembly 4 of the fourth embodiment at the telephoto end ranges from 0.42 to 1.0. It is obvious that the field curvature and the distortion of the lens assembly 4 of the fourth embodiment can be corrected effectively, the image resolution can meet the requirements. Therefore, the lens assembly 4 of the fourth embodiment is capable of good optical performance.

A detailed description of a lens assembly in accordance with a fifth embodiment of the invention is as follows. The lens assembly (not shown) includes a first lens group, a first annular body, a second lens group, a second annular body, a third lens group, a fourth lens group, and an optical filter, all of which are arranged in order from an object side to an image side along an axis. The first lens group includes a 1-1 lens. The second lens group includes a 2-1 lens and a 2-2 lens, both of which are arranged in order from the object side to the image side along the axis. The third lens group includes a 3-1 lens and a 3-2 lens, both of which are arranged in order from the object side to the image side along the axis. The fourth lens group includes a 4-1 lens, a 4-2 lens, and a 4-3 lens, all of which are arranged in order from the object side to the image side along the axis. In operation, a light from the object side is imaged on an image plane.

When the lens assembly (not shown) zooms from the wide-angle end to the telephoto end, the first lens group is fixed, the second lens group moves to the object side along the axis, the third lens group moves to the image side along the axis, the fourth lens group is fixed, the first annular body is fixed, and the second annular body is fixed, so that the interval between the first lens group and the second lens group is decreased, the interval between the second lens group and the third lens group is increased, and the interval between the third lens group and the fourth lens group is decreased. The zoom magnification is approximately 2.5 times (28.19 mm/11.69 mm≈2.41) as the lens assembly (not shown) of the fifth embodiment zooms from the wide-angle end to the telephoto end.

The first hole of the first annular body has a fixed size. The second hole of the second annular body has a fixed size. The aforementioned fixed size means that the value of the hole diameter is fixed. When the lens assembly (not shown) zooms at a low zoom magnification (zoom magnification is about 1× to 1.25×), the second annular body has a stop function and the first annular body does not have a stop function. When the lens assembly (not shown) zooms at a high zoom magnification (zoom magnification is about 1.5× to 2.5×), the first annular body has a stop function and the second annular body does not have a stop function. In other words, when the lens assembly zooms from the wide-angle end to the telephoto end, different annular body can be used as the stop of the lens assembly as the zoom magnification changes. According to the foregoing, wherein: the 4-3 lens is a biconcave lens, wherein the object side surface is a concave surface; and both of the object side surface and image side surface of the optical filter are plane surfaces. The preferred embodiment of the present invention can be achieved when the lens assembly satisfies conditions (1)-(6), (8), (9)-(35), refractive power distribution, and surface shape.

With the above design of the lenses, first annular body, second annular body, and at least one of the conditions (1)-(6), (8), and (9)-(35) satisfied, the lens assembly (not shown) can have an effective shortened total lens length, an effective decreased thickness, an effective increased resolution, an effective corrected aberration, an effective corrected chromatic aberration, and a realized optical zoom function. Table 13 shows the optical specification of the lens assembly (not shown) when the lens assembly (not shown) is at the wide-angle end and telephoto end, respectively.

TABLE 13

Wide-angle End
Effective Focal Length = 11.69 mm F-number = 2.6
Total Lens Length = 28.2 mm Field of View = 25.2 degrees
Telephoto End
Effective Focal Length = 28.19 mm F-number = 4.4
Total Lens Length = 28.2 mm Field of View = 10.6 degrees

| Surface Number | Radius of Curvature (mm) | Thickness (mm) | Nd | Vd | Effective Focal Length (mm) | Remark |
|---|---|---|---|---|---|---|
| S51 | 4.50142016 | 1.4476 | 1.9973 | 19.32 | −281.655 | 1-1 Lens |
| S52 | 3.71627425 | 1.4973 | | | | |
| S53 | ∞ | 7.5203(w) 0.355(t) | | | | The First Annular Body |
| S54 | 4.66947234 | 1.6807 | 1.51869 | 69.87 | 9.7463 | 2-1 Lens |
| S55 | 52.3531709 | 0.0342 | | | | |
| S56 | 13.584932 | 0.7635 | 1.9973 | 19.32 | −15.3897 | 2-2 Lens |
| S57 | 7.03347359 | 0.9924(w) 8.151(t) | | | | |
| S58 | ∞ | 0.8019(w) 4.9278(t) | | | | The Second Annular Body |
| S59 | −2.5967769 | 1.3546 | 1.6355 | 23.97 | −9.79541 | 3-1 Lens |
| S510 | −5.3339589 | 0.0636 | | | | |
| S511 | 11.051428 | 2.8301 | 1.5445 | 55.987 | 5.88044 | 3-2 Lens |
| S512 | −4.1189801 | 4.2665(w) 0.1447(t) | | | | |
| S513 | −3.8770266 | 1.683 | 1.6713 | 19.24 | 5.30775 | 4-1 Lens |
| S514 | −2.1929129 | 0.0479 | | | | |
| S515 | −3.2561544 | 1.0166 | 1.5352 | 56.1 | −12.4687 | 4-2 Lens |
| S516 | −7.0306375 | 0.0871 | | | | |
| S517 | −13.571673 | 1.0106 | 1.5352 | 56.1 | −7.10669 | 4-3 Lens |
| S518 | 5.44668764 | 0.84 | | | | |
| S519 | ∞ | 0.21 | 1.521754 | 57.1 | | Optical Filter |
| S520 | ∞ | 0.0535 | | | | | w: Wide-angle End
t: Telephoto End

The definition of aspheric surface sag z of each aspheric lens in table 13 is the same as that of in Table 1, and is not described here again. In the fifth embodiment, the conic constant k and the aspheric coefficients A, B, C, D, E, F, G of each aspheric lens are shown in Table 14.

TABLE 14

| Surface Number | k | A | B | C | D | E | F | G |
|---|---|---|---|---|---|---|---|---|
| S51 | 0.18 | −5.53E−04 | −2.42E−05 | 1.63E−06 | −4.55E−07 | 8.20E−09 | 1.11E−09 | −9.45E−11 |
| S52 | 0.01 | −7.87E−04 | 5.43E−05 | −1.54E−05 | 5.31E−07 | 9.41E−08 | −2.30E−08 | 9.90E−10 |
| S54 | 0.14 | −2.91E−04 | −1.66E−05 | −1.04E−05 | 4.38E−07 | 5.92E−08 | −6.11E−09 | −3.69E−11 |
| S55 | 232.15 | −5.91E−04 | −1.13E−04 | 3.16E−07 | 1.17E−06 | −1.17E−08 | −2.04E−08 | 1.74E−09 |
| S56 | −10.95 | 8.25E−04 | 8.90E−05 | −3.19E−05 | 2.40E−06 | 4.63E−08 | −1.28E−08 | 1.31E−09 |
| S57 | 2.54 | 3.91E−04 | 2.91E−04 | −9.47E−05 | 7.02E−06 | 7.00E−07 | −9.95E−08 | 2.84E−09 |

TABLE 14-continued

| Surface Number | k | A | B | C | D | E | F | G |
|---|---|---|---|---|---|---|---|---|
| S59 | −2.43 | 9.93E−04 | 7.78E−04 | −2.50E−04 | 1.20E−04 | −8.67E−06 | −1.16E−05 | 1.62E−06 |
| S510 | −2.84 | 3.68E−03 | 1.40E−03 | 1.69E−04 | −3.96E−05 | 2.98E−06 | −1.65E−06 | 1.73E−07 |
| S511 | 7.68 | −7.43E−03 | 1.43E−03 | 4.15E−05 | −2.67E−05 | −1.74E−06 | 7.44E−07 | −5.08E−08 |
| S512 | −5.20 | −9.37E−03 | 3.96E−04 | 2.51E−05 | −8.04E−06 | 3.58E−07 | 5.84E−08 | −5.48E−09 |
| S513 | −9.00 | −6.68E−03 | 5.00E−04 | −1.04E−04 | 3.53E−06 | −1.93E−07 | −1.55E−08 | 5.88E−09 |
| S514 | −1.11 | 7.11E−03 | −7.51E−04 | 3.17E−05 | 4.50E−06 | −1.05E−06 | 3.55E−08 | 1.78E−09 |
| S515 | −1.23 | −1.14E−02 | 1.65E−03 | 3.50E−06 | 3.52E−06 | −4.13E−07 | −2.48E−07 | 2.07E−08 |
| S516 | −116.73 | −5.01E−03 | −2.40E−03 | 2.01E−04 | 8.65E−06 | 2.73E−07 | −2.25E−07 | 1.07E−08 |
| S517 | −195.94 | −1.82E−02 | 2.15E−03 | −2.71E−04 | −5.06E−06 | 1.37E−06 | 4.15E−07 | −3.71E−08 |
| S518 | −127.92 | −3.80E−02 | 9.06E−03 | −8.80E−04 | 9.36E−06 | 2.93E−06 | −1.91E−08 | −7.95E−09 |

Table 15 shows the parameters and condition values for conditions (1)-(6), (8), and (9)-(35) in accordance with the fifth embodiment of the invention. It can be seen from Table 15 that the lens assembly of the fifth embodiment satisfies the conditions (1)-(6), (8), and (9)-(35).

TABLE 15

| | | | |
|---|---|---|---|
| ST1MaxD | 5.52 mm(w) | ST2MaxD | 3.42 mm(w) |
| | 5.52 mm(t) | | 3.42 mm(t) |
| STOPactiveD | 3.42 mm(w) | Dmax | 7 mm(w) |
| | 5.52 mm(t) | | 7 mm(t) |
| EPD | 4.72 mm(w) | TCs1g1 | 1.497 mm(w) |
| | 6.6 mm(t) | | 1.497 mm(t) |
| TCs1g2 | 7.52 mm(w) | TCs2g2 | 0.992 mm(w) |
| | 0.355 mm(t) | | 8.15 mm(t) |
| TCs2g3 | 0.802 mm(w) | TC12wide | 9.02 mm |
| | 4.928 mm(t) | TC12tele | 1.85 mm |
| TC34wide | 4.27 mm | TC34tele | 0.145 mm |
| ST1MaxD/ST2MaxD | 1.61(w) | TTL1/ST1MaxD | 5.11(w) |
| | 1.61(t) | | 5.11(w) |
| TTL1/ST2MaxD | 8.25(w) | Dmax/ST1MaxD | 1.27(w) |
| | 8.25(w) | | 1.27(t) |
| Dmax/ST2MaxD | 2.05(w) | ST1MaxD/(TC12wide − TC12tele) | 0.77(w) |
| | 2.05(t) | | 0.77(t) |
| ST2MaxD/(TC12wide − TC12tele) | 0.48(w) | ST1MaxD/(TC34wide − TC34tele) | 1.34(w) |
| | 0.48(t) | | 1.34(t) |
| ST2MaxD/(TC34wide − TC34tele) | 0.83(w) | (TC12wide − TC12tele)/(fW − fT) | −0.43(w) |
| | 0.83(t) | | −0.43(t) |
| f/STOPactiveD | 3.42(w) | STOPactiveD/F# | 1.32 mm(w) |
| | 5.11(t) | | 1.25 mm(t) |
| FOV/STOPactiveD | 7.37 degree/mm(w) | EPD/STOPactiveD | 1.38(w) |
| | 1.92 degree/mm(t) | | 1.20(t) |
| ST1MaxD/TC12 | 0.61(w) | ST2MaxD/TC12 | 0.38(w) |
| | 2.98(t) | | 1.85(t) |
| f/ST1MaxD | 2.12(w) | f/ST2MaxD | 3.42(w) |
| | 5.11(t) | | 8.24(t) |
| ST1MaxD/F# | 2.12 mm(w) | ST2MaxD/F# | 1.32 mm(w) |
| | 1.25 mm(t) | | 0.77 mm(t) |
| FOV/ST1MaxD | 4.57 degree/mm(w) | ST1MaxD/EPD | 1.17(w) |
| | 1.92 degree/mm(t) | | 0.84(t) |
| FOV/ST2MaxD | 7.37 degree/mm(w) | EPD/ST2MaxD | 1.38(w) |
| | 3.10 degree/mm(w) | | 1.93(t) |
| TCs1g2/CTs1g1 | 5.02(w) | TCs2g2/TCs2g3 | 1.24(w) |
| | 0.24(t) | | 1.65(t) |
| TC12wide/TC12tele | 4.88 | | |
| DG12W | 9.0176 mm | DG12T | 1.8523 mm | DG23W | 1.7943 mm |
| DG23T | 13.0788 mm | DG34W | 4.2665 mm | DG34T | 0.1447 mm |
| (DG12W − DG12T)/(fT − fW) | 0.4343 | (DG23T − DG23W)/(fT − fW) | 0.6840 |
| (DG34W − DG34T)/(fT − fW) | 0.2498 | DG12W/TTL | 0.3198 |
| DG34W/TTL | 0.1513 | DG23W/Dmax | 0.2563 |
| TTL/Dmax | 4.0286 | | | w: Wide-angle End
t: Telephoto End

Referring to FIG. 13 and FIG. 14, the lens assembly 6 includes a first lens group LG61, a first annular body ST61, a second lens group LG62, a second annular body ST62, a third lens group LG63, a fourth lens group LG64, and an optical filter OF6, all of which are arranged in order from an object side to an image side along an axis OA6. The first lens group LG61 includes a 1-1 lens L61. The second lens group LG62 includes a 2-1 lens L62 and a 2-2 lens L63, both of which are arranged in order from the object side to the image side along the axis OA6. The third lens group LG63 includes a 3-1 lens L64 and a 3-2 lens L65, both of which are arranged in order from the object side to the image side along the axis OA6. The fourth lens group LG64 includes a 4-1 lens L66, a 4-2 lens L67, and a 4-3 lens L68, all of which are arranged in order from the object side to the image side along the axis OA6. In operation, a light from the object side is imaged on an image plane IMA6.

When the lens assembly 6 zooms from the wide-angle end (as shown in FIG. 13) to the telephoto end (as shown in FIG. 14), the first lens group LG61 is fixed, the second lens group LG62 moves to the object side along the axis OA6, the third lens group LG63 moves to the image side along the axis OA6, the fourth lens group LG64 is fixed, the first annular body ST61 is fixed, and the second annular body ST62 is fixed, so that the interval between the first lens group LG61 and the second lens group LG62 is decreased, the interval between the second lens group LG62 and the third lens group LG63 is increased, and the interval between the third lens group LG63 and the fourth lens group LG64 is decreased. The above mentioned intervals change as the lens assembly 6 zooming from the wide-angle end to the telephoto end can be clearly seen in FIG. 13 and FIG. 14. The zoom magnification is approximately 2.5 times (28.21 mm/11.68 mm≈2.42) as the lens assembly 6 of the sixth embodiment zooms from the wide-angle end (as shown in FIG. 13) to the telephoto end (as shown in FIG. 14).

The first hole of the first annular body ST61 has a fixed size. The second hole of the second annular body ST62 has a fixed size. The aforementioned fixed size means that the value of the hole diameter is fixed. When the lens assembly 6 zooms at a low zoom magnification (zoom magnification is about 1× to 1.25×), the second annular body ST62 has a stop function and the first annular body ST61 does not have a stop function. When the lens assembly 6 zooms at a high zoom magnification (zoom magnification is about 1.5× to 2.5×), the first annular body ST61 has a stop function and the second annular body ST62 does not have a stop function. In other words, when the lens assembly 6 zooms from the wide-angle end to the telephoto end, different annular body can be used as the stop of the lens assembly 6 as the zoom magnification changes. According to the foregoing, wherein: the 4-3 lens L68 is a meniscus lens, wherein the object side surface S617 is a convex surface; and both of the object side surface S619 and image side surface S620 of the optical filter OF6 are plane surfaces. The preferred embodiment of the present invention can be achieved when the lens assembly satisfies conditions (1)-(6), (8), (9)-(35), refractive power distribution, and surface shape.

With the above design of the lenses, first annular body ST61, second annular body ST62, and at least one of the conditions (1)-(6), (8), and (9)-(35) satisfied, the lens assembly 6 can have an effective shortened total lens length, an effective decreased thickness, an effective increased resolution, an effective corrected aberration, an effective corrected chromatic aberration, and a realized optical zoom function. Table 16 shows the optical specification of the lens assembly 6 in FIG. 13, and FIG. 14 when the lens assembly 6 is at the wide-angle end and telephoto end, respectively.

TABLE 16

Wide-angle End
Effective Focal Length = 11.68 mm F-number = 2.6
Total Lens Length = 28.2 mm Field of View = 25.2 degrees
Telephoto End
Effective Focal Length = 28.21 mm F-number = 4.4
Total Lens Length = 28.2 mm Field of View = 10.6 degrees

| Surface Number | Radius of Curvature (mm) | Thickness (mm) | Nd | Vd | Effective Focal Length (mm) | Remark |
|---|---|---|---|---|---|---|
| S61 | 4.52202509 | 1.4476 | 1.9973 | 19.32 | −275.317 | L61 |
| S62 | 3.73493983 | 1.4973 | | | | |
| S63 | ∞ | 7.5203(w) | | | | ST61 |
| | | 0.355028351(t) | | | | |
| S64 | 4.53493203 | 1.6807 | 1.51869 | 69.87 | 9.76479 | L62 |
| S65 | 37.0142955 | 0.0343 | | | | |
| S66 | 11.2581675 | 0.7635 | 1.9973 | 19.32 | −15.1856 | L63 |
| S67 | 6.26243165 | 0.9924(w) | | | | |
| | | 8.150983717(t) | | | | |
| S68 | ∞ | 0.8019(w) | | | | ST62 |
| | | 4.927847886(t) | | | | |
| S69 | −2.5263418 | 1.3546 | 1.6355 | 23.97 | −8.83943 | L64 |
| S610 | −5.5182424 | 0.0636 | | | | |
| S611 | 8.77651984 | 2.8301 | 1.5445 | 55.987 | 5.65731 | L65 |
| S612 | −4.2267144 | 4.2665(w) | | | | |
| | | 0.144698634(t) | | | | |
| S613 | −3.9120156 | 1.683 | 1.6713 | 19.24 | 4.93292 | L66 |
| S614 | −2.1156961 | 0.0479 | | | | |
| S615 | −2.7401261 | 1.0166 | 1.5352 | 56.1 | −6.91778 | L67 |
| S616 | −11.799546 | 0.0871 | | | | |
| S617 | 42.5851948 | 1.0106 | 1.5352 | 56.1 | −14.329 | L68 |
| S618 | 6.46258206 | 0.84 | | | | |
| S619 | ∞ | 0.21 | 1.521754 | 57.1 | | OF6 |
| S620 | ∞ | 0.0535 | | | | | w: Wide-angle End
t: Telephoto End

The definition of aspheric surface sag z of each aspheric lens in table 16 is the same as that of in Table 1, and is not described here again. In the sixth embodiment, the conic constant k and the aspheric coefficients A, B, C, D, E, F, G of each aspheric lens are shown in Table 17.

TABLE 17

| Surface Number | k | A | B | C | D | E | F | G |
|---|---|---|---|---|---|---|---|---|
| S61 | 0.18 | −5.41E−04 | −1.98E−05 | 1.21E−06 | −4.51E−07 | 1.12E−08 | 9.30E−10 | −8.75E−11 |
| S62 | 0.02 | −7.70E−04 | 5.37E−05 | −1.58E−05 | 4.25E−07 | 9.72E−08 | −2.06E−08 | 8.14E−10 |
| S64 | 0.11 | −2.96E−04 | −2.11E−05 | −1.64E−05 | 5.93E−07 | 1.38E−07 | −4.17E−09 | −1.04E−09 |
| S65 | 155.67 | −1.45E−03 | −1.38E−04 | 6.06E−06 | 3.29E−06 | −4.08E−08 | −5.24E−08 | −7.60E−10 |
| S66 | −9.30 | 8.28E−04 | 8.96E−05 | −2.91E−05 | 3.26E−06 | 1.89E−07 | −3.21E−09 | −7.39E−09 |
| S67 | 2.40 | 3.57E−04 | 2.33E−04 | −9.88E−05 | 8.68E−06 | 1.02E−06 | −1.56E−07 | −7.18E−09 |
| S69 | −2.36 | 9.56E−04 | 5.53E−04 | −3.40E−04 | 1.28E−04 | 9.79E−06 | −1.64E−05 | 2.04E−06 |
| S610 | −2.08 | 2.96E−03 | 1.13E−03 | 1.09E−04 | −3.91E−05 | 4.68E−06 | −1.34E−06 | 1.22E−07 |
| S611 | 3.53 | −8.64E−03 | 1.34E−03 | 3.09E−05 | −2.86E−05 | −1.50E−06 | 8.46E−07 | −6.34E−08 |
| S612 | −5.55 | −8.82E−03 | 3.98E−04 | 2.44E−05 | −8.00E−06 | 3.16E−07 | 4.72E−08 | −4.42E−09 |
| S613 | −8.37 | −6.59E−03 | 6.01E−04 | −1.19E−04 | 2.38E−06 | 2.12E−07 | 4.93E−08 | −2.85E−09 |
| S614 | −1.15 | 7.51E−03 | −7.36E−04 | 3.26E−05 | 4.14E−06 | −1.04E−06 | 4.20E−08 | 1.78E−09 |
| S615 | −1.73 | −1.01E−02 | 1.58E−03 | −9.65E−06 | 2.79E−06 | −3.75E−07 | −2.45E−07 | 2.20E−08 |
| S616 | −83.09 | −3.20E−03 | −2.34E−03 | 1.90E−04 | 6.74E−06 | 1.35E−07 | −2.28E−07 | 1.34E−08 |
| S617 | −2810.54 | −1.54E−02 | 1.87E−03 | −3.10E−04 | −4.27E−06 | 1.42E−06 | 4.07E−07 | −3.40E−08 |
| S618 | −38.36 | −3.91E−02 | 9.26E−03 | −9.29E−04 | 9.16E−06 | 3.15E−06 | 2.07E−08 | −1.13E−08 |

Table 18 shows the parameters and condition values for conditions (1)-(6), (8), and (9)-(35) in accordance with the sixth embodiment of the invention. It can be seen from Table 18 that the lens assembly 6 of the sixth embodiment satisfies the conditions (1)-(6), (8), and (9)-(35).

TABLE 18

| | | | |
|---|---|---|---|
| ST1MaxD | 5.52 mm(w) | ST2MaxD | 3.44 mm(w) |
| | 5.52 mm(t) | | 3.44 mm(t) |
| STOPactiveD | 3.44 mm(w) | Dmax | 7 mm(w) |
| | 5.52 mm(t) | | 7 mm(t) |
| EPD | 4.72 mm(w) | TCs1g1 | 1.497 mm(w) |
| | 6.6 mm(t) | | 1.497 mm(t) |
| TCs1g2 | 7.52 mm(w) | TCs2g2 | 0.992 mm(w) |
| | 0.355 mm(t) | | 8.15 mm(t) |
| TCs2g3 | 0.802 mm(w) | TC12wide | 9.02 mm |
| | 4.928 mm(t) | TC12tele | 1.85 mm |
| TC34wide | 4.266 mm | TC34tele | 0.145 mm |
| ST1MaxD/ST2MaxD | 1.60(w) | TTL1/ST1MaxD | 5.11(w) |
| | 1.60(t) | | 5.11(w) |
| TTL1/ST2MaxD | 8.20(w) | Dmax/ST1MaxD | 1.27(w) |
| | 8.20(w) | | 1.27(t) |
| Dmax/ST2MaxD | 2.03(w) | ST1MaxD/ | 0.77(w) |
| | 2.03(t) | (TC12wide − TC12tele) | 0.77(t) |
| ST2MaxD/ | 0.48(w) | ST1MaxD/ | 1.34(w) |
| (TC12wide − TC12tele) | 0.48(t) | (TC34wide − TC34tele) | 1.34(t) |
| ST2MaxD/ | 0.83(w) | (TC12wide − TC12tele)/ | −0.43(w) |
| (TC34wide − TC34tele) | 0.83(t) | (fW − fT) | −0.43(t) |
| f/STOPactiveD | 3.40(w) | STOPactiveD/F# | 1.32 mm(w) |
| | 5.11(t) | | 1.25 mm(t) |
| FOV/STOPactiveD | 7.33 degree/mm(w) | EPD/STOPactiveD | 1.37(w) |
| | 1.92 degree/mm(t) | | 1.20(t) |
| ST1MaxD/TC12 | 0.61(w) | ST2MaxD/TC12 | 0.38(w) |
| | 2.98(t) | | 1.86(t) |
| f/ST1MaxD | 2.12(w) | f/ST2MaxD | 3.40(w) |
| | 5.11(t) | | 8.20(t) |
| ST1MaxD/F# | 2.12 mm(w) | ST2MaxD/F# | 1.32 mm(w) |
| | 1.25 mm(t) | | 0.78 mm(t) |
| FOV/ST1MaxD | 4.57 degree/mm(w) | ST1MaxD/EPD | 1.17(w) |
| | 1.92 degree/mm(t) | | 0.84(t) |
| FOV/ST2MaxD | 7.33 degree/mm(w) | EPD/ST2MaxD | 1.37(w) |
| | 3.08 degree/mm(w) | | 1.92(t) |
| TCs1g2/TCs1g1 | 5.02(w) | TCs2g2/TCs2g3 | 1.24(w) |
| | 0.24(t) | | 1.65(t) |
| TC12wide/TC12tele | 4.88 | | |
| DG12W | 9.0176 mm | DG12T | 1.8523 mm | DG23W | 1.7943 mm |
| DG23T | 13.0788 mm | DG34W | 4.2665 mm | DG34T | 0.1447 mm |
| (DG12W − DG12T)/(fT − fW) | 0.4335 | (DG23T−DG23W)/(fT−fW) | 0.6827 |

TABLE 18-continued

| | | | |
|---|---|---|---|
| (DG34W − DG34T)/(fT − fW) | 0.2494 | DG12W/TTL | 0.3198 |
| DG34W/TTL | 0.1513 | DG23W/Dmax | 0.2563 |
| TTL/Dmax | 4.0286 | | | w: Wide-angle End
t: Telephoto End

Figure 15:
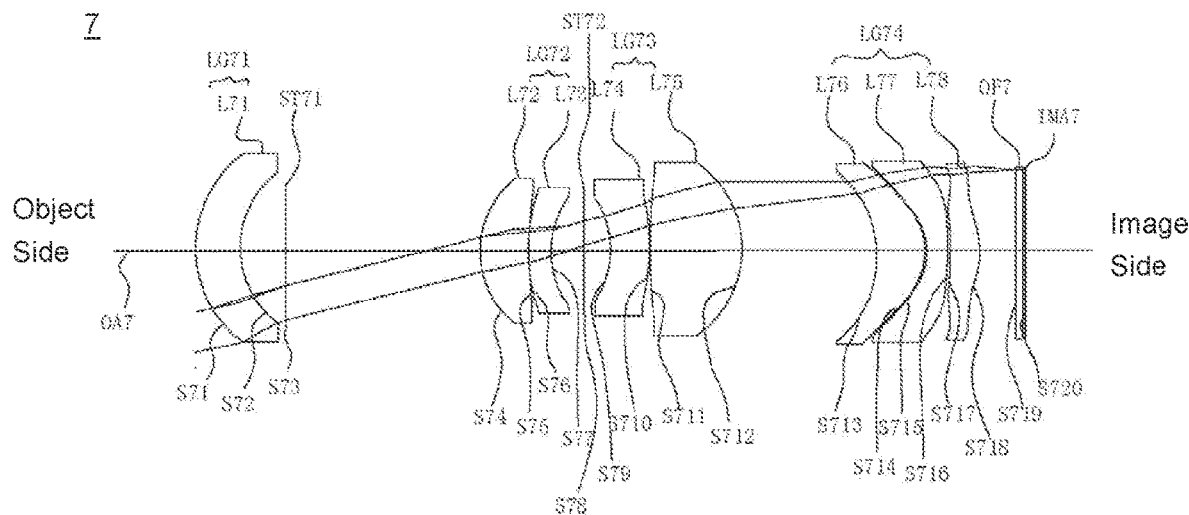
FIG. 15 and FIG. 16 are lens layout and optical path diagrams of a lens assembly at a wide-angle end and a telephoto end in accordance with a seventh embodiment of the invention, respectively.
Figure 16:
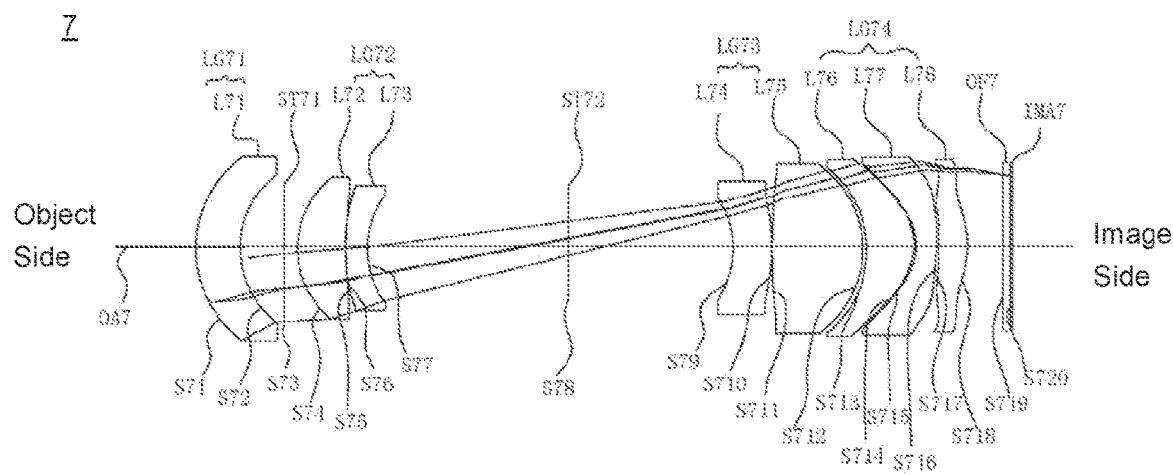
Figure 18:
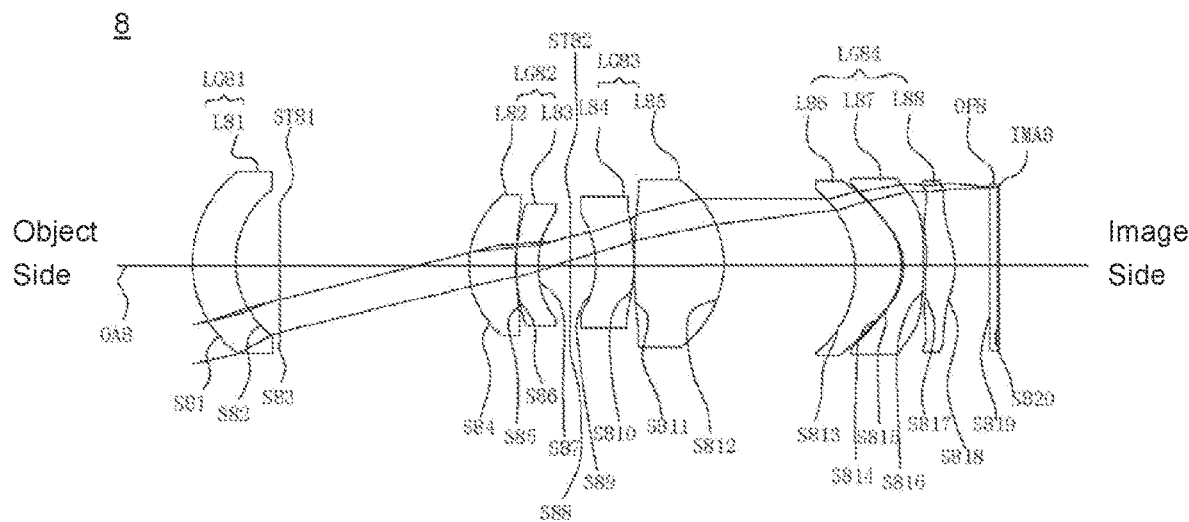
FIG. 18 and FIG. 19 are lens layout and optical path diagrams of a lens assembly at a wide-angle end and a telephoto end in accordance with an eighth embodiment of the invention, respectively.
Figure 19:
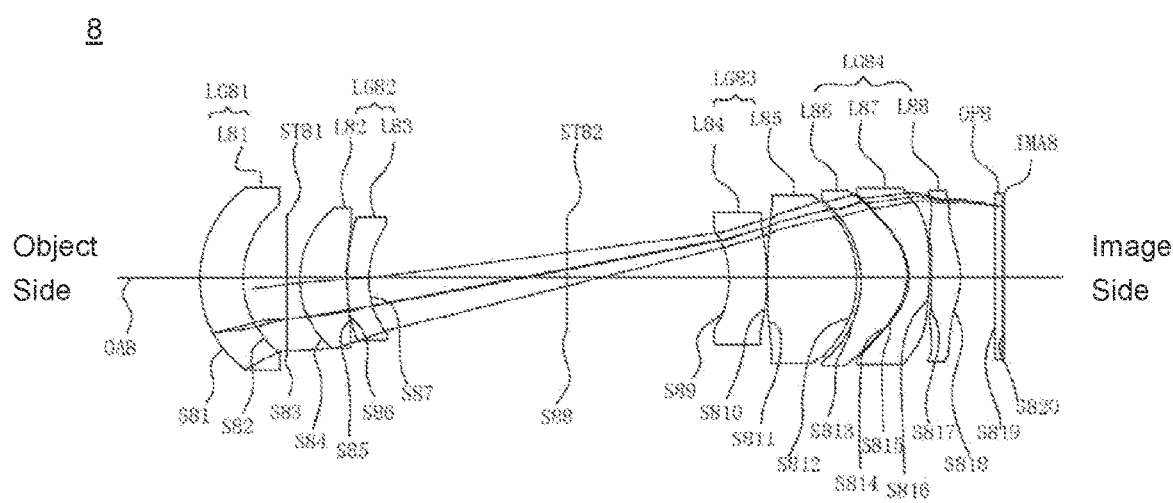

FIG. 15 and FIG. 16 are lens layout and optical path diagrams of a lens assembly at a wide-angle end and a telephoto end in accordance with a seventh embodiment of the invention, respectively. FIG. 18 and FIG. 19 are lens layout and optical path diagrams of a lens assembly at a wide-angle end and a telephoto end in accordance with an eighth embodiment of the invention, respectively. The lens layout and optical path diagrams of the seventh and eighth embodiments are similar to those of the fourth, fifth, and sixth embodiments.

The first lens groups LG71, LG81 are with negative refractive power and include 1-1 lenses L71, L81, respectively. The second lens groups LG72, LG82 are with positive refractive power and include 2-1 lenses L72, L82 and 2-2 lenses L73, L83, respectively. The third lens groups LG73, LG83 are with positive refractive power and include 3-1 lenses L74, L84 and 3-2 lenses L75, L85, respectively. The fourth lens groups LG74, LG84 are with positive refractive power and include 4-1 lenses L76, L86, 4-2 lenses L77, L87, and 4-3 lenses L78, L88, respectively. The first annular bodies ST71, ST81 include a first hole, respectively. The second annular bodies ST72, ST82 include a second hole, respectively.

The 1-1 lenses L71, L81 are meniscus lenses with negative refractive power and made of glass material, wherein the object side surfaces S71, S81 are convex surfaces, the image side surfaces S72, S82 are concave surfaces, and both of the object side surfaces S71, S81 and image side surfaces S72, S82 are aspheric surfaces. The 2-1 lenses L72, L82 are meniscus lenses with positive refractive power and made of glass material, wherein the object side surfaces S74, S84 are convex surfaces, the image side surfaces S75, S85 are concave surfaces, and both of the object side surfaces S74, S84 and image side surfaces S75, S85 are aspheric surfaces. The 2-2 lenses L73, L83 are meniscus lenses with negative refractive power, the 2-2 lens L73 is made of glass material, and the 2-2 lens L83 is made of plastic material, wherein the object side surfaces S76, S86 are convex surfaces, the image side surfaces S77, S87 are concave surfaces, and both of the object side surfaces S76, S86 and image side surfaces S77, S87 are aspheric surfaces. The 3-1 lenses L74, L84 are meniscus lenses with negative refractive power and made of plastic material, wherein the object side surfaces S79, S89 are concave surfaces, the image side surfaces S710, S810 are convex surfaces, and both of the object side surfaces S79, S89 and image side surfaces S710, S810 are aspheric surfaces. The 3-2 lenses L75, L85 are biconvex lenses with positive refractive power and made of plastic material, wherein the object side surfaces S711, S811 are convex surfaces, the image side surfaces S712, S812 are convex surfaces, and both of the object side surfaces S711, S811 and image side surfaces S712, S812 are aspheric surfaces. The 4-1 lenses L76, L86 are meniscus lenses with positive refractive power and made of plastic material, wherein the object side surfaces S713, S813 are concave surfaces, the image side surfaces S714, S814 are convex surfaces, and both of the object side surfaces S713, S813 and image side surfaces S714, S814 are aspheric surfaces. The 4-2 lenses L77, L87 are meniscus lenses with negative refractive power and made of plastic material, wherein the object side surfaces S715, S815 are concave surfaces, the image side surfaces S716, S816 are convex surfaces, and both of the object side surfaces S715, S815 and image side surfaces S716, S816 are aspheric surfaces. The 4-3 lenses L78, L88 are meniscus lenses with positive refractive power and made of plastic material, wherein the object side surfaces S717, S817 are concave surfaces and have an inflection point, the image side surfaces S718, S818 are convex surfaces, and both of the object side surfaces S717, S817 and image side surfaces S718, S818 are aspheric surfaces.

In addition, the lens assemblies 7, 8 satisfy at least one of the conditions (1)-(6), (8), and the following conditions (36)-(39):

$$0.1 < ed78/L7\emptyset; \tag{36}$$

$$L8R1/SD8R1 < 0; \tag{37}$$

$$|T2/L2R2| < 0.4; \tag{38}$$

$$|SD2/L2R2| < 0.5; \tag{39}$$

wherein ed78 is respectively an interval between two edges of the lenses L77, L78, L87, L88 which are closest to the image side along the optical axes OA7, OA8 direction for the seventh to eighth embodiments, L7Ø is respectively an effective optical diameter of the image side surfaces S716, S816 of the lenses L77, L87 which are second closest to the image side for the seventh to eighth embodiments, L8R1 is a radius of curvature of the object side surfaces S717, S817 of the lenses L78, L88 which are closest to the image side for the seventh to eighth embodiments, SD8R1 is an effective optical radius of the object side surfaces S717, S817 of the lenses L78, L88 which are closest to the image side, T2 is an interval from the object side surfaces S74, S84 to the image side surfaces S75, S85 of the lenses L72, L82 which are second closest to the object side along the optical axes OA7, OA8 for the seventh to eighth embodiments, L2R2 is a radius of curvature of the image side surfaces S75, S85 of the lenses L72, L82 which are second closest to the object side for the seventh to eighth embodiments, and SD2 is an effective optical radius of the lenses L72, L82 which are second closest to the object side for the seventh to eighth embodiments. With the lens assemblies 7, 8 satisfying at least one of the conditions (1)-(6), (8), and (36)-(39), the total lens length can be effectively shortened, the resolution can be effectively increased, the aberration can be effectively corrected, the chromatic aberration can be effectively corrected, and optical zoom function can be realized. The preferred embodiment of the present invention can be achieved when the lens assembly satisfies at least one of the conditions (1)-(6), (8), and (36)-(39).

A detailed description of a lens assembly in accordance with a seventh embodiment of the invention is as follows. Referring to FIG. 15 and FIG. 16, the lens assembly 7 includes a first lens group LG71, a first annular body ST71, a second lens group LG72, a second annular body ST72, a third lens group LG73, a fourth lens group LG74, and an optical filter OF7, all of which are arranged in order from an object side to an image side along an axis OA7. The first lens group LG71 includes a 1-1 lens L71. The second lens group LG72 includes a 2-1 lens L72 and a 2-2 lens L73, both of which are arranged in order from the object side to the image side along the axis OA7. The third lens group LG73 includes a 3-1 lens L74 and a 3-2 lens L75, both of which are arranged in order from the object side to the image side along the axis OA7. The fourth lens group LG74 includes a 4-1 lens L76, a 4-2 lens L77, and a 4-3 lens L78, all of which are arranged in order from the object side to the image side along the axis OA7. In operation, a light from the object side is imaged on an image plane IMA7.

When the lens assembly 7 zooms from the wide-angle end (as shown in FIG. 15) to the telephoto end (as shown in FIG. 16), the first lens group LG71 is fixed, the second lens group LG72 moves to the object side along the axis OA7, the third lens group LG73 moves to the image side along the axis OA7, the fourth lens group LG74 is fixed, the first annular body ST71 is fixed, and the second annular body ST72 is fixed, so that the interval between the first lens group LG71 and the second lens group LG72 is decreased, the interval between the second lens group LG72 and the third lens group LG73 is increased, and the interval between the third lens group LG73 and the fourth lens group LG74 is decreased. The above mentioned intervals change as the lens assembly 7 zooming from the wide-angle end to the telephoto end can be clearly seen in FIG. 15 and FIG. 16. The zoom magnification is approximately 2.5 times (28.22 mm/11.65 mm≈2.42) as the lens assembly 7 of the seventh embodiment zooms from the wide-angle end (as shown in FIG. 15) to the telephoto end (as shown in FIG. 16).

The first hole of the first annular body ST71 has a fixed size. The second hole of the second annular body ST72 has a fixed size. The aforementioned fixed size means that the value of the hole diameter is fixed. When the lens assembly 7 zooms at a low zoom magnification (zoom magnification is about 1× to 1.25×), the second annular body ST72 has a stop function and the first annular body ST71 does not have a stop function. When the lens assembly 7 zooms at a high zoom magnification (zoom magnification is about 1.5× to 2.5×), the first annular body ST71 has a stop function and the second annular body ST72 does not have a stop function. In other words, when the lens assembly 7 zooms from the wide-angle end to the telephoto end, different annular body can be used as the stop of the lens assembly 7 as the zoom magnification changes. According to the foregoing, wherein: the object side surface S717 of the 4-3 lens L78 is a concave surface and includes at least a inflection point; the image side surface S718 of the 4-3 lens L78 is a convex surface; and both of the object side surface S719 and image side surface S720 of the optical filter OF7 are plane surfaces. The preferred embodiment of the present invention can be achieved when the lens assembly satisfies conditions (1)-(6), (8), (36)-(39), refractive power distribution, and surface shape.

With the above design of the lenses, first annular body ST71, second annular body ST72, and at least one of the conditions (1)-(6), (8), and (36)-(39) satisfied, the lens assembly 7 can have an effective shortened total lens length, an effective increased resolution, an effective corrected aberration, an effective corrected chromatic aberration, and a realized optical zoom function. Table 19 shows the optical specification of the lens assembly 7 in FIG. 15, and FIG. 16 when the lens assembly 7 is at the wide-angle end and telephoto end, respectively.

TABLE 19

Wide-angle End
Effective Focal Length = 11.65 mm F-number = 2.88
Total Lens Length = 26.391 mm Field of View = 25.34 degrees
Telephoto End
Effective Focal Length = 28.22 mm F-number = 4.8
Total Lens Length = 26.391 mm Field of View = 10.61 degrees

| Surface Number | Radius of Curvature (mm) | Thickness (mm) | Nd | Vd | Effective Focal Length (mm) | Remark |
|---|---|---|---|---|---|---|
| S71 | 4.1219 | 1.4402 | 1.9973 | 19.3200 | −133.21 | L71 |
| S72 | 3.2980 | 1.4973 | | | | |
| S73 | ∞ | 6.1171(w) 0.3920(t) | | | | ST71 |
| S74 | 3.5690 | 1.5179 | 1.5187 | 69.8700 | 8.442 | L72 |
| S75 | 16.3021 | 0.0343 | | | | |
| S76 | 8.3755 | 0.7194 | 1.6713 | 19.2429 | −12.906 | L73 |
| S77 | 4.1296 | 1.0821(w) 6.8074(t) | | | | |
| S78 | ∞ | 0.8839(w) 5.0452(t) | | | | ST72 |
| S79 | −2.5936 | 1.2124 | 1.6355 | 23.9718 | −8.4798 | L74 |
| S710 | −5.8716 | 0.0636 | | | | |
| S711 | 12.0050 | 2.8301 | 1.5445 | 55.9870 | 5.5138 | L75 |
| S712 | −3.6860 | 4.3377(w) 0.1765(t) | | | | |
| S713 | −3.7278 | 1.6830 | 1.6713 | 19.2429 | 4.6567 | L76 |
| S714 | −2.0205 | 0.0479 | | | | |
| S715 | −1.8450 | 0.7230 | 1.5352 | 56.1153 | −5.8423 | L77 |
| S716 | −5.0926 | 0.0871 | | | | |
| S717 | −5.1144 | 1.0106 | 1.5352 | 56.1153 | 10.0481 | L78 |
| S718 | −2.8068 | 0.8400 | | | | |
| S719 | ∞ | 0.2100 | 1.5168 | 64.1673 | | OF7 |
| S720 | ∞ | 0.0535 | | | | | w: Wide-angle End
t: Telephoto End

The definition of aspheric surface sag z of each aspheric lens in table 19 is the same as that of in Table 1, and is not described here again. In the seventh embodiment, the conic constant k and the aspheric coefficients A, B, C, D, E, F, G of each aspheric lens are shown in Table 20.

optical filter OF8, all of which are arranged in order from an object side to an image side along an axis OA8. The first lens group LG81 includes a 1-1 lens L81. The second lens group LG82 includes a 2-1 lens L82 and a 2-2 lens L83, both of which are arranged in order from the object side to the image

TABLE 20

| Surface Number | k | A | B | C | D | E | F | G |
|---|---|---|---|---|---|---|---|---|
| S71 | 0.000E+00 | −5.987E−04 | 1.724E−05 | −5.537E−06 | −1.851E−07 | 2.491E−08 | 1.760E−09 | −2.385E−10 |
| S72 | 0.000E+00 | −1.424E−03 | 8.026E−05 | −3.519E−05 | −1.246E−06 | 3.434E−07 | 3.723E−08 | −7.909E−09 |
| S74 | 0.000E+00 | −4.233E−04 | 2.639E−04 | −9.338E−05 | 1.666E−05 | −1.639E−07 | −1.764E−07 | 2.185E−08 |
| S75 | 0.000E+00 | −1.930E−03 | −6.732E−05 | 9.495E−05 | −1.090E−05 | −1.283E−06 | 1.343E−07 | 3.309E−08 |
| S76 | 0.000E+00 | 4.674E−04 | −1.308E−04 | −1.661E−05 | 1.851E−05 | −3.144E−06 | −8.520E−07 | 1.720E−07 |
| S77 | 0.000E+00 | −1.510E−03 | −1.366E−03 | 2.452E−04 | −1.098E−04 | 9.284E−07 | 4.390E−06 | −9.398E−07 |
| S79 | 0.000E+00 | −1.467E−02 | 1.534E−03 | 1.662E−03 | −5.307E−04 | 1.669E−05 | 4.612E−06 | −9.345E−07 |
| S710 | 0.000E+00 | −1.599E−03 | 2.201E−03 | 3.822E−04 | −3.950E−05 | −6.304E−06 | −1.947E−06 | 3.016E−07 |
| S711 | 0.000E+00 | −9.164E−03 | 2.380E−03 | 2.604E−05 | −5.012E−05 | −7.998E−07 | 1.479E−06 | −1.443E−07 |
| S712 | 0.000E+00 | −8.542E−03 | 3.188E−04 | 1.312E−05 | −1.009E−05 | 5.803E−07 | 1.066E−07 | −1.069E−08 |
| S713 | 0.000E+00 | −1.751E−02 | 2.336E−03 | −9.182E−05 | −1.165E−05 | −1.276E−06 | 1.438E−07 | 7.347E−09 |
| S714 | 0.000E+00 | 3.654E−03 | 4.657E−05 | 5.101E−05 | 1.821E−06 | −1.393E−06 | 3.852E−08 | 3.695E−09 |
| S715 | 0.000E+00 | −1.229E−02 | 6.528E−04 | −1.675E−05 | 1.037E−05 | 4.867E−07 | −2.445E−07 | 1.289E−08 |
| S716 | 0.000E+00 | 1.025E−03 | −2.537E−03 | 1.429E−04 | 7.501E−06 | 7.054E−07 | −2.058E−07 | 8.951E−09 |
| S717 | 0.000E+00 | 3.177E−03 | 1.466E−03 | −1.821E−04 | −9.334E−06 | −8.763E−07 | 2.736E−07 | −8.950E−09 |
| S718 | 0.000E+00 | −1.672E−02 | 8.478E−03 | −9.509E−04 | 8.737E−06 | 2.755E−06 | −5.912E−08 | −1.284E−09 |

Table 21 shows the parameters and condition values for conditions (1)-(6), (8), and (36)-(39) in accordance with the seventh embodiment of the invention. It can be seen from Table 21 that the lens assembly 7 of the seventh embodiment satisfies the conditions (1)-(6), (8), and (36)-(39).

side along the axis OA8. The third lens group LG83 includes a 3-1 lens L84 and a 3-2 lens L85, both of which are arranged in order from the object side to the image side along the axis OA8. The fourth lens group LG84 includes a 4-1 lens L86, a 4-2 lens L87, and a 4-3 lens L88, all of which

TABLE 21

| | | | | | |
|---|---|---|---|---|---|
| DG12W | 7.6144 mm | DG12T | 1.8893 mm | DG23W | 1.966 mm |
| DG23T | 11.8526 mm | DG34W | 4.3374 mm | DG34T | 0.1765 mm |
| Dmax | 6.475 mm | ed78 | 0.871 mm | L7Ø | 6.28 mm |
| SD8R1 | 2.95 mm | SD2 | 2.506 mm | | |
| (DG12W − DG12T)/(fT − fW) | 0.3455 | (DG23T − DG23W)/(fT − fW) | | 0.5967 | |
| (DG34W − DG34T)/(fT − fW) | 0.2511 | DG12W/TTL | | 0.2885 | |
| DG34W/TTL | 0.1644 | DG23W/Dmax | | 0.3036 | |
| TTL/Dmax | 4.0758 | ed78/L7Ø | | 0.1387 | |
| L8R1/SD8R1 | −1.7337 | | T2/L2R2 | | | 0.0931 | |
| | SD2/L2R2 | | 0.1537 | | | |

Figure 17A:
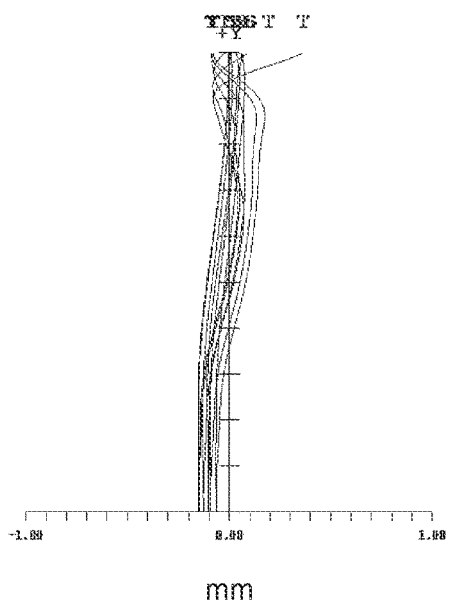
FIG. 17A, FIG. 17B, and FIG. 17C depict a field curvature diagram, a distortion diagram, and a modulation transfer function diagram of the lens assembly at the telephoto end in accordance with the seventh embodiment of the invention, respectively.
Figure 17B:
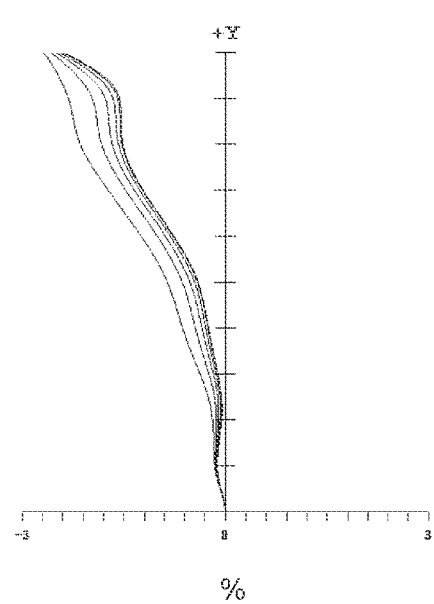
Figure 17C:
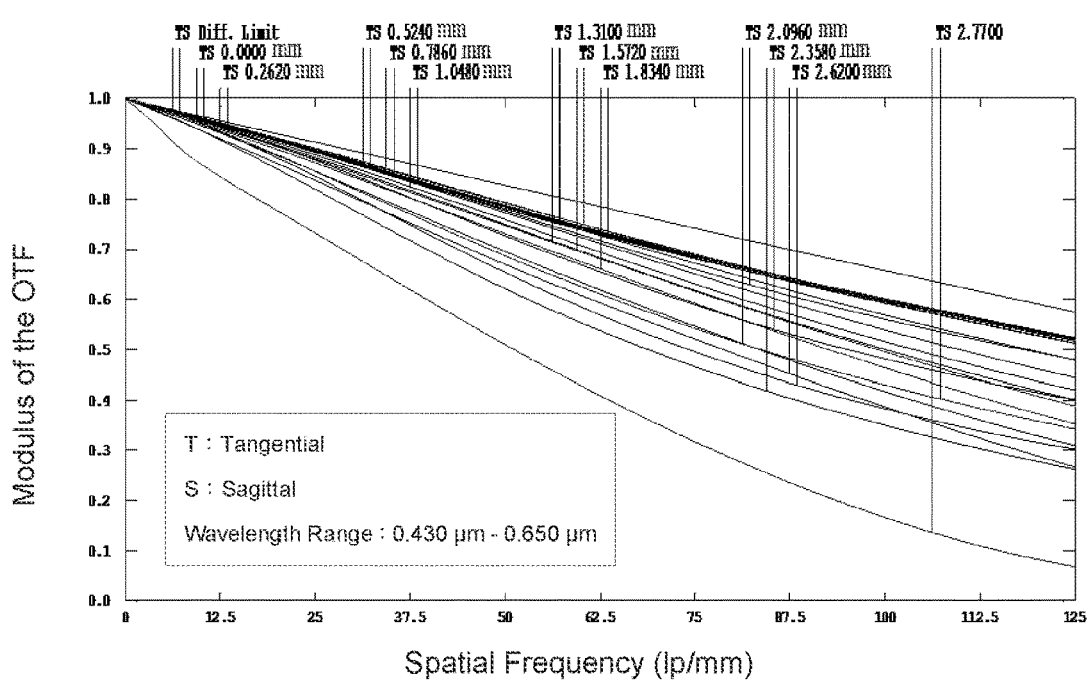

In addition, the lens assembly 7 of the seventh embodiment can meet the requirements of optical performance as seen in FIGS. 17A, 17B, and 17C. It can be seen from FIG. 17A that the field curvature of tangential direction and sagittal direction in the lens assembly 7 of the seventh embodiment at the wide-angle end ranges from −0.2 mm to 0.4 mm. It can be seen from FIG. 17B that the distortion in the lens assembly 7 of the seventh embodiment at the wide-angle end ranges from −2.7% to 0%. It can be seen from FIG. 17C that the modulation transfer function of tangential direction and sagittal direction in the lens assembly 7 of the seventh embodiment at the wide-angle end ranges from 0.06 to 1.0. It is obvious that the field curvature and the distortion of the lens assembly 7 of the seventh embodiment can be corrected effectively, the image resolution can meet the requirements. Therefore, the lens assembly 7 of the seventh embodiment is capable of good optical performance.

A detailed description of a lens assembly in accordance with an eighth embodiment of the invention is as follows. Referring to FIG. 18 and FIG. 19, the lens assembly 8 includes a first lens group LG81, a first annular body ST81, a second lens group LG82, a second annular body ST82, a third lens group LG83, a fourth lens group LG84, and an are arranged in order from the object side to the image side along the axis OA8. In operation, a light from the object side is imaged on an image plane IMA8.

When the lens assembly 8 zooms from the wide-angle end (as shown in FIG. 18) to the telephoto end (as shown in FIG. 19), the first lens group LG81 is fixed, the second lens group LG82 moves to the object side along the axis OA8, the third lens group LG83 moves to the image side along the axis OA8, the fourth lens group LG84 is fixed, the first annular body ST81 is fixed, and the second annular body ST82 is fixed, so that the interval between the first lens group LG81 and the second lens group LG82 is decreased, the interval between the second lens group LG82 and the third lens group LG83 is increased, and the interval between the third lens group LG83 and the fourth lens group LG84 is decreased. The above mentioned intervals change as the lens assembly 8 zooming from the wide-angle end to the telephoto end can be clearly seen in FIG. 18 and FIG. 19. The zoom magnification is approximately 2.5 times (28.22 mm/11.65 mm≈2.42) as the lens assembly 8 of the eighth embodiment zooms from the wide-angle end (as shown in FIG. 18) to the telephoto end (as shown in FIG. 19).

The first hole of the first annular body ST81 has a fixed size. The second hole of the second annular body ST82 has a fixed size. The aforementioned fixed size means that the value of the hole diameter is fixed. When the lens assembly 8 zooms at a low zoom magnification (zoom magnification is about 1× to 1.25×), the second annular body ST82 has a stop function and the first annular body ST81 does not have a stop function. When the lens assembly 8 zooms at a high zoom magnification (zoom magnification is about 1.5× to 2.5×), the first annular body ST81 has a stop function and the second annular body ST82 does not have a stop function. In other words, when the lens assembly 8 zooms from the wide-angle end to the telephoto end, different annular body can be used as the stop of the lens assembly 8 as the zoom magnification changes. According to the foregoing, wherein: the object side surface S817 of the 4-3 lens L88 is a concave surface and includes at least a inflection point; the image side surface S818 of the 4-3 lens L88 is a convex surface; and both of the object side surface S819 and image side surface S820 of the optical filter OF8 are plane surfaces. The preferred embodiment of the present invention can be achieved when the lens assembly satisfies conditions (1)-(6), (8), (36)-(39), refractive power distribution, and surface shape.

With the above design of the lenses, first annular body ST81, second annular body ST82, and at least one of the conditions (1)-(6), (8), and (36)-(39) satisfied, the lens assembly 8 can have an effective shortened total lens length, an effective increased resolution, an effective corrected aberration, an effective corrected chromatic aberration, and a realized optical zoom function. Table 22 shows the optical specification of the lens assembly 8 in FIG. 18, and FIG. 19 when the lens assembly 8 is at the wide-angle end and telephoto end, respectively.

TABLE 22

Wide-angle End
Effective Focal Length = 11.65 mm F-number = 2.88
Total Lens Length = 26.391 mm Field of View = 25.34 degrees
Telephoto End
Effective Focal Length = 28.22 mm F-number = 4.8
Total Lens Length = 26.391 mm Field of View = 10.61 degrees

| Surface Number | Radius of Curvature (mm) | Thickness (mm) | Nd | Vd | Effective Focal Length (mm) | Remark |
|---|---|---|---|---|---|---|
| S81 | 4.2114 | 1.4402 | 1.9973 | 19.3200 | −188.9769 | L81 |
| S82 | 3.4160 | 1.4973 | | | | |
| S83 | ∞ | 6.1171(w) | | | | ST81 |
| | | 0.3920(t) | | | | |
| S84 | 4.2051 | 1.5179 | 1.4970 | 81.5947 | 8.8689 | L82 |
| S85 | 80.4862 | 0.0343 | | | | |
| S86 | 5.9851 | 0.7194 | 1.6713 | 19.2429 | −13.7442 | L83 |
| S87 | 3.4550 | 1.0821(w) | | | | |
| | | 6.8074(t) | | | | |
| S88 | ∞ | 0.8839(w) | | | | ST82 |
| | | 5.0452(t) | | | | |
| S89 | −2.6053 | 1.2124 | 1.6355 | 23.9718 | −9.5711 | L84 |
| S810 | −5.3812 | 0.0636 | | | | |
| S811 | 16.6270 | 2.8301 | 1.5445 | 55.9870 | 5.7710 | L85 |
| S812 | −3.6421 | 4.3377(w) | | | | |
| | | 0.1765(t) | | | | |
| S813 | −3.7686 | 1.6830 | 1.6713 | 19.2429 | 4.7009 | L86 |
| S814 | −2.0257 | 0.0479 | | | | |
| S815 | −1.9335 | 0.7230 | 1.5352 | 56.1153 | −13.4264 | L87 |
| S816 | −2.6868 | 0.0871 | | | | |
| S817 | −1.9905 | 1.0106 | 1.5352 | 56.1153 | 41.2295 | L88 |
| S818 | −2.1490 | 0.8400 | | | | |
| S819 | ∞ | 0.2100 | 1.5168 | 64.1673 | | OF8 |
| S820 | ∞ | 0.0535 | | | | | w: Wide-angle End
t: Telephoto End

The definition of aspheric surface sag z of each aspheric lens in table 22 is the same as that of in Table 1, and is not described here again. In the eighth embodiment, the conic constant k and the aspheric coefficients A, B, C, D, E, F, G of each aspheric lens are shown in Table 23.

TABLE 23

| Surface Number | k | A | B | C | D | E | F | G |
|---|---|---|---|---|---|---|---|---|
| S81 | 0.000E+00 | −5.987E−04 | 1.724E−05 | −5.537E−06 | −1.851E−07 | 2.491E−08 | 1.760E−09 | −2.385E−10 |
| S82 | 0.000E+00 | −1.424E−03 | 8.026E−05 | −3.519E−05 | −1.246E−06 | 3.434E−07 | 3.723E−08 | −7.909E−09 |
| S84 | 0.000E+00 | −4.233E−04 | 2.639E−04 | −9.338E−05 | 1.666E−06 | −1.639E−07 | −1.764E−07 | 2.185E−08 |
| S85 | 0.000E+00 | −1.930E−03 | −6.732E−05 | 9.495E−05 | −1.090E−05 | −1.283E−06 | 1.343E−07 | 3.309E−08 |
| S86 | 0.000E+00 | 4.674E−04 | −1.308E−04 | −1.661E−05 | 1.851E−05 | −3.144E−06 | −8.520E−07 | 1.720E−07 |
| S87 | 0.000E+00 | −1.510E−03 | −1.366E−03 | 2.452E−04 | −1.098E−04 | 9.284E−07 | 4.390E−06 | −9.398E−07 |
| S89 | 0.000E+00 | −1.467E−02 | 1.534E−03 | 1.662E−03 | −5.307E−04 | 1.669E−05 | 4.612E−06 | −9.345E−07 |
| S810 | 0.000E+00 | −1.599E−03 | 2.201E−03 | 3.822E−04 | −3.950E−05 | −6.304E−06 | −1.947E−06 | 3.016E−07 |

TABLE 23-continued

| Surface Number | k | A | B | C | D | E | F | G |
|---|---|---|---|---|---|---|---|---|
| S811 | 0.000E+00 | −9.164E−03 | 2.380E−03 | 2.604E−05 | −5.012E−05 | −7.998E−07 | 1.479E−06 | −1.443E−07 |
| S812 | 0.000E+00 | −8.542E−03 | 3.188E−04 | 1.312E−05 | −1.009E−05 | 5.803E−07 | 1.066E−07 | −1.069E−08 |
| S813 | 0.000E+00 | −1.751E−02 | 2.336E−03 | −9.182E−05 | −1.165E−05 | −1.276E−06 | 1.438E−07 | 7.347E−09 |
| S814 | 0.000E+00 | 3.654E−03 | 4.657E−05 | 5.101E−05 | 1.821E−06 | −1.393E−06 | 3.852E−08 | 3.695E−09 |
| S815 | 0.000E+00 | −1.229E−02 | 6.528E−04 | −1.675E−05 | 1.037E−05 | 4.867E−07 | −2.445E−07 | 1.289E−08 |
| S816 | 0.000E+00 | 1.025E−03 | −2.537E−03 | 1.429E−04 | 7.501E−06 | 7.054E−07 | −2.058E−07 | 8.951E−09 |
| S817 | 0.000E+00 | 3.177E−03 | 1.466E−03 | −1.821E−04 | −9.334E−06 | −8.763E−07 | 2.736E−07 | −8.950E−09 |
| S818 | 0.000E+00 | −1.672E−02 | 8.478E−03 | −9.509E−04 | 8.737E−06 | 2.755E−06 | −5.912E−08 | −1.284E−09 |

Table 24 shows the parameters and condition values for conditions (1)-(6), (8), and (36)-(39) in accordance with the eighth embodiment of the invention. It can be seen from Table 24 that the lens assembly 8 of the eighth embodiment satisfies the conditions (1)-(6), (8), and (36)-(39).

TABLE 24

| | | | | | |
|---|---|---|---|---|---|
| DG12W | 7.6144 mm | DG12T | 1.8893 mm | DG23W | 1.966 mm |
| DG23T | 11.8526 mm | DG34W | 4.3374 mm | DG34T | 0.1765 mm |
| Dmax | 6.475 mm | ed78 | 0.871 mm | L7Ø | 6.28 mm |
| SD8R1 | 2.95 mm | SD2 | 2.463 mm | | |
| (DG12W − DG12T)/(fT − fW) | | 0.3455 | (DG23T − DG23W)/(fT − fW) | | 0.5967 |
| (DG34W − DG34T)/(fT − fW) | | 0.2511 | DG12W/TTL | | 0.2885 |
| DG34W/TTL | | 0.1644 | DG23W/Dmax | | 0.3036 |
| TTL/Dmax | | 4.0758 | ed78/L7Ø | | 0.1387 |
| L8R1/SD8R1 | | −0.6747 | \| T2/L2R2 \| | | 0.0189 |
| \| SD2/L2R2 \| | | 0.0306 | | | |

In addition, the optical performance for the lens assembly 8 of the eighth embodiment can meet the requirements. The field curvature diagram (figure is omitted), distortion diagram (figure is omitted), and modulation transfer function diagram are similar to those of the lens assembly 7 of the seventh embodiment, and is not described here again.

In the above mentioned embodiment, the lens assembly of the invention can also add a first reflective element disposed between the object side and the first lens group, wherein the first reflective element is a prism or a mirror. It is understandable that a second reflective element can also be added and disposed between the first lens group and the fourth lens group, and falls into the scope of the invention. In the above mentioned fourth to sixth embodiment, the lens assembly includes two annular bodies. However, the present invention is not limited thereto, another annular body can be added, and falls into the scope of the invention.

Figure 20:
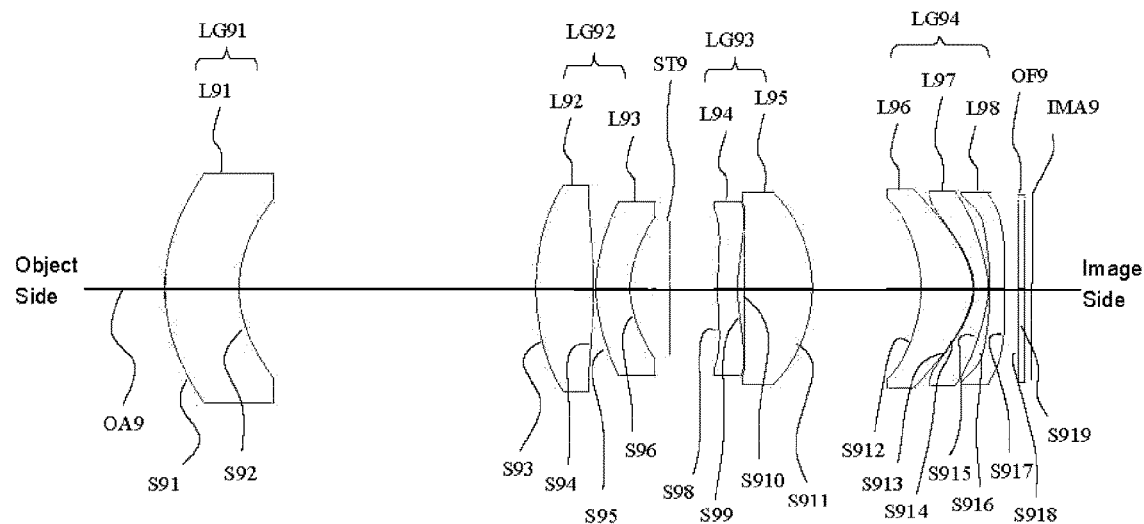
FIG. 20 and FIG. 21 are lens layout and optical path diagrams of a lens assembly at a wide-angle end and a telephoto end in accordance with a ninth embodiment of the invention, respectively.
Figure 21:
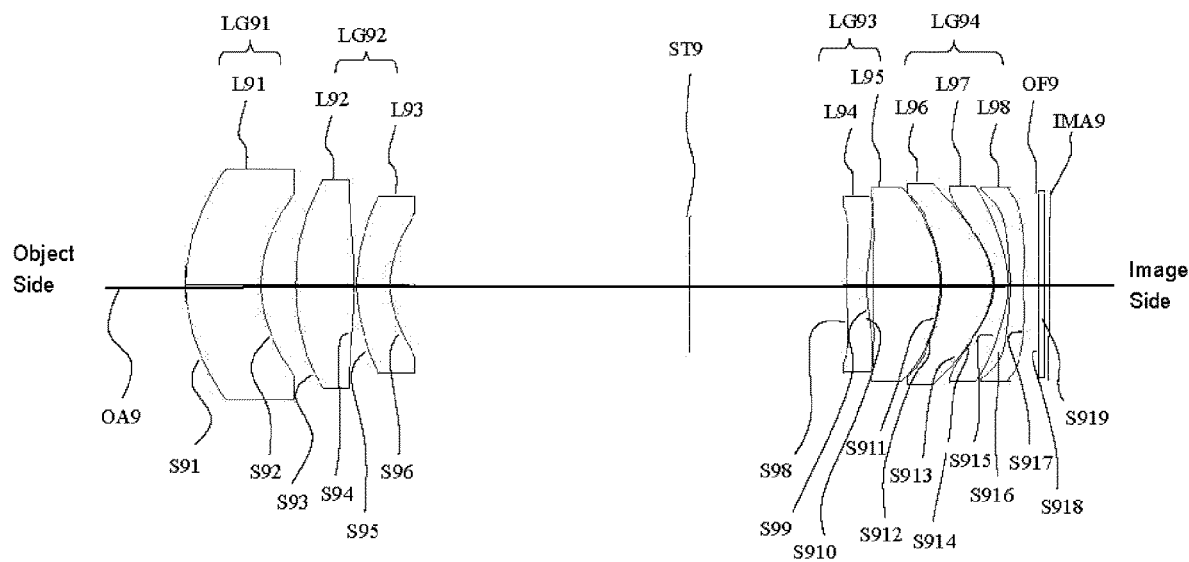
Figure 22:
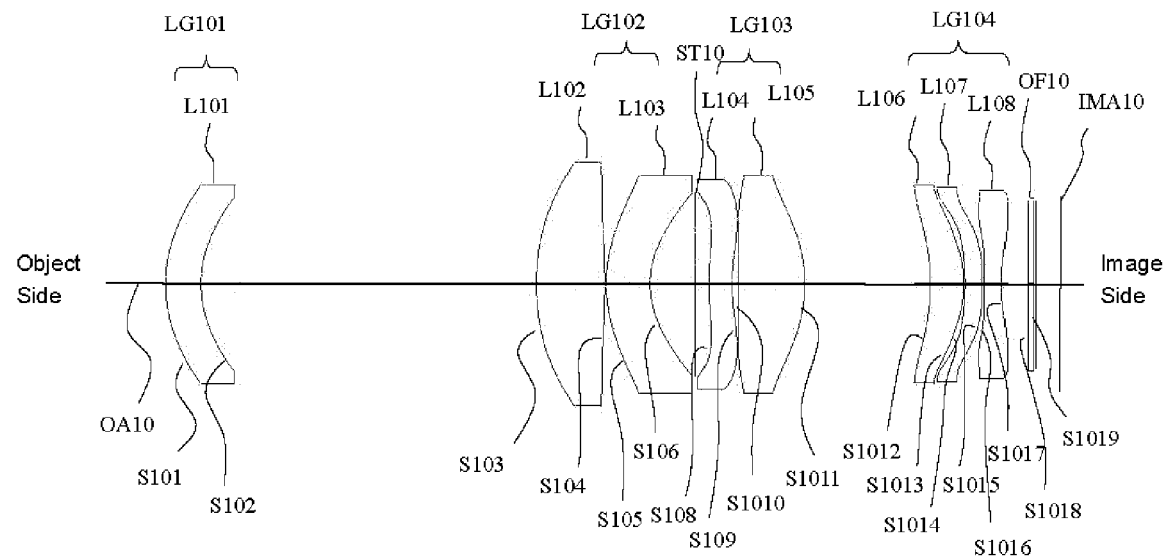
FIG. 22 and FIG. 23 are lens layout and optical path diagrams of a lens assembly at a wide-angle end and a telephoto end in accordance with a tenth embodiment of the invention, respectively.
Figure 23:
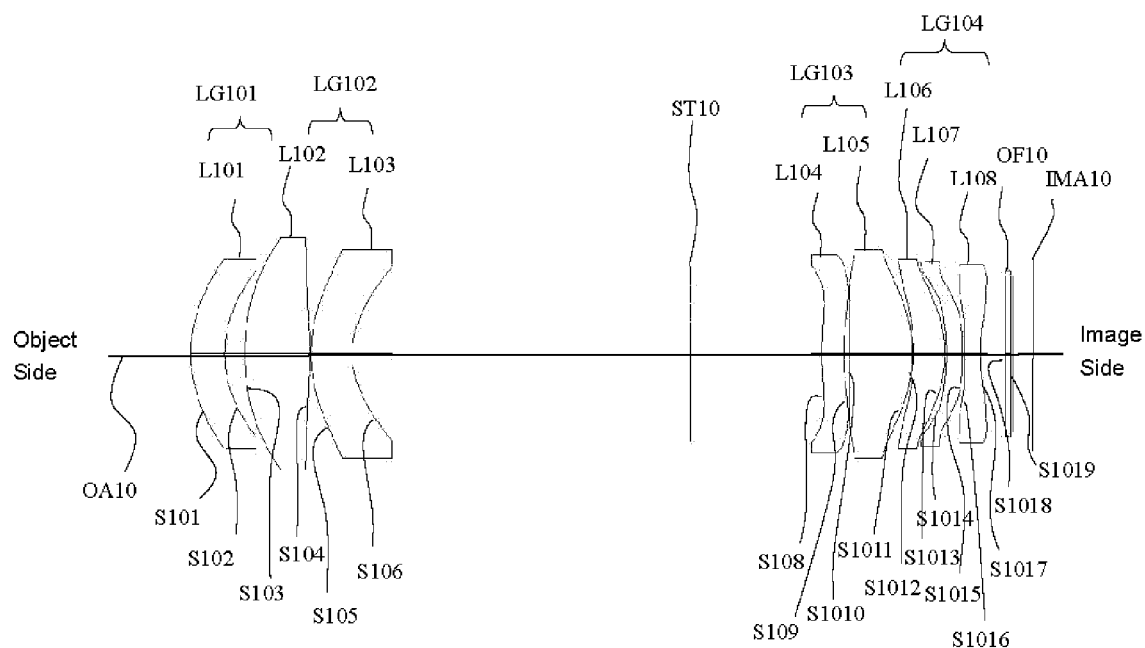

FIG. 20 and FIG. 21 are lens layout and optical path diagrams of a lens assembly at a wide-angle end and a telephoto end in accordance with a ninth embodiment of the invention, respectively. FIG. 22 and FIG. 23 are lens layout and optical path diagrams of a lens assembly at a wide-angle end and a telephoto end in accordance with a tenth embodiment of the invention, respectively. The lens layout and optical path diagrams of the ninth and tenth embodiments are similar to those of the first, third, fourth, fifth, and sixth embodiments.

The first lens groups LG91, LG101 include 1-1 lenses L91, L101, respectively. The second lens groups LG92, LG102 are with positive refractive power and include 2-1 lenses L92, L102 and 2-2 lenses L93, L103, respectively. The third lens groups LG93, LG103 are with positive refractive power and include 3-1 lenses L94, L104 and 3-2 lenses L95, L105, respectively. The fourth lens groups LG94, LG104 are with positive refractive power and include 4-1 lenses L96, L106, 4-2 lenses L97, L107, and 4-3 lenses L98, L108, respectively. The first annular bodies ST91, ST101 include a first hole, respectively.

The 1-1 lenses L91, L101 are meniscus lenses with negative refractive power and made of glass material, wherein the object side surfaces S91, S101 are convex surfaces, the image side surfaces S92, S102 are concave surfaces, and both of the object side surfaces S91, S101 and image side surfaces S92, S102 are aspheric surfaces. The 2-1 lenses L92, L102 are biconvex lenses with positive refractive power and made of glass material, wherein the object side surfaces S93, S103 are convex surfaces, the image side surfaces S94, S104 are convex surfaces, and both of the object side surfaces S93, S103 and image side surfaces S94, S104 are aspheric surfaces. The 2-2 lenses L93, L103 are meniscus lenses with negative refractive power and made of glass material, wherein the object side surfaces S95, S105 are convex surfaces, the image side surfaces S96, S106 are concave surfaces, and both of the object side surfaces S95, S105 and image side surfaces S96, S106 are aspheric surfaces. The 3-1 lenses L94, L104 are meniscus lenses with negative refractive power and made of plastic material, wherein the object side surfaces S98, S108 are convex surfaces, the image side surfaces S99, S109 are concave surfaces, and both of the object side surfaces S98, S108 and image side surfaces S99, S109 are aspheric surfaces. The 3-2 lenses L95, L105 are biconvex lenses with positive refractive power and made of plastic material, wherein the object side surfaces S910, S1010 are convex surfaces, the image side surfaces S911, S1011 are convex surfaces, and both of the object side surfaces S910, S1010 and image side surfaces S911, S1011 are aspheric surfaces. The 4-1 lenses L96, L106 are meniscus lenses with positive refractive power and made of plastic material, wherein the object side surfaces S912, S1012 are concave surfaces, the image side surfaces S913, S1013 are convex surfaces, and both of the object side surfaces S912, S1012 and image side surfaces S913, S1013 are aspheric surfaces. The 4-2 lenses L97, L107 are meniscus lenses with negative refractive power and made of plastic material, wherein the object side surfaces S914, S1014 are concave surfaces, the image side surfaces S915, S1015 are convex surfaces, and both of the object side surfaces S914, S1014 and image side surfaces S915, S1015 are aspheric surfaces. The 4-3 lenses L98, L108 are with negative refractive power and made of plastic material, wherein the image side surfaces S917, S1017 are concave surfaces, and both of the object side surfaces S916, S1016 and image side surfaces S917, S1017 are aspheric surfaces.

In addition, the lens assemblies 9, 10 satisfy at least one of the conditions (1)-(6), (8)-(39) and the following conditions (40)-(43):

$$-0.1 < f2/f7 < -5; \quad (40)$$

$$-0.1 < f2/f8 < -5; \quad (41)$$

$$0.04 < R22/R52 < 25; \quad (42)$$

$$-0.04 < R42/R62 < -25; \quad (43)$$

wherein f2 is respectively an effective focal length of the lenses L92, L102 second close to the object side for the ninth to tenth embodiments, f7 is respectively an effective focal length of the lenses L97, L107 seventh close to the object side for the ninth to tenth embodiments, f8 is respectively an effective focal length of the lenses L98, L108 eighth close to the object side for the ninth to tenth embodiments, R22 is respectively a radius of curvature of an image side surface of the lenses L92, L102 second close to the object side for the ninth to tenth embodiments, R42 is respectively a radius of curvature of an image side surface of the lenses L94, L104 fourth close to the object side for the ninth to tenth embodiments, R52 is respectively a radius of curvature of an image side surface of the lenses L95, L105 fifth close to the object side for the ninth to tenth embodiments, and R62 is respectively a radius of curvature of an image side surface of the lenses L96, L106 sixth close to the object side for the ninth to tenth embodiments. With the lens assemblies 9, 10 satisfying at least one of the conditions (1)-(6), (8)-(39), and (40)-(43), the total lens length can be effectively shortened, the resolution can be effectively increased, the aberration can be effectively corrected, the chromatic aberration can be effectively corrected, and optical zoom function can be realized. The preferred embodiment of the present invention can be achieved when the lens assembly satisfies at least one of the conditions (1)-(6), (8)-(39), and (40)-(43).

A detailed description of a lens assembly in accordance with a ninth embodiment of the invention is as follows. Referring to FIG. 20 and FIG. 21, the lens assembly 9 includes a first lens group LG91, a second lens group LG92, a first annular body ST91, a third lens group LG93, a fourth lens group LG94, and an optical filter OF9, all of which are arranged in order from an object side to an image side along an axis OA9. The first lens group LG91 is with positive refractive power and includes a 1-1 lens L91. The second lens group LG92 includes a 2-1 lens L92 and a 2-2 lens L93, both of which are arranged in order from the object side to the image side along the axis OA9. The third lens group LG93 includes a 3-1 lens L94 and a 3-2 lens L95, both of which are arranged in order from the object side to the image side along the axis OA9. The fourth lens group LG94 includes a 4-1 lens L96, a 4-2 lens L97, and a 4-3 lens L98, all of which are arranged in order from the object side to the image side along the axis OA9. In operation, a light from the object side is imaged on an image plane IMA9.

When the lens assembly 9 zooms from the wide-angle end (as shown in FIG. 20) to the telephoto end (as shown in FIG. 21), the first lens group LG91 is fixed, the second lens group LG92 moves to the object side along the axis OA9, the third lens group LG93 moves to the image side along the axis OA9, the fourth lens group LG94 is fixed, and the first annular body ST91 is fixed, so that the interval between the first lens group LG91 and the second lens group LG92 is decreased, the interval between the second lens group LG92 and the third lens group LG93 is increased, and the interval between the third lens group LG93 and the fourth lens group LG94 is decreased. The above mentioned intervals change as the lens assembly 9 zooming from the wide-angle end to the telephoto end can be clearly seen in FIG. 20 and FIG. 21. The zoom magnification is approximately 2.5 times (32.3 mm/12.9 mm≈2.50) as the lens assembly 9 of the ninth embodiment zooms from the wide-angle end (as shown in FIG. 20) to the telephoto end (as shown in FIG. 21). The first hole of the first annular body ST91 has a fixed size. The aforementioned fixed size means that the value of the hole diameter is fixed. According to the foregoing, wherein: the 4-3 lens L98 is a biconcave lens, wherein the object side surface S916 is a concave surface; and both of the object side surface S918 and image side surface S919 of the optical filter OF9 are plane surfaces. The preferred embodiment of the present invention can be achieved when the lens assembly satisfies conditions (1)-(6), (8)-(43), refractive power distribution, and surface shape.

With the above design of the lenses, first annular body ST91, and at least one of the conditions (1)-(6), (8)-(43) satisfied, the lens assembly 9 can have an effective shortened total lens length, an effective increased resolution, an effective corrected aberration, an effective corrected chromatic aberration, and a realized optical zoom function. Table 25 shows the optical specification of the lens assembly 9 in FIG. 20, and FIG. 21 when the lens assembly 9 is at the wide-angle end and telephoto end, respectively.

TABLE 25

Wide-angle End
Effective Focal Length = 12.9 mm F-number = 2.0
Total Lens Length = 30 mm Field of View = 25.1 degrees
Telephoto End
Effective Focal Length = 32.3 mm F-number = 4.3
Total Lens Length = 30 mm Field of View = 10.1 degrees

| Surface Number | Radius of Curvature (mm) | Thickness (mm) | Nd | Vd | Effective Focal Length (mm) | Remark |
|---|---|---|---|---|---|---|
| S91 | 5.468 | 2.553 | 1.86 | 40.6 | −52.029 | L91 |
| S92 | 3.819 | 10.214(w) 1.230(t) | | | | |
| S93 | 7.465 | 2.004 | 1.6 | 57.9 | 8.157 | L92 |
| S94 | −13.555 | 0.077 | | | | |
| S95 | 4.724 | 1.169 | 2.00 | 19.3 | −10.998 | L93 |
| S96 | 2.903 | 1.345(w) 10.329(t) | | | | |

TABLE 25-continued

Wide-angle End
Effective Focal Length = 12.9 mm F-number = 2.0
Total Lens Length = 30 mm Field of View = 25.1 degrees
Telephoto End
Effective Focal Length = 32.3 mm F-number = 4.3
Total Lens Length = 30 mm Field of View = 10.1 degrees

| Surface Number | Radius of Curvature (mm) | Thickness (mm) | Nd | Vd | Effective Focal Length (mm) | Remark |
|---|---|---|---|---|---|---|
| S97 | ∞ | 1.664(w) 5.406(t) | | | | ST9 |
| S98 | 11.040 | 0.677 | 1.67 | 19.2 | −16.464 | L94 |
| S99 | 5.411 | 0.231 | | | | |
| S910 | 18.128 | 2.320 | 1.54 | 56.0 | 6.774 | L95 |
| S911 | −4.434 | 3.791(w) 0.048(t) | | | | |
| S912 | −3.854 | 1.762 | 1.67 | 19.2 | 4.463 | L96 |
| S913 | −2.007 | 0.042 | | | | |
| S914 | −1.912 | 0.496 | 1.535 | 56.115 | −15.557 | L97 |
| S915 | −2.705 | 0.046 | | | | |
| S916 | −11.516 | 0.495 | 1.535 | 56.115 | −10.791 | L98 |
| S917 | 11.838 | 0.500 | | | | |
| S918 | ∞ | 0.210 | 1.517 | 64.167 | | OF9 |
| S919 | ∞ | 0.406 | | | | | w: Wide-angle End
t: Telephoto End

The definition of aspheric surface sag z of each aspheric lens in table 25 is the same as that of in Table 1, and is not described here again. In the ninth embodiment, the conic constant k and the aspheric coefficients A, B, C, D, E, F, G of each aspheric lens are shown in Table 26.

TABLE 26

| Surface Number | k | A | B | C | D | E | F | G |
|---|---|---|---|---|---|---|---|---|
| S91 | 1.96E−01 | −7.90E−04 | −1.63E−05 | −2.06E−06 | 1.57E−07 | −1.12E−08 | 3.63E−10 | −6.41E−12 |
| S92 | −2.53E−01 | −1.48E−03 | −5.85E−05 | −1.50E−06 | −7.11E−07 | 1.48E−07 | −1.36E−08 | 4.47E−10 |
| S93 | 1.16E+00 | 3.42E−04 | −6.02E−05 | 6.64E−06 | −3.05E−07 | −1.36E−08 | 4.66E−09 | −2.34E−10 |
| S94 | 2.31E+00 | 2.57E−03 | 2.38E−05 | −1.73E−05 | 6.61E−07 | 2.00E−07 | −1.85E−08 | 3.55E−10 |
| S95 | −4.08E+00 | 3.48E−04 | 1.44E−04 | −1.27E−05 | −8.07E−07 | 8.86E−08 | 1.02E−08 | −1.17E−09 |
| S96 | −1.04E+00 | −6.26E−03 | 7.47E−04 | 1.54E−05 | −2.50E−05 | 4.13E−06 | −2.79E−07 | 5.36E−09 |
| S98 | 8.54E+00 | −1.19E−02 | 1.10E−03 | −2.07E−04 | 8.19E−06 | 1.58E−06 | −2.09E−07 | 7.31E−09 |
| S99 | −1.93E+01 | −6.58E−03 | 8.37E−04 | −2.07E−05 | −2.66E−05 | 3.89E−06 | −6.68E−08 | −1.32E−08 |
| S910 | 1.99E+01 | −1.28E−02 | 2.68E−03 | −2.79E−04 | 2.91E−06 | 1.01E−06 | 1.35E−07 | −2.09E−08 |
| S911 | −7.43E+00 | −1.04E−02 | 1.21E−03 | −1.22E−04 | 1.74E−06 | 1.13E−06 | −1.18E−07 | 3.65E−09 |
| S912 | −3.50E+00 | −1.65E−04 | 6.29E−05 | −6.20E−05 | 4.69E−06 | 2.56E−07 | −1.54E−07 | 1.07E−08 |
| S913 | −9.98E−01 | 9.17E−03 | −1.80E−04 | −5.81E−05 | 1.00E−05 | −3.41E−07 | 2.47E−07 | −6.13E−09 |
| S914 | −6.95E−01 | 1.78E−02 | −3.58E−04 | 8.15E−06 | 1.66E−05 | −2.19E−06 | 1.50E−07 | −2.76E−09 |
| S915 | −3.20E+00 | 1.56E−02 | −2.73E−03 | 2.38E−04 | −3.46E−05 | 4.46E−06 | −2.34E−07 | 2.90E−09 |
| S916 | −5.28E+01 | −1.03E−02 | 4.63E−03 | −1.13E−03 | 1.52E−04 | −1.61E−05 | 9.96E−07 | −2.02E−08 |
| S917 | 1.25E+01 | −2.93E−02 | 4.27E−03 | −1.43E−04 | −3.01E−05 | −2.03E−07 | 4.13E−07 | −2.07E−08 |

Table 27 shows the parameters and condition values for conditions (1)-(6), (8)-(43) in accordance with the ninth embodiment of the invention. It can be seen from Table 27 that the lens assembly 9 of the ninth embodiment satisfies the conditions (1)-(6), (8)-(43).

TABLE 27

| | | | | | |
|---|---|---|---|---|---|
| Dmax | 7.64 mm | DG12W | 10.21 mm | DG23W | 3.01 mm |
| DG34W | 3.79 mm | DG12T | 1.23 mm | DG23T | 15.74 mm |
| DG34T | 0.048 mm | | | | |
| f2/f7 | −0.52 | f2/f8 | −0.76 | R22/R52 | 3.06 |
| R42/R62 | −2.70 | DG12W/TTL | 0.34 | DG34W/TTL | 0.13 |
| DG23W/Dmax | 0.39 | TTL/Dmax | 3.93 | | |
| (DG12W − DG12T)/(fT − fW) | 0.46 | (DG23T − DG23W)/(fT − fW) | 0.66 | | |
| (DG34W − DG34T)/(fT − fW) | 0.19 | | | | |

In addition, the optical performance for the lens assembly 9 of the ninth embodiment can meet the requirements. The field curvature diagram (figure is omitted), distortion diagram (figure is omitted), and modulation transfer function diagram are similar to those of the lens assembly 7 of the seventh embodiment, and is not described here again.

A detailed description of a lens assembly in accordance with a tenth embodiment of the invention is as follows. Referring to FIG. 22 and FIG. 23, the lens assembly 10 includes a first lens group LG101, a second lens group LG102, first annular body ST101, a third lens group LG103, a fourth lens group LG104, and an optical filter OF10, all of which are arranged in order from an object side to an image side along an axis OA10. The first lens group LG101 is with negative refractive power and includes a 1-1 lens L101. The second lens group LG102 includes a 2-1 lens L102 and a 2-2 lens L103, both of which are arranged in order from the object side to the image side along the axis OA10. The third lens group LG103 includes a 3-1 lens L104 and a 3-2 lens L105, both of which are arranged in order from the object side to the image side along the axis OA10. The fourth lens group LG104 includes a 4-1 lens L106, a 4-2 lens L107, and a 4-3 lens L108, all of which are arranged in order from the object side to the image side along the axis OA10. In operation, a light from the object side is imaged on an image plane IMA10.

When the lens assembly 10 zooms from the wide-angle end (as shown in FIG. 22) to the telephoto end (as shown in FIG. 23), the first lens group LG101 is fixed, the second lens group LG102 moves to the object side along the axis OA10, the third lens group LG103 moves to the image side along the axis OA10, the fourth lens group LG104 is fixed, and the first annular body ST101 is fixed, so that the interval between the first lens group LG101 and the second lens group LG102 is decreased, the interval between the second lens group LG102 and the third lens group LG103 is increased, and the interval between the third lens group LG103 and the fourth lens group LG104 is decreased. The above mentioned intervals change as the lens assembly 10 zooming from the wide-angle end to the telephoto end can be clearly seen in FIG. 22 and FIG. 23. The zoom magnification is approximately 2.5 times (32.3 mm/12.9 mm≈2.50) as the lens assembly 10 of the tenth embodiment zooms from the wide-angle end (as shown in FIG. 22) to the telephoto end (as shown in FIG. 23). The first hole of the first annular body ST101 has a fixed size. The aforementioned fixed size means that the value of the hole diameter is fixed. According to the foregoing, wherein: the 4-3 lens L108 is a meniscus lens, wherein the object side surface S1016 is a convex surface; and both of the object side surface S1018 and image side surface S1019 of the optical filter OF10 are plane surfaces. The preferred embodiment of the present invention can be achieved when the lens assembly satisfies conditions (1)-(6), (8)-(43), refractive power distribution, and surface shape.

With the above design of the lenses, first annular body ST101, and at least one of the conditions (1)-(6), (8)-(43) satisfied, the lens assembly 10 can have an effective shortened total lens length, an effective increased resolution, an effective corrected aberration, an effective corrected chromatic aberration, and a realized optical zoom function. Table 28 shows the optical specification of the lens assembly 10 in FIG. 22, and FIG. 23 when the lens assembly 10 is at the wide-angle end and telephoto end, respectively.

TABLE 28

Wide-angle End
Effective Focal Length = 12.9 mm F-number = 1.8
Total Lens Length = 32.745 mm Field of View = 25.1 degrees
Telephoto End
Effective Focal Length = 32.3 mm F-number = 4.4
Total Lens Length = 32.745 mm Field of View = 10.1 degrees

| Surface Number | Radius of Curvature (mm) | Thickness (mm) | Nd | Vd | Effective Focal Length (mm) | Remark |
|---|---|---|---|---|---|---|
| S101 | 5.088 | 1.338 | 2.00 | 19.3 | −72.751 | L101 |
| S102 | 4.129 | 12.613(w) 0.800(t) | | | | |
| S103 | 8.172 | 2.590 | 1.6 | 61.5 | 10.304 | L102 |
| S104 | −20.582 | 0.052 | | | | |
| S105 | 5.315 | 1.651 | 2.00 | 19.3 | −12.036 | L103 |
| S106 | 3.122 | 1.689(w) 13.502(t) | | | | |
| S107 | ∞ | 0.500(w) 5.188(t) | | | | ST10 |
| S108 | 10.407 | 0.864 | 1.65 | 21.5 | −26.325 | L104 |
| S109 | 6.281 | 0.249 | | | | |
| S1010 | 48.553 | 2.500 | 1.544 | 55.951 | 8.893 | L105 |
| S1011 | −5.294 | 4.737(w) 0.050(t) | | | | |
| S1012 | −8.069 | 1.264 | 1.671 | 19.2 | 9.803 | L106 |
| S1013 | −3.874 | 0.050 | | | | |
| S1014 | −6.898 | 0.650 | 1.544 | 55.951 | −29.32 | L107 |
| S1015 | −12.529 | 0.050 | | | | |
| S1016 | 11.817 | 0.650 | 1.544 | 55.951 | −17.532 | L108 |
| S1017 | 5.184 | 1.000 | | | | |
| S1018 | ∞ | 0.210 | 1.517 | 64.167 | | OF10 |
| S1019 | ∞ | 0.089 | | | | | w: Wide-angle End
t: Telephoto End

The definition of aspheric surface sag z of each aspheric lens in table 28 is the same as that of in Table 1, and is not described here again. In the tenth embodiment, the conic constant k and the aspheric coefficients A, B, C, D, E, F, G of each aspheric lens are shown in Table 29.

TABLE 29

| Surface Number | k | A | B | C | D | E | F | G |
|---|---|---|---|---|---|---|---|---|
| S101 | 4.99E−02 | −8.21E−04 | −5.10E−06 | −3.11E−06 | 1.37E−07 | −7.68E−10 | −3.94E−10 | 1.16E−11 |
| S102 | 1.89E−01 | −1.74E−03 | −1.15E−04 | 8.61E−06 | −2.02E−06 | 9.69E−08 | 2.08E−09 | −4.01E−10 |
| S103 | 9.76E−01 | 5.40E−06 | 1.46E−05 | −5.88E−07 | 1.03E−07 | −2.02E−08 | 1.20E−09 | −2.47E−11 |
| S104 | 0.00E+00 | 1.34E−03 | 6.99E−05 | −4.81E−06 | −8.13E−07 | 9.14E−08 | −3.41E−09 | 4.34E−11 |
| S105 | −2.60E+00 | 6.44E−05 | 8.34E−05 | −6.67E−06 | −1.82E−07 | 1.16E−08 | 6.03E−10 | −2.66E−11 |
| S106 | −4.78E−01 | −5.04E−03 | 1.05E−04 | 1.14E−05 | −3.02E−06 | −2.97E−09 | 2.03E−08 | −8.71E−10 |
| S108 | 0.00E+00 | −5.65E−03 | −5.10E−04 | 1.19E−04 | −1.54E−05 | 5.25E−07 | 4.62E−08 | −2.86E−09 |
| S109 | 0.00E+00 | −9.02E−03 | −2.19E−04 | 1.40E−04 | −2.32E−05 | 2.03E−06 | −9.09E−08 | 1.58E−09 |
| S1010 | 0.00E+00 | −3.94E−03 | 3.87E−04 | 1.02E−06 | 2.08E−07 | −1.22E−07 | 6.72E−09 | −1.36E−10 |
| S1011 | −6.27E+00 | −5.05E−03 | 4.85E−04 | −2.33E−05 | −8.54E−07 | 2.87E−07 | −1.76E−08 | 3.29E−10 |
| S1012 | −4.21E+01 | −1.04E−02 | 2.13E−03 | −2.44E−04 | 6.32E−06 | 1.84E−06 | −1.86E−07 | 5.22E−09 |
| S1013 | −4.84E−01 | 8.35E−03 | −9.24E−04 | −2.69E−05 | 3.34E−05 | −5.12E−06 | 3.40E−07 | −8.36E−09 |
| S1014 | 2.56E+00 | 1.50E−02 | −3.79E−03 | 1.60E−04 | 2.02E−05 | −1.58E−06 | 1.41E−08 | 1.24E−09 |
| S1015 | 1.09E+01 | −1.41E−02 | 1.44E−03 | −8.10E−05 | −8.84E−06 | 2.81E−06 | −1.92E−07 | 4.01E−09 |
| S1016 | −2.23E+02 | −2.48E−02 | 3.54E−03 | −1.78E−04 | 2.38E−05 | −4.62E−06 | 3.79E−07 | −1.15E−08 |
| S1017 | −4.05E+01 | 8.69E−03 | −4.58E−03 | 6.80E−04 | −2.75E−05 | −1.96E−06 | 1.81E−07 | −3.69E−09 |

Table 30 shows the parameters and condition values for conditions (1)-(6), (8)-(43) in accordance with the tenth embodiment of the invention. It can be seen from Table 30 that the lens assembly 10 of the tenth embodiment satisfies the conditions (1)-(6), (8)-(43).

TABLE 30

| Dmax | 8.47 mm | DG12W | 12.61 mm | DG23W | 2.19 mm |
|---|---|---|---|---|---|
| DG34W | 4.737 mm | DG12T | 1.23 mm | DG23T | 15.74 mm |
| DG34T | 0.048 mm | | | | |
| f2/f7 | −0.35 | f2/f8 | −0.59 | R22/R52 | 3.89 |
| R42/R62 | −1.62 | DG12W/TTL | 0.39 | DG34W/TTL | 0.14 |
| DG23W/Dmax | 0.26 | TTL/Dmax | 3.87 | | |
| (DG12W − DG12T)/(fT − fW) | 0.59 | (DG23T − DG23W)/(fT − fW) | | | 0.70 |
| (DG34W − DG34T)/(fT − fW) | 0.24 | | | | |

In addition, the optical performance for the lens assembly 10 of the tenth embodiment can meet the requirements. The field curvature diagram (figure is omitted), distortion diagram (figure is omitted), and modulation transfer function diagram are similar to those of the lens assembly 7 of the seventh embodiment, and is not described here again.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
a first lens group which is with refractive power;
a second lens group which is with positive refractive power;
a third lens group which is with positive refractive power;
a fourth lens group which is with refractive power; and
a reflective element which comprises a reflective surface;
wherein a light from an object sequentially passes through the first lens group, the second lens group, the third lens group, and the fourth lens group to an image side along an axis;
wherein the reflective element is disposed between an object side and the image side along the axis;
wherein intervals of the lens groups are changeable when the lens assembly zooms from a wide-angle end to a telephoto end;

wherein the lens assembly satisfies at least one of following conditions:

$0.1 < DG34W/TTL < 0.5;$ $0 < DG23W/Dmax < 1;$ $0.3 < Dp/Dmax < 2;$ $3.8 < TTL/Dmax \leq 5.2;$ wherein DG23W is an interval from the second lens group to the third lens group along the axis as the lens assembly is at the wide-angle end, DG34W is an interval from the third lens group to the fourth lens group along the axis as the lens assembly is at the wide-angle end, TTL is an interval from an object side surface of the lens which is closest to the object side to an image plane along the axis, Dmax is a maximum effective optical diameter among all of the lenses, and Dp is an effective optical diameter of the reflective surface.

2. The lens assembly as claimed in claim 1, wherein:
the first lens group is with positive refractive power;
the second lens group comprises a 2-1 lens and a 2-2 lens;
the third lens group comprises a 3-1 lens and a 3-2 lens, and
the fourth lens group is with negative refractive power and comprises a 4-1 lens, a 4-2 lens, and a 4-3 lens.

3. The lens assembly as claimed in claim 2, wherein:
the first lens group comprises a 1-1 lens, the 1-1 lens is with positive refractive power;
the 2-1 lens is with positive refractive power, the 2-2 lens is with negative refractive power, and the 2-1 lens and the 2-2 lens are arranged in order from the object side to the image side along the axis;

the 3-1 lens is with negative refractive power, the 3-2 lens is with positive refractive power, and the 3-1 lens and the 3-2 lens are arranged in order from the object side to the image side along the axis; and the 4-1 lens is with positive refractive power, the 4-2 lens is with refractive power, the 4-3 lens is with negative refractive power, and the 4-1 lens, the 4-2 lens, and the 4-3 lens are arranged in order from the object side to the image side along the axis.

4. The lens assembly as claimed in claim 3, wherein:
the 1-1 lens is a meniscus lens and comprises a convex surface facing the object side along the axis and a concave surface facing the image side along the axis;
the 2-1 lens is a meniscus lens and comprises a convex surface facing the object side along the axis and a concave surface facing the image side along the axis;
the 2-2 lens is a meniscus lens and comprises a convex surface facing the object side along the axis and a concave surface facing the image side along the axis;
the 3-1 lens is a meniscus lens and comprises a concave surface facing the object side along the axis and a convex surface facing the image side along the axis;
the 3-2 lens is a biconvex lens and comprises a convex surface facing the object side along the axis and another convex surface facing the image side along the axis;
the 4-1 lens is a meniscus lens and comprises a concave surface facing the object side along the axis and a convex surface facing the image side along the axis;
the 4-2 lens is a meniscus lens and comprises a concave surface facing the object side along the axis and a convex surface facing the image side along the axis; and
the 4-3 lens comprises a concave surface facing the image side along the axis.

5. The lens assembly as claimed in claim 4, wherein:
the 4-2 lens is with negative or positive refractive power; and
the 4-3 lens further comprises a convex or concave surface facing the object side along the axis.

6. The lens assembly as claimed in claim 1, further comprising a stop disposed between the object side and the image side along the axis, wherein:
the stop is a multi-stage variable stop;
a F-number of the lens assembly changes during zooming process from the wide-angle end to the telephoto end; and
the 2-1 lens and the 2-2 lens are cemented.

7. The lens assembly as claimed in claim 1, wherein the second lens group moves to the object side along the axis, the third lens group moves to the image side along the axis, and the first lens group and the fourth lens group are fixed and thereby perform zooming from the wide-angle end to the telephoto end.

8. The lens assembly as claimed in claim 7, wherein:
the reflective element is disposed between the object side and the first lens group along the axis;
the second lens group and the third lens group can move along the axis and thereby perform auto focus; and
the reflective element can operate with the axis or the direction perpendicular to the axis as an axis to achieve optical image stabilization.

9. The lens assembly as claimed in claim 1, further comprising a first annular body and a second annular body, wherein:

the first lens group is fixed when the lens assembly zooms from the wide-angle end to the telephoto end;
the first annular body is disposed between the first lens group and the fourth lens group and has function of stop when the lens assembly is at the telephoto end; and
the second annular body is disposed between the first lens group and the fourth lens group, wherein the position of the second annular body is different from that of the first annular body and has function of stop when the lens assembly is at the wide-angle end.

10. The lens assembly as claimed in claim 9, wherein:
the first lens group comprises a 1-1 lens having negative refractive power;
the second lens group comprises a 2-1 lens having positive refractive power and a 2-2 lens having negative refractive power, and the 2-1 lens and the 2-2 lens are arranged in order from the object side to the image side along the axis;
the third lens group comprises a 3-1 lens having negative refractive power and a 3-2 lens having positive refractive power, and the 3-1 lens and the 3-2 lens are arranged in order from the object side to the image side along the axis; and
the fourth lens group comprises a 4-1 lens having positive refractive power, a 4-2 lens having negative refractive power, and a 4-3 lens having negative refractive power, and the 4-1 lens, the 4-2 lens, and
the 4-3 lens are arranged in order from the object side to the image side along the axis.

11. The lens assembly as claimed in claim 10, wherein:
the 1-1 lens is a meniscus lens and comprises a convex surface facing the object side along the axis and a concave surface facing the image side along the axis;
the 2-1 lens is a meniscus lens and comprises a convex surface facing the object side along the axis and a concave surface facing the image side along the axis; and
the 2-2 lens is a meniscus lens and comprises a convex surface facing the object side along the axis and a concave surface facing the image side along the axis.

12. The lens assembly as claimed in claim 10, wherein:
the 3-1 lens is a meniscus lens and comprises a concave surface facing the object side along the axis and a convex surface facing the image side along the axis;
the 3-2 lens is a biconvex lens and comprises a convex surface facing the object side along the axis and another convex surface facing the image side along the axis;
the 4-1 lens is a meniscus lens and comprises a concave surface facing the object side along the axis and a convex surface facing the image side along the axis; and
the 4-2 lens is a meniscus lens and comprises a concave surface facing the object side along the axis and a convex surface facing the image side along the axis.

13. The lens assembly as claimed in claim 12, wherein:
the 4-3 lens is a biconcave lens and comprises a concave surface facing the object side along the axis and another concave surface facing the image side along the axis; or
the 4-3 lens is a meniscus lens and comprises a convex surface facing the object side along the axis and a concave surface facing the image side along the axis.

14. The lens assembly as claimed in claim 9, wherein:
the first annular body is disposed between the first lens group and the second lens group;
the second annular body is disposed between the second lens group and the third lens group;

the first annular body comprises a first hole having fixed dimension; and the second annular body comprises a second hole having fixed dimension.

15. The lens assembly as claimed in claim 1, wherein the lens assembly satisfies at least one of following conditions:

$0.1<(DG12W-DG12T)/(fT-fW)<1$;

$0.1<(DG23T-DG23W)/(fT-fW)<1$;

$0.1<(DG34W-DG34T)/(fT-fW)<1$;

$0.1<DG12W/TTL<0.5$;

wherein DG12W is an interval from the first lens group to the second lens group along the axis as the lens assembly is at the wide-angle end, DG12T is an interval from the first lens group to the second lens group along the axis as the lens assembly is at the telephoto end, DG23W is the interval from the second lens group to the third lens group along the axis as the lens assembly is at the wide-angle end, DG23T is an interval from the second lens group to the third lens group along the axis as the lens assembly is at the telephoto end, DG34W is the interval from the third lens group to the fourth lens group along the axis as the lens assembly is at the wide-angle end, DG34T is an interval from the third lens group to the fourth lens group along the axis as the lens assembly is at the telephoto end, fW is an effective focal length of the lens assembly as the lens assembly is at the wide-angle end, fT is an effective focal length of the lens assembly as the lens assembly is at the telephoto end, and TTL is the interval from the object side surface of the lens which is closest to the object side to the image plane along the axis.

16. The lens assembly as claimed in claim 1, wherein the lens assembly satisfies at least one of following conditions:

$0.2<ST1MaxD/ST2MaxD<3.2$;

$3<TC12wide/TC12tele<6$;

$4<TTL1/ST1MaxD<6$;

$7<TTL1/ST2MaxD<9$;

$0.5<Dmax/ST1MaxD<3$;

$1<Dmax/ST2MaxD<3.5$;

$0<ST1MaxD/(TC12wide-TC12tele)<1.5$;

$0<ST2MaxD/(TC12wide-TC12tele)<1$;

$0.6<ST1MaxD/(TC34wide-TC34tele)<2.5$;

$0.1<ST2MaxD/(TC34wide-TC34tele)<1.8$;

$-1<(TC12wide-TC12tele)/(fW-fT)<0$;

$2<f/STOPactiveD<6$;

0.8 mm$<STOPactiveD/F\#<2.5$ mm;

1.5 degree/$mm<FOV$/STOPactiveD$<8.5$ degree/$mm$;

$0.7<EPD$/STOPactiveD$<2$;

$0.3<ST1MaxD/TC12<4$;

$0.1<ST2MaxD/TC12<2.9$;

$1<f/ST1MaxD<6$;

$2<f/ST2MaxD<9$;

0.7 mm$<ST1MaxD/F\#<3$ mm;

0.3 mm$<ST2MaxD/F\#<1.1$ mm;

0.8 degree/$mm<FOV$/ST1MaxD$<5.5$ degree/$mm$;

1.9 degree/$mm<FOV$/ST2MaxD$<8.5$ degree/$mm$;

$0<ST1MaxD/EPD<3$;

$0.7<EPD/ST2MaxD<2.8$;

$0.1<TCs1g2/TCs1g1<5.5$;

$0.7<TCs2g2/TCs2g3<3$;

wherein ST1MaxD is an effective optical diameter of the first annular body, ST2MaxD is an effective optical diameter of the second annular body, TC12wide is an interval from the first lens group to the second lens group along the axis as the lens assembly is at the wide-angle end, TC12tele is an interval from the first lens group to the second lens group along the axis as the lens assembly is at the telephoto end, TTL1 is an interval from an object side surface of the 1-1 lens to an image plane along the axis, Dmax is the maximum effective optical diameter among all of the lenses, TC34wide is an interval from the third lens group to the fourth lens group along the axis as the lens assembly is at the wide-angle end, TC34tele is an interval from the third lens group to the fourth lens group along the axis as the lens assembly is at the telephoto end, fW is an effective focal length of the lens assembly as the lens assembly is at the wide-angle end, fT is an effective focal length of the lens assembly as the lens assembly is at the telephoto end, f is an effective focal length of the lens assembly, STOPactiveD is an effective optical diameter of the annular body which has function of stop as the lens assembly having different effective focal length, F # is a F-number of the lens assembly, FOV is a field of view of the lens assembly, EPD is an entrance pupil diameter of the lens assembly, TC12 is an interval from the first lens group to the second lens group along the axis, TCs1g1 is an interval from the first annular body to the first lens group along the axis, TCs1g2 is an interval from the first annular body to the second lens group along the axis, TCs2g2 is an interval from the second annular body to the second lens group along the axis, and TCs2g3 is an interval from the second annular body to the third lens group along the axis.

17. The lens assembly as claimed in claim 1, wherein:

the fourth lens group is with positive refractive power and comprises a 4-1 lens, a 4-2 lens, and a 4-3 lens, and all of which are arranged in order from the object side to the image side along the axis; and the 4-3 lens is a meniscus lens with positive refractive power and comprises a concave surface facing the object side along the axis and a convex surface facing the image side along the axis.

18. The lens assembly as claimed in claim 17, wherein the lens assembly satisfies at least one of following conditions:

$0.1<(DG12W-DG12T)/(fT-fW)<1$;

$0.1<(DG23T-DG23W)/(fT-fW)<1$;

$0.1 < (DG34W-DG34T)/(fT-fW) < 1;$ $0.1 < DG12W/TTL < 0.5;$ $0.1 < ed78/L7\emptyset;$ $L8R1/SD8R1 < 0;$ $|T2/L2R2| < 0.4;$ $|SD2/L2R2| < 0.5;$ wherein DG12W is an interval from the first lens group to the second lens group along the axis as the lens assembly is at the wide-angle end, DG12T is an interval from the first lens group to the second lens group along the axis as the lens assembly is at the telephoto end, DG23W is the interval from the second lens group to the third lens group along the axis as the lens assembly is at the wide-angle end, DG23T is an interval from the second lens group to the third lens group along the axis as the lens assembly is at the telephoto end, DG34W is the interval from the third lens group to the fourth lens group along the axis as the lens assembly is at the wide-angle end, DG34T is an interval from the third lens group to the fourth lens group along the axis as the lens assembly is at the telephoto end, fW is an effective focal length of the lens assembly as the lens assembly is at the wide-angle end, fT is an effective focal length of the lens assembly as the lens assembly is at the telephoto end, TTL is the interval from the object side surface of the lens which is closest to the object side to the image plane along the axis, ed78 is an interval between two edges of lenses which are closest to the image side, L7Ø is an effective optical diameter of an image side surface of the lens which is second closest to the image side, L8R1 is a radius of curvature of an object side surface of the lens which is closest to the image side, SD8R1 is an effective optical radius of the object side surface of the lens which is closest to the image side, T2 is an interval from an object side surface to an image side surface of a lens which is second closest to the object side along the axis, L2R2 is a radius of curvature of an image side surface of the lens which is second closest to the object side, and SD2 is an effective optical radius of the lens which is second closest to the object side.

19. A lens assembly comprising:
a first lens group which is with refractive power;
a second lens group which is with positive refractive power;
a third lens group which is with positive refractive power; and
a fourth lens group which is with refractive power;
wherein a light from an object sequentially passes through the first lens group, the second lens group, the third lens group, and the fourth lens group to an image side along an axis;
wherein intervals of the lens groups are changeable when the lens assembly zooms from a wide-angle end to a telephoto end;
wherein the lens assembly satisfies at least one of following conditions:

$0.1 < DG34W/TTL < 0.5;$ $0 < DG23W/Dmax < 1;$ $3.8 < TTL/Dmax < 5.2;$ wherein DG23W is an interval from the second lens group to the third lens group along the axis as the lens assembly is at the wide-angle end, DG34W is an interval from the third lens group to the fourth lens group along the axis as the lens assembly is at the wide-angle end, TTL is an interval from an object side surface of the lens which is closest to an object side to an image plane along the axis, and Dmax is a maximum effective optical diameter among all of the lenses.

20. The lens assembly as claimed in claim 19, wherein:
the second lens group comprises a 2-1 lens and a 2-2 lens;
the third lens group comprises a 3-1 lens and a 3-2 lens;
the 2-1 lens comprises a convex surface facing the image side;
the 3-1 lens is a meniscus lens and comprises a convex surface facing the object side and a concave surface facing the image side;
the 2-1 lens and the 2-2 lens are arranged in order from the object side to the image side along the axis; and
the 3-1 lens and the 3-2 lens are arranged in order from the object side to the image side along the axis.

21. The lens assembly as claimed in claim 19, wherein the lens assembly satisfies at least one of following conditions:

$-0.1 < f2/f7 < -5;$ $-0.1 < f2/f8 < -5;$ $0.04 < R22/R52 < 25;$ $-0.04 < R42/R62 < -25;$ wherein f2 is an effective focal length of a lens second close to the object side, f7 is an effective focal length of a lens seventh close to the object side, f8 is an effective focal length of a lens eighth close to the object side, R22 is a radius of curvature of an image side surface of the lens second close to the object side, R42 is a radius of curvature of an image side surface of a lens fourth close to the object side, R52 is a radius of curvature of an image side surface of a lens fifth close to the object side, and R62 is a radius of curvature of an image side surface of a lens sixth close to the object side.

* * * * *